United States Patent [19]
Takaoka et al.

[11] Patent Number: 6,166,449
[45] Date of Patent: *Dec. 26, 2000

[54] POWER OUTPUT APPARATUS HAVING A BATTERY WITH A HIGH CHARGE-DISCHARGE EFFICIENCY

[75] Inventors: Toshifumi Takaoka, Anjyo; Yukio Kinugasa, Susono; Kouji Yoshizaki, Numazu; Yoshiaki Taga, deceased, late of Nagoya, by Tomoyo Taga, heiress; by Shigeo Taga, heir; by Takiko Taga, heiress, both of Tokorozawa, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/927,496

[22] Filed: Sep. 11, 1997

[30] Foreign Application Priority Data

Sep. 17, 1996 [JP] Japan ................................. 8-267988
Feb. 3, 1997 [JP] Japan ................................. 9-035517

[51] Int. Cl.$^7$ ............................. F02N 11/06; H02P 9/04
[52] U.S. Cl. ............ 290/40 B; 290/40 A; 290/40 C; 290/40 D; 290/40 E; 290/40 F; 290/40 R
[58] Field of Search ............................. 290/40 A, 40 B, 290/40 C, 40 D, 40 E, 40 F; 180/65.1, 65.2, 65.3, 65.4; 364/424.01, 431.01, 431.11; 701/22

[56] References Cited

U.S. PATENT DOCUMENTS

| | | |
|---|---|---|
| 5,176,213 | 1/1993 | Kawai et al. .............................. 701/22 |
| 5,318,142 | 6/1994 | Bates et al. ........................... 290/40 B |
| 5,327,987 | 7/1994 | Abdelmalek ........................... 180/65.2 |
| 5,487,002 | 1/1996 | Diller et al. .......................... 290/40 B |
| 5,627,752 | 5/1997 | Buck et al. ........................... 290/40 B |
| 5,778,326 | 7/1998 | Moroto et al. ........................ 290/40 B |
| 5,788,664 | 7/1998 | Sakai et al. ............................... 290/17 |
| 5,789,877 | 8/1998 | Yamada et al. ............................ 318/9 |
| 5,823,280 | 10/1998 | Lateur et al. .......................... 180/65.2 |

FOREIGN PATENT DOCUMENTS

| | | |
|---|---|---|
| 0 800 951 A1 | 10/1997 | European Pat. Off. ............. 290/40 B |
| 4344369 A1 | 7/1995 | Germany .............................. 290/40 B |
| 6-245320 | 9/1994 | Japan ................................... 290/40 B |
| 6-245321 | 9/1994 | Japan ................................... 290/40 B |
| 8-47107 | 2/1996 | Japan ................................... 290/40 B |
| 8-237810 | 9/1996 | Japan ................................... 290/40 B |
| 2311876 | 10/1997 | United Kingdom ................. 290/40 B |

*Primary Examiner*—Elvin Enad
*Attorney, Agent, or Firm*—Oliff & Berridge, PLC

[57] ABSTRACT

A mean vehicle speed Va and a mean variation ΔVa are factors reflecting a current driving condition and an expected driving condition of a vehicle, which relate to a charge-discharge amount of a battery. A target state SOC* of the battery is calculated from the mean vehicle speed Va and the mean variation ΔVa. The charge-discharge amount of the battery increases with an increase in mean vehicle speed Va and mean variation ΔVa. The lower charging state of the battery results in the higher charge-discharge efficiency. The structure of the present invention sets the target state SOC* of the battery and controls the actual state of the battery to the target state SOC*, thereby enhancing the charge-discharge efficiency of the battery and ensuring a sufficient supply of electric power required for driving the vehicle.

22 Claims, 30 Drawing Sheets

POWER OUTPUT APPARATUS HAVING A BATTERY WITH A HIGH CHARGE-DISCHARGE EFFICIENCY

BACKGROUND OF THE INVENTION

1. Field of the Invention

The present invention relates to a power output apparatus, and more specifically to a power output apparatus mounted on a vehicle for outputting power to a drive shaft.

2. Description of the Related Art

Proposed power output apparatuses mounted on a vehicle include a motor for outputting power to a drive shaft of the vehicle, an engine, a generator for converting the mechanical power output from the engine to electrical power, a battery being charged with the electric power generated by the generator and being discharged to supply electric power required for driving the motor, and a control unit for controlling operation of the engine, the motor, and the generator (for example, JAPANESE PATENT LAYING-OPEN GAZETTE No. 6-245320). The conventional power output apparatus detects the electric power input from the generator and the battery to the motor, calculates the mean electric power by dividing the input electric power by a predetermined time period, and corrects a target electric power to be generated based on the mean electric power. This procedure controls the engine and the generator in order to enable the state of the battery (state-of-cell, SOC) to approach a predetermined level.

It is that this structure realizes efficient use of the battery as well as reduction of its size and that less fluctuation of the charging amount extends the life of the battery.

The conventional power output apparatus controls the state SOC of the battery to the predetermined level, which prevents further reduction in size of the battery. In case that the motor regenerates large electrical energy, for example, when the vehicle goes down a long slope, the battery should be charged with a greater portion of the regenerated electric power, in order to attain the higher energy efficiency. In case that the motor consumes large electric power, for example, when the vehicle goes up a long slope, on the other hand, the battery should be discharged to ensure a sufficient supply of electric power required for driving the vehicle. In order to satisfy these requirements, the battery needs a relatively large capacity, which results in increasing the size of the battery.

The charge-discharge efficiency of the battery varies with the state SOC of the battery. When the state SOC of the battery around the predetermined level that simultaneously satisfies the two requirements has a lower charge-discharge efficiency, the energy efficiency of the whole power output apparatus can not be raised sufficiently.

SUMMARY OF THE INVENTION

One object of the present invention is thus to reduce the size of accumulator means, such as a battery, in a power output apparatus, which stores a greater portion of electrical energy regenerated from a drive shaft and ensures a sufficient supply of electric power required for rotation of the drive shaft.

Another object of the present invention is to use the accumulator means in a state of higher charge-discharge efficiency, thereby improving the energy efficiency of the whole power output apparatus.

At least part of the above and the other related objects are realized by a first power output apparatus of the present invention.

At least part of the above and the other related objects is realized by a first power output apparatus, which is mounted on a vehicle for outputting power to a drive shaft. The first power output apparatus comprising:

a motor for outputting power to the drive shaft;
an engine;
a generator for converting at least part of mechanical power output from the engine to electrical energy;
accumulator means being charged with the electrical energy converted by the generator and being discharged to supply electrical energy required for driving the motor;
state detection means for detecting a state of the accumulator means;
driving condition predicting means for predicting a driving condition of the vehicle;
target state setting means for setting a target state of the accumulator means based on the predicted driving condition; and
charge-discharge control means for controlling the engine and the generator, in order to enable the state of the accumulator means to become equal to the target state.

The first power output apparatus of the present invention sets the target state of the accumulator means based on the predicted driving condition and controls the engine and the generator, in order to enable the observed state of the accumulator to become equal to the target state. When the motor regenerates large electrical energy under the predicted driving condition, a smaller value is set to the target state of the accumulator means, so as to enable sufficient charging. When large electric power is consumed by the motor under the predicted driving condition, on the other hand, a greater value is set to the target state of the accumulator means, so as to enable sufficient discharging. Compared with the conventional structure that controls the state of the accumulator means to a predetermined level, the structure of the first power output apparatus reduces the size of the accumulator means and improves the energy efficiency of the whole power output apparatus. When small electrical energy is regenerated by the motor under the predicted driving condition or when small electric power is consumed by the motor under the predicted driving condition, the target state of the accumulator means is set equal to a level that attains a high charge-discharge efficiency. This further enhances the energy efficiency of the whole power output apparatus.

In accordance with another possible application, the first power output apparatus further comprising vehicle speed measurement means for measuring speed of the vehicle, wherein the driving condition predicting means predicts the driving condition of the vehicle, based on the speed.

In accordance with another possible application, the first power output apparatus further comprising target power setting means for setting a target power to be output to the drive shaft, as the target state, wherein the driving condition predicting means predicts the driving condition of the vehicle, based on the target power.

In accordance with another possible application, the first power output apparatus further comprising state variation calculation means for calculating a variation in state of the accumulator means based on the state of the accumulator means, and the driving condition predicting means predicts the driving condition of the vehicle, based on the variation in state of the accumulator means.

The driving condition of the vehicle depends upon the speed and the acceleration of the vehicle and the power output to the drive shaft, and can be regarded as a change in state of the accumulator means. In accordance with one preferable application, the first power output apparatus of the present invention has vehicle speed measurement means for measuring speed of the vehicle. In this structure, the driving condition predicting means includes means for predicting the driving condition of the vehicle, based on the speed measured by the vehicle speed measurement means. In accordance with another preferable application, the first power output apparatus has target power setting means for setting a target power to be output to the drive shaft. In this structure, the driving condition predicting means predicts the driving condition of the vehicle, based on the target power set by the target power setting means. In accordance with still another preferable application, the first power output apparatus has state variation calculation means for calculating a variation in state of the accumulator means based on the state of the accumulator means detected by the state detection means. In this structure, the driving condition predicting means predicts the driving condition of the vehicle, based on the variation calculated by the state variation calculation means In accordance with another possible application, the first power output apparatus further comprises altitude measurement means for measuring an altitude, and the driving condition predicting means predicts the driving condition of the vehicle, based on the altitude measured by the altitude measurement means.

In accordance with another possible application, the first power output apparatus further comprises map storage means for storing a map, the map including road information; and driving position detection means for detecting a current driving position of the vehicle. The driving condition predicting means of the first invention may predict the driving condition of the vehicle, based on the current driving position of the vehicle and the map.

This structure enables the driving condition to be predicted with higher accuracy.

In accordance with another possible application, the map of the first power output apparatus includes district information regarding a plurality of districts having different driving conditions, and the driving condition predicting means predicts the driving condition of the vehicle, based on the current driving position of the vehicle and the district information included in the map.

The district information includes information regarding the sphere of life, such as an urban district and a suburban district, geographical information, such as a plane district, a hill district, and a mountain district, and information regarding the type of the road, such as a highway, a trunk road, and a local road. The district information regards a plurality of districts divided by these elements as well as combination of these elements. This structure enables the driving condition to be predicted with higher accuracy.

In accordance with another possible application, the fist power output apparatus further comprises driving distance measurement means for measuring a driving distance of the vehicle; and driving schedule input means for inputting a driving schedule, the driving schedule including, as information, an expected driving distance to a destination, boundaries of a plurality of districts, into which the expected driving distance is divided, and a road condition of each the district. The driving condition predicting means may predict the driving condition of the vehicle, based on the driving distance measured by the driving distance measurement means and the driving schedule input by the driving schedule input means.

The road condition here includes the type and the width of the road, the slope, the number of lanes, the traffic volume, and the frequency of traffic jam. This structure enables the driving condition to be predicted with higher accuracy.

In accordance with another possible application, the target state setting means comprises means for setting a first state as the predicted target state, when the driving condition of the vehicle requires a power of greater than a predetermined level, and setting a second state as the target state, when the predicted driving condition of the vehicle requires a power of not greater than the predetermined level, the second state having a higher charge-discharge efficiency of the accumulator means than that of the first state.

Under the driving condition that requires large power, the accumulator means is ready for a supply of sufficient electric power. Under the driving condition that does not require large power, on the contrary, the accumulator means is set to attain high charge-discharge efficiency. When the accumulator means has higher charge efficiency with the lower state SOC, the second state has a lower state SOC than that of the first state. When the accumulator means has higher charge efficiency with the higher state SOC, on the other hand, the second state has a higher state SOC than that of the first state.

In accordance with another possible application, the generator is a pair-rotor motor comprising a first rotor connecting with an output shaft of the engine and a second rotor connecting with the drive shaft, the second rotor being rotatable relative to the first rotor, the first and second rotors being electromagnetically connected with each other, whereby power is transmitted between the output shaft of the engine and the drive shaft via an electromagnetic coupling of the first rotor with the second rotor and electric power is regenerated in response to a slip of the electromagnetic coupling of the first rotor with the second rotor.

In accordance with another possible application, the motor is a pair-rotor motor comprising a first rotor connecting with an output shaft of the engine and a second rotor connecting with the drive shaft, the second rotor being rotatable relative to the first rotor, the first and second rotors being electromagnetically connected with each other, whereby power is transmitted between the output shaft of the engine and the drive shaft via an electromagnetic coupling of the first rotor with the second rotor, and the generator is attached to either one of the output shaft of the engine and the drive shaft.

In accordance with another possible application, the first power output apparatus further comprises three shaft-type power input/output means having three shafts respectively linked with the drive shaft, an output shaft of the engine, and a rotating shaft, the three shaft-type power input/output means determining power input to and output from a residual one shaft, based on predetermined powers input to and output from any two shafts among the three shafts, and the generator is linked with the rotating shaft.

In accordance with another possible application, the first power output apparatus further comprising three shaft-type power input/output means having three shafts respectively linked with the drive shaft, an output shaft of the engine, and a rotating shaft, the three shaft-type power input/output means determining power input to and output from a residual one shaft, based on predetermined powers input to and output from any two shafts among the three shafts, and the generator is linked with the drive shaft and the motor is linked with the rotating shaft.

At least part of the above and the other related objects is realized by a second power output apparatus, which is mounted on a vehicle for outputting power to a drive shaft. The second power output apparatus comprising:

a motor for outputting power to the drive shaft;

an engine;

a generator for converting at least part of mechanical power output from the engine to electrical energy;

accumulator means being charged with the electrical energy converted by the generator and being discharged to supply electrical energy required for driving the motor;

state detection means for detecting a state of the accumulator means;

map storage means for storing a map, the map including road information;

driving route setting means for specifying a driving route in the map, based on an instruction of a driver;

target state setting means for setting a target state of the accumulator means at each position in the driving route;

driving position detection means for detecting a current driving position of the vehicle; and charge-discharge control means for controlling the engine and the generator, based on the current driving position and the target state at each position in the driving route, in order to enable the state of the accumulator means to become equal to the target state at the current driving position.

The second power output apparatus of the present invention controls the state of the accumulator means based on the driving route. When the driving route includes a location where the motor regenerates large electrical energy, a smaller value is set to the target state of the accumulator means, in order to enable sufficient charging. When the driving route includes a location where the motor consumes large electric power, on the other hand, a greater value is set to the target state of the accumulator means, in order to enable sufficient discharging. Compared with the conventional structure that controls the state of the accumulator means to a predetermined level, the structure of the second power output apparatus reduces the size of the accumulator means and improves the energy efficiency of the whole power output apparatus.

In accordance with another possible application, the map of the second power output apparatus includes district information regarding a plurality of districts having different driving conditions, and the target state setting means comprises means for setting the target state of the accumulator means at each position in the driving route, based on the district information at each position in the driving route.

In accordance with another possible application, the map also includes altitude information regarding an altitude at each position in the driving route, and the target state setting means comprises means for estimating a charge-discharge amount of the accumulator means at each position in the driving route, based on the altitude at each position in the driving route; and means for setting the target state of the accumulator means at each position in the driving route, based on the estimated charge-discharge amount.

In accordance with another possible application, the map also includes slope information regarding a slope at each position in the driving route, and the target state setting means comprises means for estimating a charge-discharge amount of the accumulator means at each position in the driving route, based on the slope at each position in the driving route and means for setting the target state of the accumulator means at each position in the driving route, based on the estimated charge-discharge amount.

This structure enables the target state of the accumulator means to be set more appropriately.

At least part of the above and the other related objects is realized by a first method of controlling a state of a battery mounted on a vehicle to a target state. The first method comprises the steps of:

(a) providing a motor for outputting power to a drive shaft, an engine, and a generator for converting at least part of mechanical power output from the engine to electrical energy;

(b) connecting the battery to the generator and the motor so as to be charged with the electrical energy converted by the generator and discharged to supply electrical energy required for driving the motor;

(c) detecting the state of the battery;

(d) predicting a driving condition of the vehicle;

(e) setting the target state of the battery based on the predicted driving condition; and (f) controlling the engine and the generator, in order to enable the state of the battery to become equal to the target state.

At least part of the above and the other related objects is realized by a second method of controlling a state of a battery mounted on a vehicle to a target state. The first method comprises the steps of:

(a) providing a motor for outputting power to the drive shaft, an engine, and a generator for converting at least part of mechanical power output from the engine to electrical energy;

(b) connecting the battery to the generator and the motor so as to be charged with the electrical energy converted by the generator and discharged to supply electrical energy required for driving the motor;

(c) detecting a state of the battery;

(d) storing a map, the map including road information;

(e) storing a driving route in said map specified by an instruction of a driver;

(f) setting a target state of the battery at each position in the driving route;

(g) detecting a current driving position of the vehicle; and (h) controlling the engine and the generator, based on the current driving position and the target state at each position in the driving route, in order to enable the state of the accumulator means to become equal to the target state at the current driving position.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
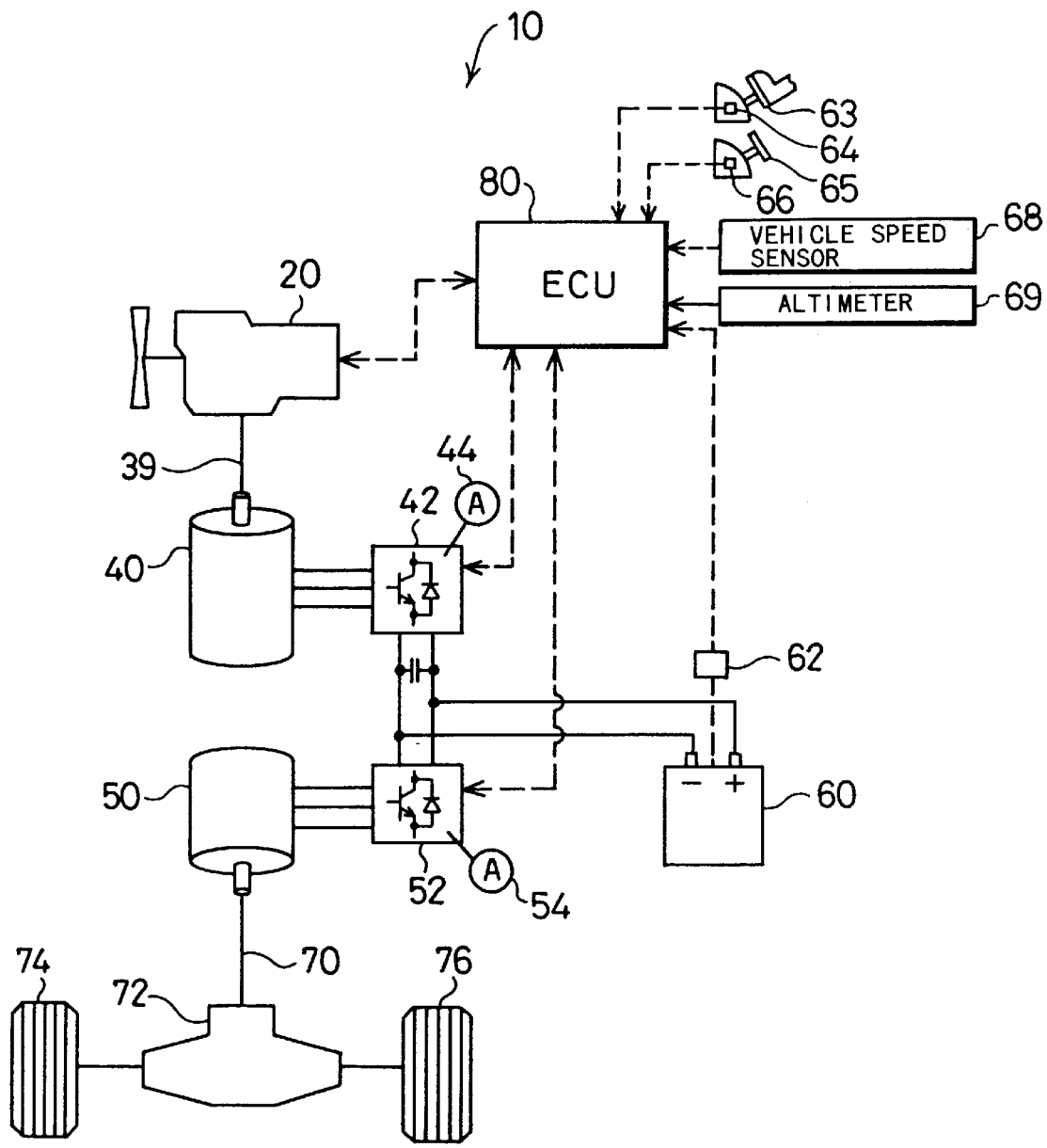
FIG. 1 schematically illustrates structure of a power output apparatus 10 as a first embodiment according to the present invention.
Figure 2:
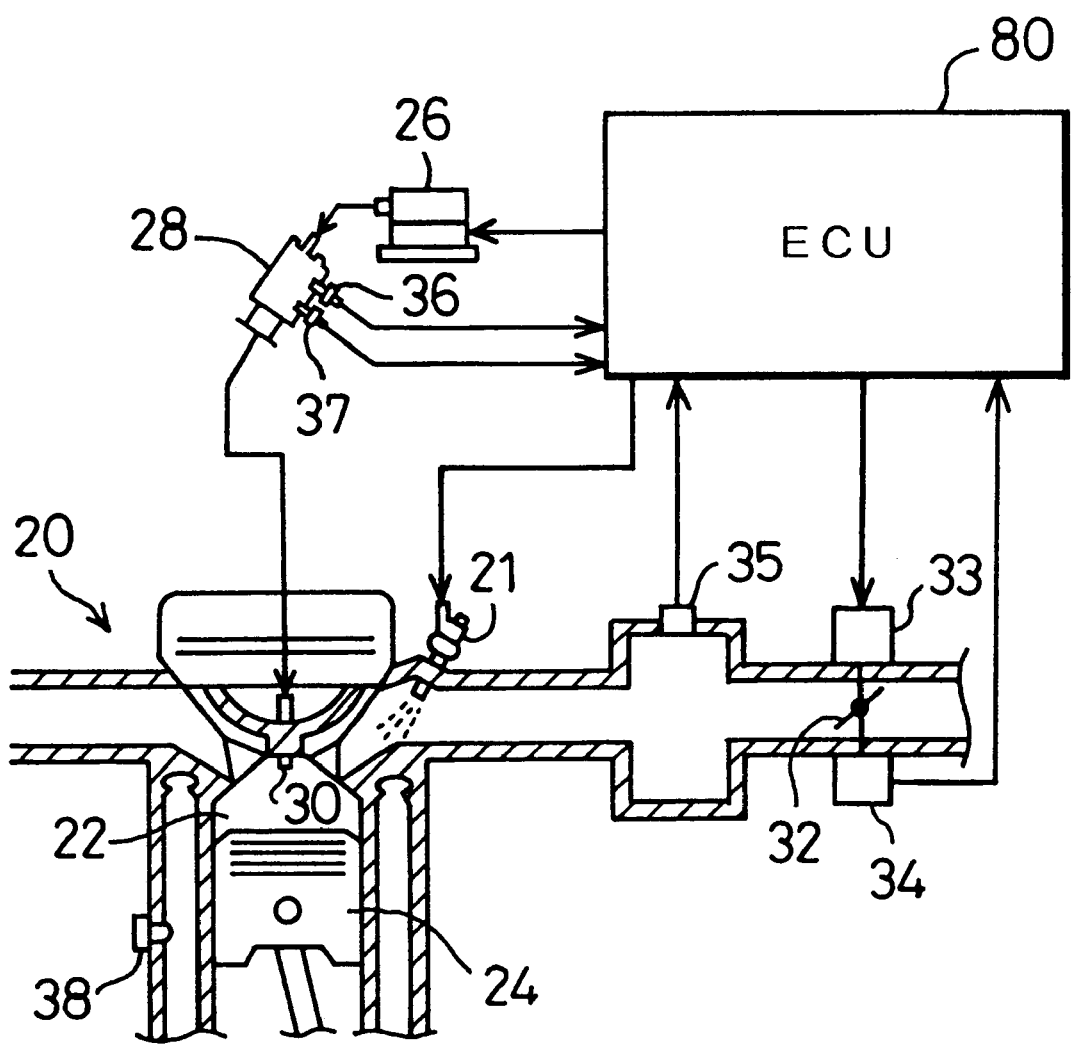
FIG. 2 schematically illustrates structure of an engine 20 included in the power output apparatus 10 of the first embodiment.

Some modes of carrying out the present invention are discussed below as preferred embodiments. FIG. 1 schematically illustrates structure of a power output apparatus 10 as a first embodiment according to the present invention, and FIG. 2 schematically illustrates structure of an engine 20 included in the power output apparatus 10 of the first embodiment. Referring to FIG. 1, the power output apparatus 10 include an engine 20, a generator 40 attached to a crankshaft 39 of the engine 20, a generator-driving circuit 42 for driving the generator 40, a motor 50 attached to a drive shaft 70 that is linked with driving wheels 74 and 76 via a differential gear 72, a motor-driving circuit 52 for driving motor 50, a battery 60 being charged with electric power generated by the generator 40 and being discharged to supply electric power required for driving the motor 50, and an electronic control unit 80 (hereinafter referred to as ECU) for driving and controlling the engine 20, the generator 40, and the motor 50.

Referring to FIG. 2, in the engine 20, a mixture of the air ingested from an air intake system through a throttle valve 32 and gasoline injected from a fuel injection valve 21 is led to a combustion chamber 22, and linear motions of a piston 24 pressed down by explosion of the air/fuel mixture is converted to rotational motions of the crankshaft 39. The throttle valve 32 is driven to open and close by an actuator 33. An ignition plug 30 converts a high voltage applied from an igniter 26 via a distributor 28 to a spark, which explosively ignites and combusts the air/fuel mixture. A variety of sensors showing the driving conditions of the engine 20 are attached to the engine 20. Such sensors include a throttle valve position sensor 34 for detecting a valve travel or position of the throttle valve 32, a manifold vacuum sensor 35 for measuring a load applied to the engine 20, a water temperature sensor 38 for measuring the temperature of cooling water in the engine 20, and a speed sensor 36 and a rotational angle sensor 37 mounted on the distributor 28 for measuring a revolving speed Ne (the number of revolutions per a predetermined time period) and a rotational angle of the crankshaft 39. These sensors are connected to the ECU 80 via conductive lines. Although being described in detail later, the ECU 80 includes a CPU 80a and receives data output from an accelerator pedal position sensor 64 attached to an accelerator pedal 63, a brake pedal position sensor 66 attached to a brake pedal 65, a vehicle speed sensor 68 for measuring the driving speed of the vehicle, and an altimeter 69 for measuring the height at the current driving position of the vehicle or the driving altitude of the vehicle.

The generator 40 is constructed as a synchronous generator including a rotor that is connected to the crankshaft 39 and has a plurality of magnets mounted on the circumference thereof and a stator that has three-phase coils wound on a plurality of slots. The generator 40 converts the mechanical power output from the engine 20 to electrical power.

The generator-driving circuit 42 is constructed as a transistor inverter including six transistors and six feedback diodes. Switching control of the respective transistors included in the generator-driving circuit 42 enables the generator 40 to convert the mechanical power output from the engine 20 to electrical energy, to carry out full-wave rectification of the electrical energy, and to supply the rectified energy as d.c. power to the motor 50 and the battery 60. The switching control alternatively enables the generator 40 to receive a supply of electric power from the battery 60 and to be driven as a motor, which cranks and starts the engine 20.

The motor-driving circuit 52 is also constructed as a transistor inverter including six transistors and six feedback diodes. Switching control of the respective transistors included in the motor-driving circuit 52 enables the motor 50 to receive a supply of electric power from the battery 60 and output the mechanical power to the drive shaft 70. The switching control alternatively enables the motor 50 to be driven as a generator, which converts the mechanical power input from the driving wheels 74 and 76 to the drive shaft 70 to electrical power and charge the battery 60 with the electric power.

The battery 60 is a lead-acid accumulator, and a remaining charge meter 62 for measuring a remaining charge of the battery 60 is attached to the battery 60. The remaining charge meter 62 may determine the remaining charge of the battery 60 by any known method; for example, by measuring the H specific gravity of an electrolytic solution in the battery 60 or the whole weight of the battery 60, by accumulating the currents and time of charge and discharge, or by causing an instantaneous short circuit between terminals of the battery 60 and measuring an internal resistance against the electric current.

Figure 3:
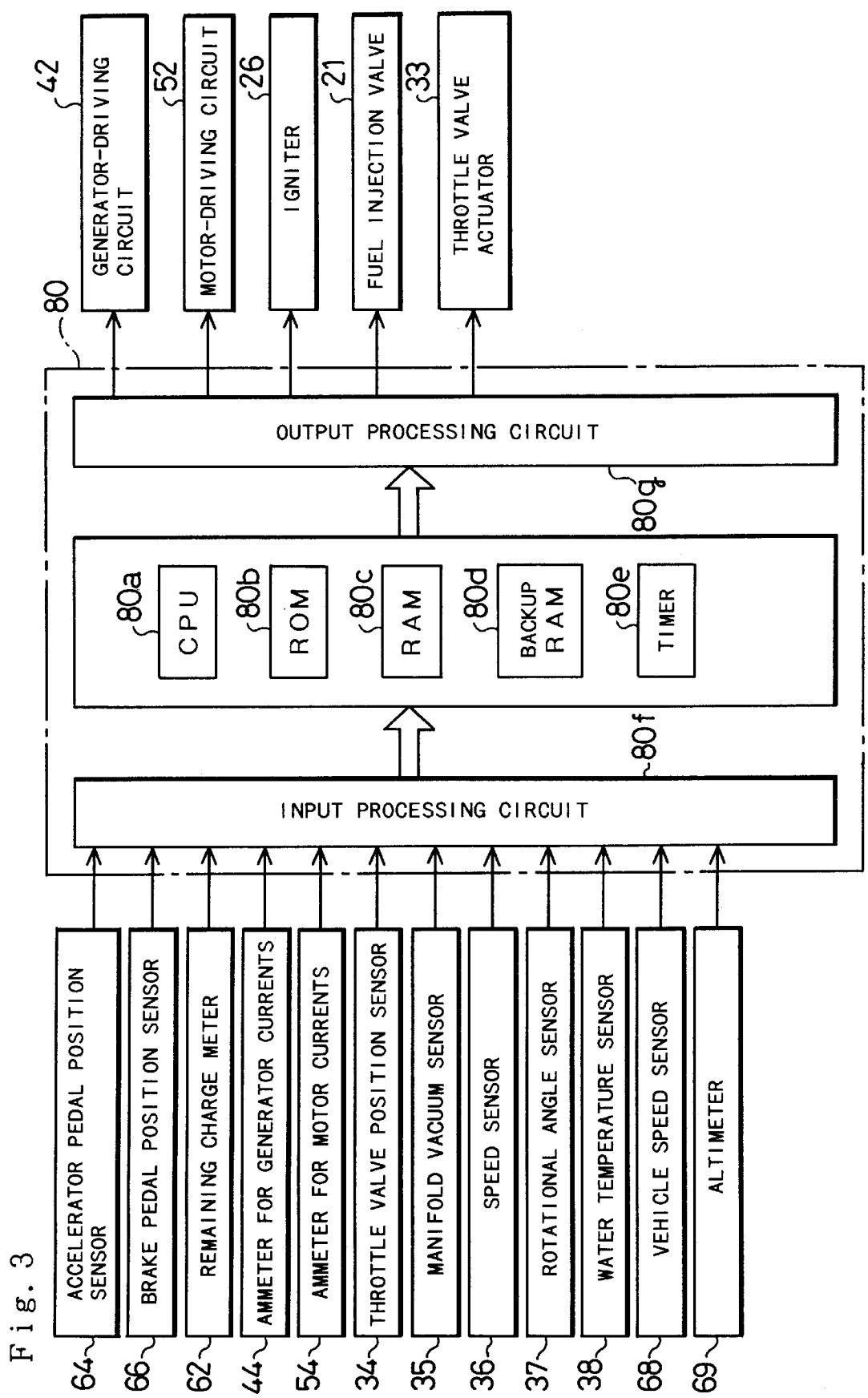
FIG. 3 is a block diagram showing electrical connections centering around the ECU 80 in the power output apparatus 10 of the first embodiment.

FIG. 3 is a block diagram showing electrical connections centering around the ECU 80 in the power output apparatus 10 of the first embodiment. The ECU 80 is constructed as a microcomputer including the CPU 80a, a ROM 80b, in which control programs are stored, a RAM 80c, which a variety of temporary data are written in and read from, a backup RAM 80d that can keep data with a backup power supply (not shown), a timer 80e, an input processing circuit 80f that receives signals output from various sensors and switches, and an output processing circuit 80g that outputs driving signals to the generator-driving circuit 42, the motor-driving circuit 52, the igniter 26, the fuel injection valve 21, and the throttle valve actuator 33. The signals input into the input processing circuit 80f include an accelerator pedal position AP (step-on amount of the accelerator pedal 63) output from the accelerator pedal position sensor 64, a brake pedal position BP (step-on amount of the brake pedal 65) output from the brake pedal position sensor 66, a remaining charge BRM of the battery 60 measured by the remaining charge meter 62, generator currents Igu and Igv flowing through the respective phases of the three-phase coils in the generator 40 and being measured by an ammeter 44 disposed in the generator-driving circuit 42, motor currents Imu and Imv flowing through the respective phases of the three-phase coils in the motor 50 and being measured by an ammeter 54 disposed in the motor-driving circuit 52, a position ST of the throttle valve 32 detected by the throttle valve position sensor 34, a manifold pressure Pa measured by the manifold vacuum sensor 35, a revolving speed Ne of the crankshaft 39 measured by the speed sensor 36, a rotational angle θe of the crankshaft 39 measured by the rotational angle sensor 37, a temperature WT of cooling water in the engine 20 measured by the water temperature sensor 38, and a vehicle speed V measured by the vehicle speed sensor 68, and a height H at the current driving position of the vehicle (driving altitude of the vehicle) measured by the altimeter 69. The other sensors and switches are omitted from the illustration.

In the power output apparatus 10 of the first embodiment thus constructed, the generator 40 converts the mechanical power output from the engine 20 to electrical energy and charges the battery 60 with the electrical energy. The motor 50 utilizes the electrical energy discharged from the battery 60 and outputs the mechanical power, which corresponds to the step-on amount of the accelerator pedal 63, to the drive shaft 70. As clearly seen from the connections of power lines in FIG. 1, the energy difference (that is, excess or deficient energy) between the electrical energy converted by the generator 40 and the electrical energy consumed by the motor 50 causes the battery 60 to be either charged or discharged.

Figure 4:
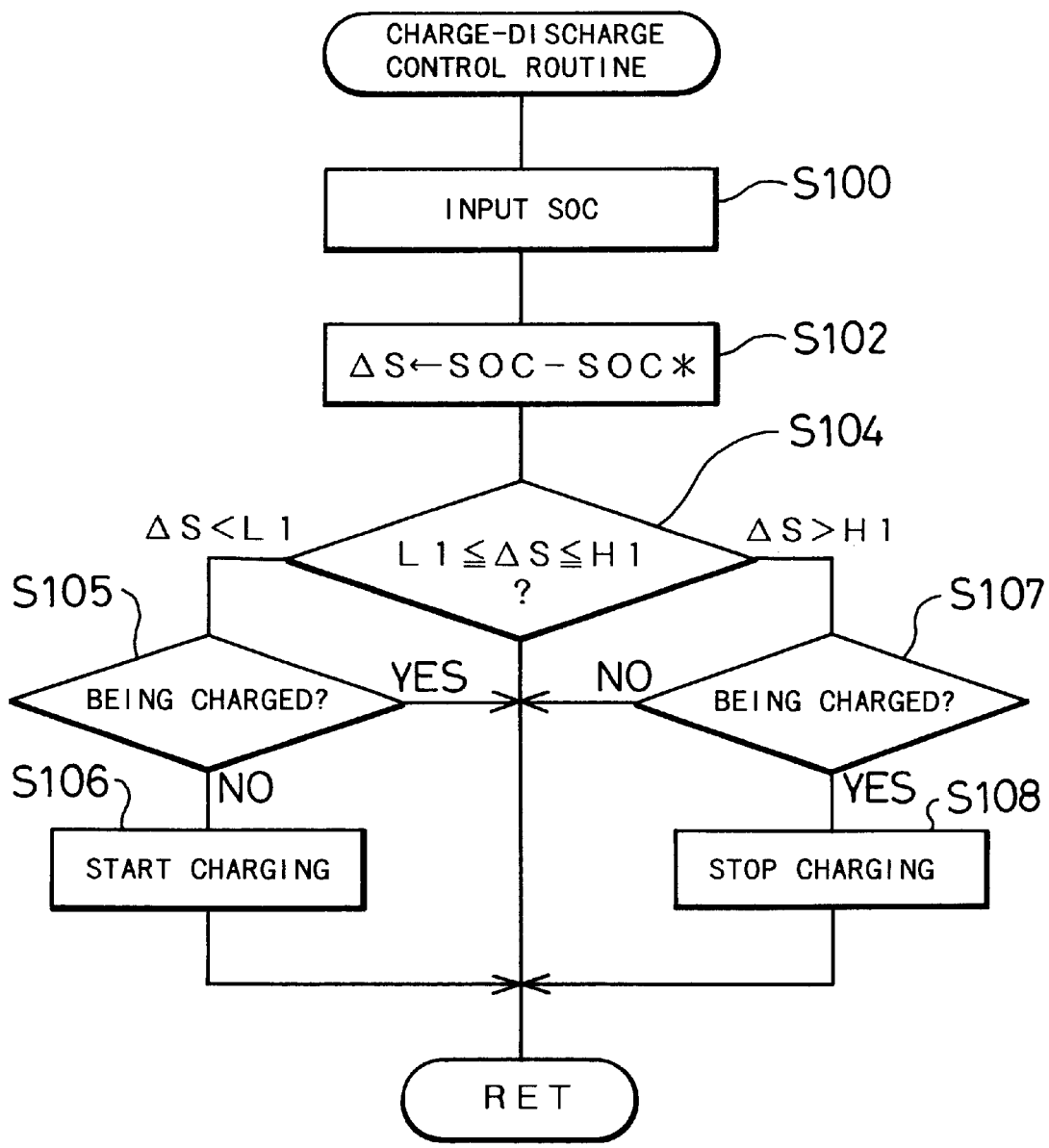
FIG. 4 is a flowchart showing a charge-discharge control routine executed by the ECU 80 in the power output apparatus 10 of the first embodiment.
Figure 5:
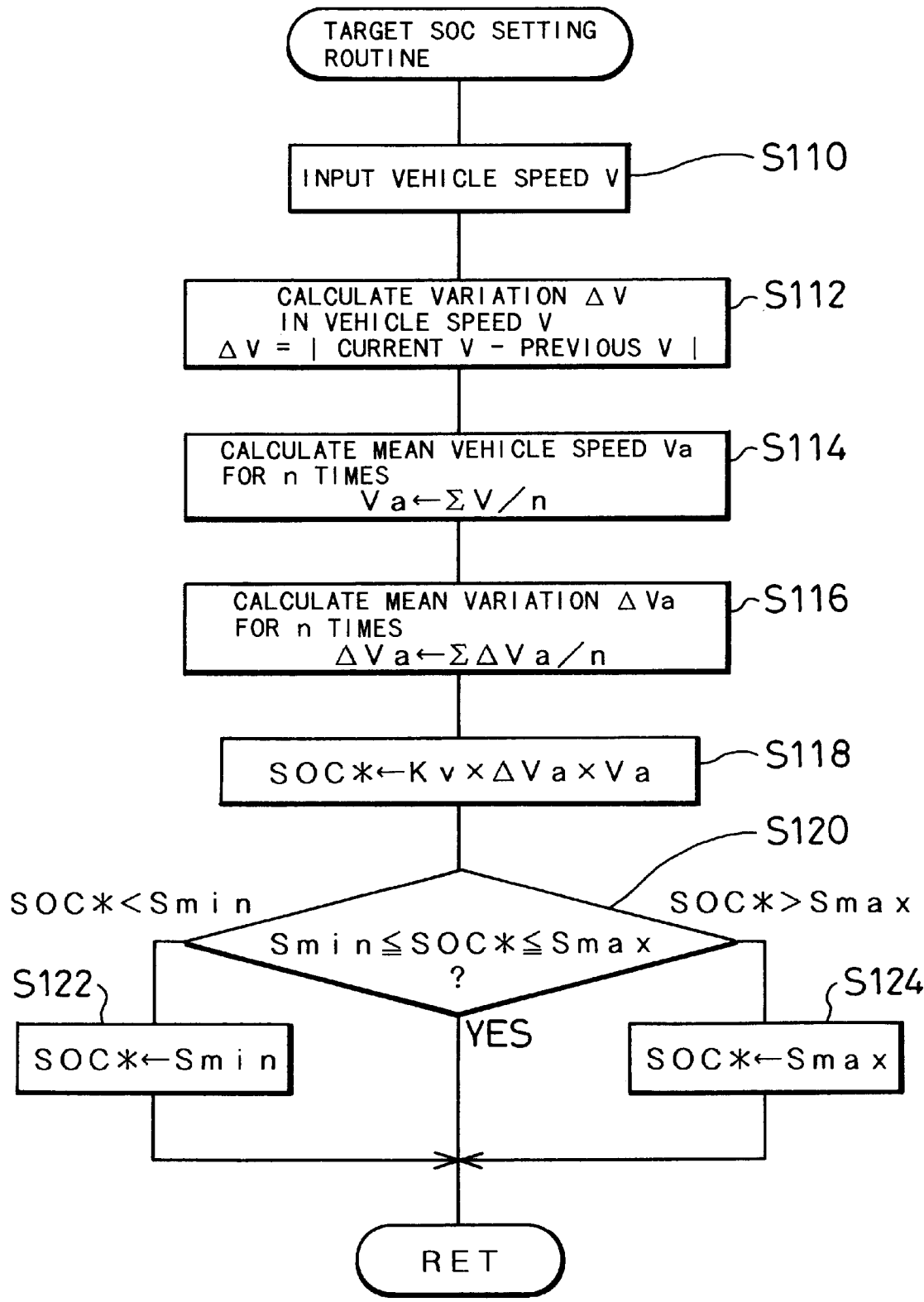
FIG. 5 is a flowchart showing a target SOC setting routine executed by the ECU 80 in the power output apparatus 10 of the first embodiment.

The power output apparatus 10 of the first embodiment carries out charging control of the battery 60 based on a charge-discharge control routine and a target SOC setting routine respectively shown in the flowcharts of FIGS. 4 and 5. The charge-discharge control routine of FIG. 4 and the target SOC setting routine of FIG. 5 are repeatedly executed at predetermined time intervals, for example, at every 100 msec, after a start of operation of the power output apparatus 10.

When the program enters the charge-discharge control routine of FIG. 4, the CPU 80a of the ECU 80 first reads the state SOC of the battery 60 (that is, the ratio of the dischargeable capacity to the whole capacity) at step S100. The state SOC of the battery 60 may be calculated from the remaining charge BRM of the battery 60 measured by the remaining charge meter 62. The CPU 80a then calculates a difference ΔS between the input state SOC and a target state SOC* at step S102. The target state SOC* is set by the target SOC setting routine shown in the flowchart of FIG. 5 as discussed below. The calculated difference ΔS is compared with a lower threshold value L1 and a higher threshold value H1 at step S104. The threshold values L1 and H1 define an allowable range based on the target state SOC* of the battery 60, and depend upon the capacity of the battery 60 and the frequency of charging and discharging operations.

In case that the difference ΔS is less than the lower threshold value L1, the program determines that the battery 60 requires charging. When the battery 60 is not in the charging state at step S105, the CPU 80a drives the engine 20 to start charging the battery 60 at step S106. In case that the difference ΔS is greater than the higher threshold value H1, on the other hand, the program determines that the battery 60 does not require charging. When the battery 60 is still in the charging state at step S107, the CPU 80a ceases operation of the engine 20 to stop the charging operation of the battery 60 at step S108. When the difference ΔS is less than the lower threshold value L1 but the battery 60 has already been in the charging state, when the difference ΔS is greater than the higher threshold value H1 but the charging operation of the battery 60 has already been stopped, or when the difference ΔS is not less than the lower threshold value L1 and not greater than the higher threshold value H1, the program exits from this routine and continues the current state (that is, either in the charging state or in the non-charging state).

The power output apparatus 10 of the embodiment carries out the above charge-discharge control, thereby regulating the state SOC of the battery 60 within a predetermined range around the target state SOC*.

The target state SOC* is set by the target SOC setting routine shown in the flowchart of FIG. 5. When the program enters the routine of FIG. 5, the CPU 80a of the ECU 80 first reads the vehicle speed V measured by the vehicle speed sensor 68 at step S110, and calculates the absolute value of a difference between the currently input vehicle speed V and the previous vehicle speed V as a variation ΔV of the vehicle speed V at step S112. The previous vehicle speed V is read in a previous cycle of this routine. In this embodiment, immediately after the actuation of the power output apparatus 10, an initialization routine (not shown) is carried out prior to all the other processing routines. The initialization routine initializes all the past data of the vehicle speed V and the variation ΔV to zero. When this routine is carried out for the first time immediately after the actuation of the power output apparatus 10, the previous vehicle speed V set equal to zero is used for the calculation of the variation ΔV.

The program then proceeds to step S114 to calculate a mean vehicle speed Va by dividing the summation of the past data of the vehicle speed V read in the cycle of (n−1) times before the current cycle to the vehicle speed V read in the current cycle by n. The CPU 80a also calculates a mean variation ΔVa by dividing the summation of the past data of the variation ΔV calculated in the cycle of (n−1) times before the current cycle to the variation ΔV calculated in the current cycle by n at step S116. Since the initialization routine initializes all the past data of the vehicle speed V and the variation ΔV to zero as mentioned above, the CPU 80a can calculate the mean vehicle speed Va and the mean variation ΔVa even immediately after the actuation of the power output apparatus 10.

Figure 6:
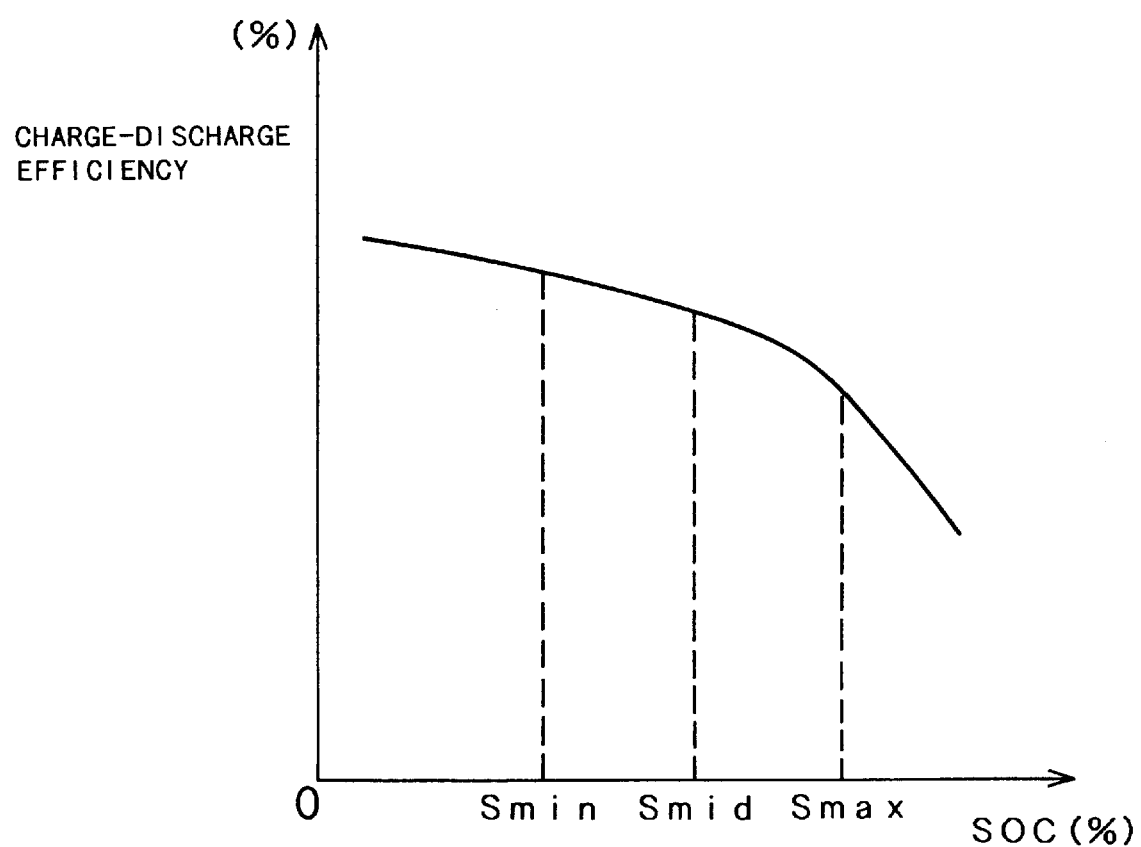
FIG. 6 is a graph showing the relationship between the state SOC of the battery 60 and the charge-discharge efficiency.

The CPU 80a subsequently calculates the target state SOC* from the calculated mean vehicle speed Va and mean variation ΔVa according to the equation of SOC*=Kv×ΔVa× Va at step S118, wherein Kv denotes a proportionality factor. The calculation controls the battery 60 to have the state SOC realizing a high charge-discharge efficiency, when the vehicle is under the driving condition of a relatively small discharge from the battery 60 or when such a driving condition is expected. The battery 60 is controlled to have a large state SOC irrespective of the charge-discharge efficiency, on the other hand, when the vehicle is under the driving condition of a relatively large discharge from the battery 60 or when such a driving condition is expected. The charge-discharge efficiency of the battery 60 decreases with an increase in state SOC of the battery 60 as shown in the graph of FIG. 6. The charge-discharge amount of the battery 60 affects the consumption of electric power and its variation, and can be expressed as a function of the vehicle speed V and its variation ΔV. The current driving condition of the vehicle and the expected driving condition are defined by a change of the driving condition, which is expressed by the mean vehicle speed Va and the mean variation ΔVa. The structure of the first embodiment takes into account these facts and calculates the target state SOC* as the proportional to the product of the mean variation ΔVa and the mean vehicle speed Va. The target state SOC* may otherwise be calculated according to an experimental equation or read from a three-dimensional map, which has been stored in advance in the ROM 80b and shows the relationship between the target state SOC*, the mean variation ΔVa, and the mean vehicle speed Va.

At subsequent step S120, the calculated target state SOC* is compared with a minimum value Smin and a maximum value Smax. In case that the target state SOC* is smaller than the minimum value Smin, the target SOC* is limited to the minimum value Smin at step S122. In case that the target state SOC* is greater than the maximum value Smax, on the other hand, the target SOC* is limited to the maximum value Smax at step S124. After the execution of either step S122 or step S124 or when the target state SOC* is not smaller than the minimum value Smin and not greater than the maximum value Smax at step S120, the program exits from this routine. Restriction of the target state SOC* to the upper limit or the lower limit enables the state SOC of the battery 60 to be controlled in an appropriate range. The minimum value Smin and the maximum value Smax depend upon the capacity and the properties of the battery 60 and the service properties of the vehicle. As mentioned above, the target state SOC* set in this routine is identical with the target state SOC* used at step S102 in the charge-discharge control routine of FIG. 4.

In this manner, the power output apparatus 10 of the first embodiment controls the state SOC of the battery 60 according to the current driving condition and the expected driving condition of the vehicle. The battery 60 is controlled to have the state SOC realizing a high charge-discharge efficiency, when the vehicle is under the driving condition of a relatively small discharge from the battery 60 or when such a driving condition is expected. On the other hand, the battery 60 is controlled to have a large state SOC, irrespective of the charge-discharge efficiency, in order to ensure a sufficient supply of electric power from the battery 60, when the vehicle is under the driving condition of a relatively large discharge from the battery 60 (that is, under the driving condition requiring a large power) or when such a driving condition is expected. This structure effectively improves the energy efficiency of the whole apparatus as well as the driving properties of the vehicle. The power output apparatus 10 defines the current driving condition and the expected driving condition of the vehicle by the mean variation ΔVa and the mean vehicle speed Va and calculates the target state SOC* from these values. The simple structure of the first embodiment can thus control the state SOC of the battery 60 with high accuracy.

As discussed above, the power output apparatus 10 of the first embodiment defines the current driving condition and the expected driving condition of the vehicle, which relate to the charge-discharge amount of the battery 60, by the mean variation ΔVa and the mean vehicle speed Va and calculates the target state SOC* from these values. Another possible structure may define the current driving condition and the expected driving condition of the vehicle, which relate to the charge-discharge amount of the battery 60, by the mean vehicle speed Va and the average root-mean-square of the variations ΔV for n times and calculate the target state SOC* from these values. This alternative structure can define the degree of variation in vehicle V with high precision and thereby express the charge-discharge amount of the battery 60 with high accuracy.

Figure 7:
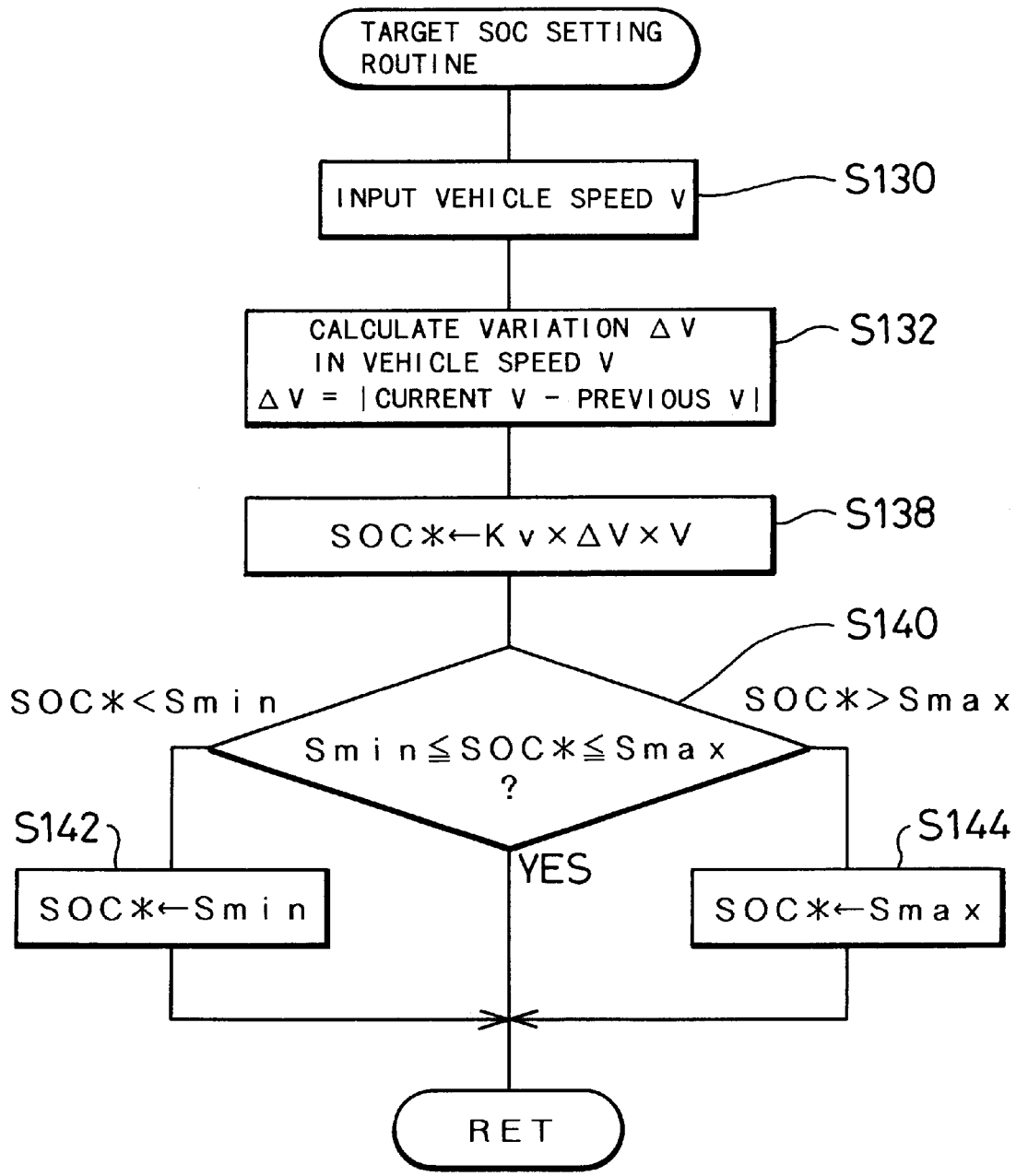
FIG. 7 is a flowchart showing another target SOC setting routine for setting the target state SOC* based on the vehicle speed V and its variation ΔV.

In the power output apparatus 10 of the embodiment, the target state SOC* is calculated to be proportional to the product of the mean vehicle speed Va and the mean variation ΔVa. In case that more importance is attached to the current driving condition of the vehicle, the target state SOC* may be calculated to be proportional to the product of the vehicle speed V and the variation ΔVa. In this case, that target state SOC* is set according to another target SOC setting routine shown in the flowchart of FIG. 7. The target SOC setting routine of FIG. 7 is similar to that of FIG. 5, except that the calculation of the mean vehicle speed Va and the mean variation ΔVa is omitted and that the target state SOC* is calculated according to the equation of SOC*=Kv×ΔV×V, wherein Kv denotes a proportionality factor. The structure of determining the target state SOC* based on the product of the vehicle speed V and the variation ΔV enables the state SOC of the battery 60 to be controlled according to the current driving condition of the vehicle.

The power output apparatus 10 of the first embodiment defines the current driving condition and the expected driving condition of the vehicle, which relate to the charge-discharge amount of the battery 60, by the mean variation ΔVa and the mean vehicle speed Va and calculates the target state SOC* from these values. Another possible structure may define the current driving condition and the expected driving condition of the vehicle, which relate to the charge-discharge amount of the battery 60, by a variation in step-on amount of the accelerator pedal 63 and calculate the target state SOC* from the variation. The flowchart of FIG. 8 shows a target SOC setting routine applicable in such a case.

Figure 8:
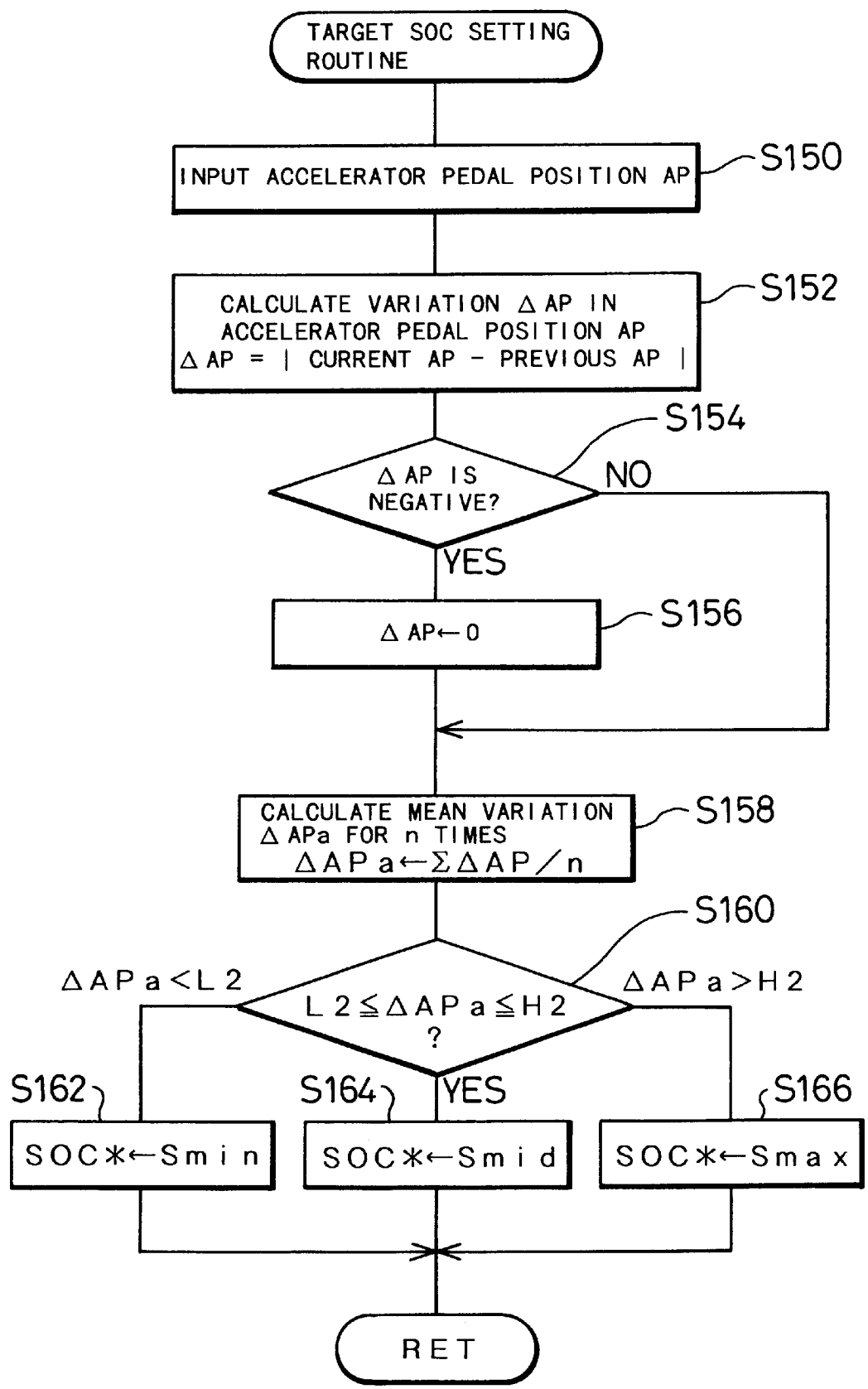
FIG. 8 is a flowchart showing still another target SOC setting routine for setting the target state SOC* based on the mean variation ΔAPa in accelerator pedal position AP.

When the program enters the routine of FIG. 8, the CPU 80a of the ECU 80 first reads the accelerator pedal position AP as the step-on amount of the accelerator pedal 63 measured by the accelerator pedal position sensor 64 at step S150, and calculates a variation ΔAP of the accelerator pedal position AP by subtracting the previous accelerator pedal position AP read in a previous cycle of this routine from the currently input accelerator pedal position AP at step S152. In case that the calculated variation ΔAP is negative at step S154, the variation ΔAP is reset to zero at step S156. Since this structure takes into account only the step-on amount of the accelerator pedal 63 for the determination of the target state SOC*, the negative variation ΔAP is reset to zero. At subsequent step S158, a mean variation ΔAPa is obtained by dividing the summation of the past data of the variation ΔAP calculated in the cycle of (n−1) times before the current cycle to the variation ΔAP calculated in the current cycle by n. The calculated mean variation ΔAPa is compared with a lower threshold value L2 and a higher threshold value H2 at step S160. In case that the mean variation ΔAPa is smaller than the lower threshold value L2, a minimum value Smin is set to the target state SOC* at step S162. In case that the mean variation ΔAPa is not smaller than the lower threshold value L2 and not greater than the higher threshold value H2, a medium value Smid is set to the target state SOC* at step S164. In case that the mean variation ΔAPa is greater than the higher threshold value H2, a maximum value Smax is set to the target state SOC* at step S166. After the execution of one of steps S162 through S166, the program exits from this routine. The lower threshold value L2 and the higher threshold value H2 are used to specify the current driving condition and the expected driving condition of the vehicle based on the mean variation ΔAPa, and depend upon the use of the vehicle and the play of the accelerator pedal 63.

As discussed above, the current driving condition and the expected driving condition of the vehicle relating to the charge-discharge amount of the battery 60 may be defined by the mean variation ΔAPa of the step-on amount of the accelerator pedal 63. The state SOC of the battery 60 is then controlled according to the mean variation ΔAPa. This modified structure compares the mean variation ΔAPa with the lower threshold value L2 and the higher threshold value H2 and sets the target state SOC* equal to one of the minimum value Smin, the medium value Smid, and the maximum value Smax. A further modification may calculate the target state SOC* according to the equation of SOC*= Kap×ΔAPa, wherein Kap denotes a proportionality factor, and restrict the lower limit and the upper limit of the target state SOC* to the minimum value Smin and the maximum value Smax, in the same manner as the target SOC setting routine of FIG. 5. The torque or the power required for the drive shaft 70 is calculated from the step-on amount of the accelerator pedal 63. Another modified structure may thus define the current driving condition and the expected driving condition of the vehicle, which relate to the charge-discharge amount of the battery 60, by a variation in torque or power required for the drive shaft 70, in place of by the variation ΔAP of the accelerator pedal position AP, and control the state SOC of the battery 60 according to the variation in required torque or power.

Figure 9:
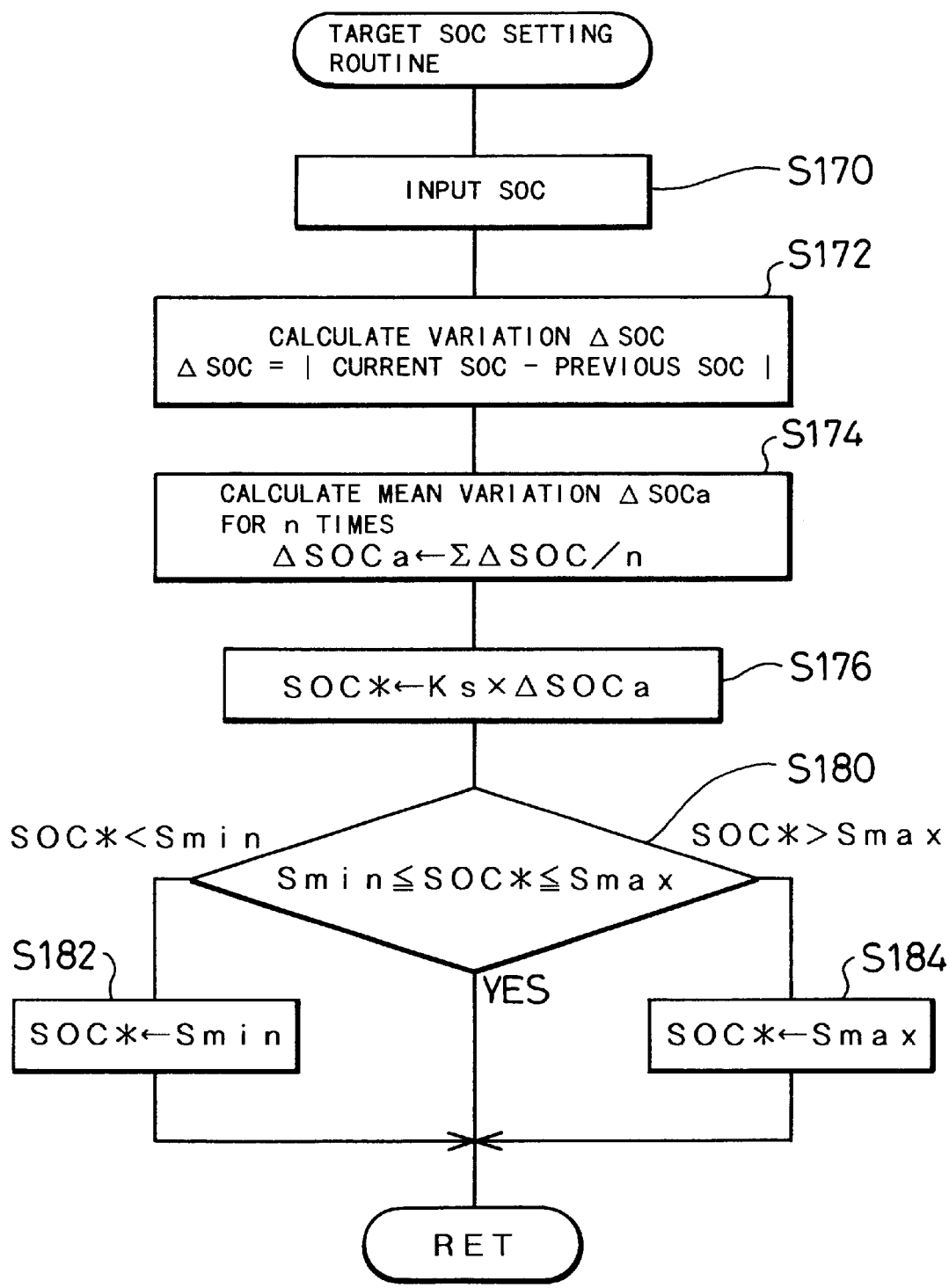
FIG. 9 is a flowchart showing another target SOC setting routine for setting the target state SOC* based on the mean variation ΔSOCa in state SOC of the battery 60.

Still another modified structure defines the current driving condition and the expected driving condition of the vehicle, which relate to the charge-discharge amount of the battery 60, by a variation ΔSOC in state SOC of the battery 60, in place of the vehicle speed V and the variation ΔV or the variation ΔAP in step-on amount of the accelerator pedal 63. In this case, the target state SOC* is calculated from N; the variation ΔSOC in state SOC of the battery 60 as shown in still another target SOC setting routine of FIG. 9. The target SOC setting routine of FIG. 9 is similar to that of FIG. 5, except that the target state SOC* is calculated from a mean variation ΔSOCa of the state SOC of the battery 60, instead of from the mean vehicle speed Va and the mean variation ΔVa. When the program enters the routine of FIG. 9, the CPU 80a of the ECU 80 first reads the state SOC of the battery 60 that is calculated from the remaining charge BRM of the battery 60 measured by the remaining charge meter 62 at step S170. The CPU 80a then calculates a variation ΔSOC as the difference between the currently input state SOC and the previous state SOC read in a previous cycle of this routine at step S172, obtains the mean variation ΔSOCa for n times at step S174, and calculates the target state SOC* according to the equation of SOC*=Ks×ΔSOCa, wherein Ks denotes a proportionality factor, at step S176. The calculated target state SOC* is compared with the minimum value Smin and the maximum value Smax at step S180, and the lower limit and the upper limit of the target state SOC* are restricted to the minimum value Smin and the maximum value Smax at steps S182 and S184. Since the variation ΔSOC in state SOC of the battery 60 directly represents the charge-discharge amount of the battery 60, this structure defines the current driving condition and the expected driving condition of the vehicle relating to the charge-discharge amount of the battery 60 with high precision and thereby enables appropriate control of the state SOC of the battery 60.

Figure 10:
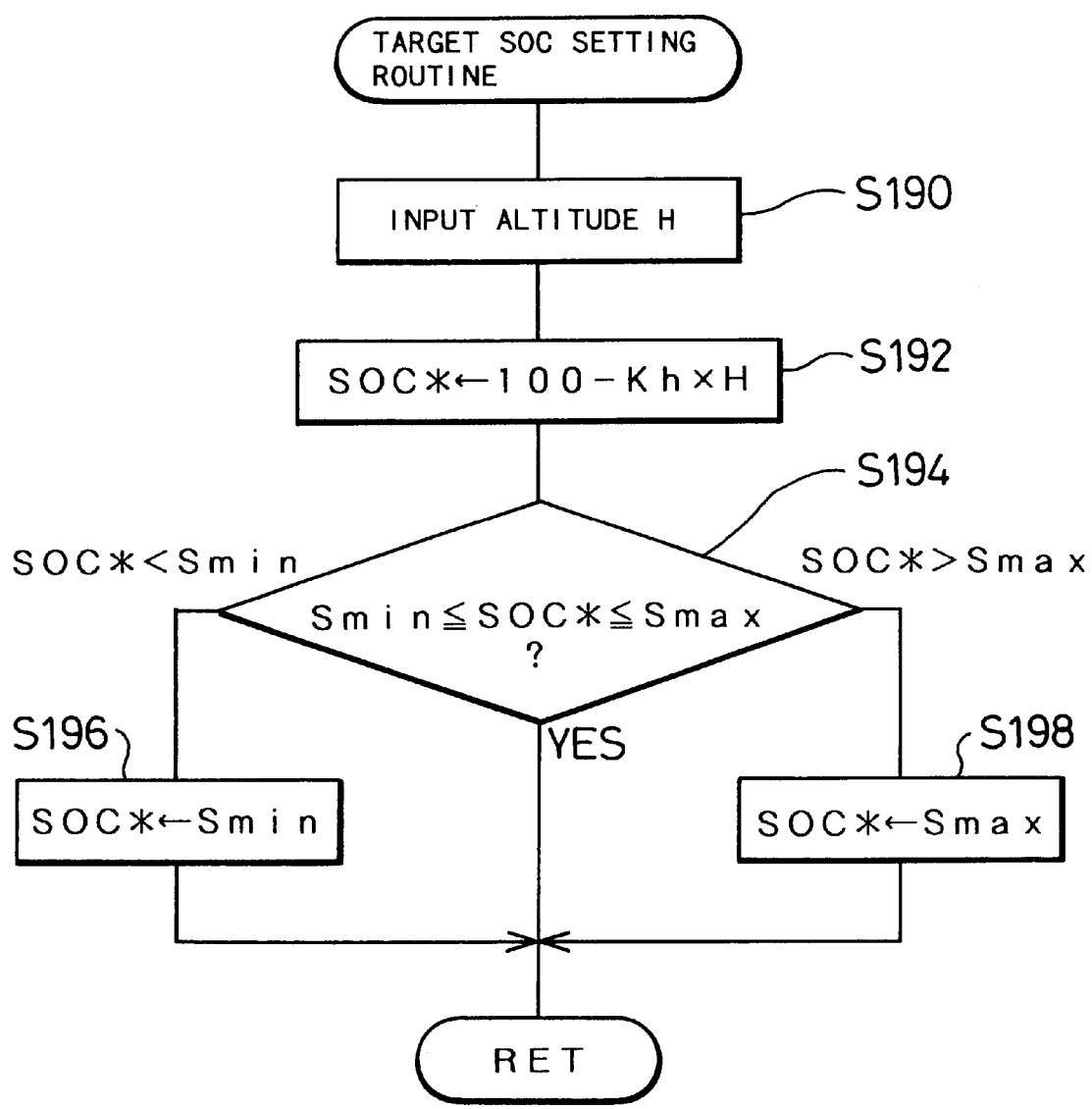
FIG. 10 is a flowchart showing still another target SOC setting routine for setting the target state SOC* based on the driving altitude of the vehicle.

The expected driving condition of the vehicle relating to the charge-discharge amount of the battery 60 may also be defined by the driving altitude H of the vehicle. The higher driving altitude H of the vehicle increases the potential energy of the vehicle, so that a greater amount of regenerated energy can be expected. The flowchart of FIG. 10 shows a target SOC setting routine that specifies the target state SOC* based on the driving altitude H of the vehicle. When the program enters the routine of FIG. 10, the CPU 80a of the ECU 80 first reads the driving altitude H of the vehicle measured by the altimeter 69 at step S190, and calculates the target state SOC* according to the equation of SOC*=100−

Kh×H at step S192, wherein Kh denotes a constant and the target state SOC* is given as percent (%). The calculated target state SOC* is compared with the minimum value Smin and the maximum value Smax at step S194, and the lower limit and the upper limit of the target state SOC* are restricted to the minimum value Smin and the maximum value Smax at steps S196 and S198. This structure defines the expected driving condition of the vehicle relating to the charge-discharge amount of the battery 60 by the driving altitude H of the vehicle with high precision and thereby enables the appropriate control of the state SOC of the battery 60.

In this modified structure, the driving altitude H of the vehicle is measured by the altimeter 69. The driving altitude H of the vehicle may, however, be calculated from the output energy of the engine 20, the charge-discharge energy of the battery 60, the energy consumed by the driving resistance, or the regenerated electric power, obtained from data of an atmospheric pressure sensor, or input from a navigation system.

As discussed above, the current driving condition and the expected driving condition of the vehicle, which relate to the charge-discharge amount of the battery 60, maybe defined by a variety of factors. Like the power output apparatus 10 of the first embodiment and its modified examples, only one factor may be used to define the current driving condition and the expected driving condition of the vehicle relating to the charge-discharge amount of the battery 60 and specify the target state SOC*. A further modification may utilize a combination of two or more factors for the same purpose. This defines the current driving condition and the expected driving condition of the vehicle relating to the charge-discharge amount of the battery 60 with higher precision and thereby enables the more accurate control of the state SOC of the battery 60.

The following describes another power output apparatus 10B as a second embodiment according to the present invention. The power output apparatus 10B of the second embodiment includes a navigation system 90 that communicates with the ECU 80, in addition to the hardware structure of the power output apparatus 10 of the first embodiment. The constituents of the power output apparatus 10B of the second embodiment that are identical with those of the power output apparatus 10 of the first embodiment are shown by the like numerals and not specifically described here. The symbols used in the description of the second embodiment have the same meanings as those in the first embodiment, unless otherwise specified.

Figure 11:
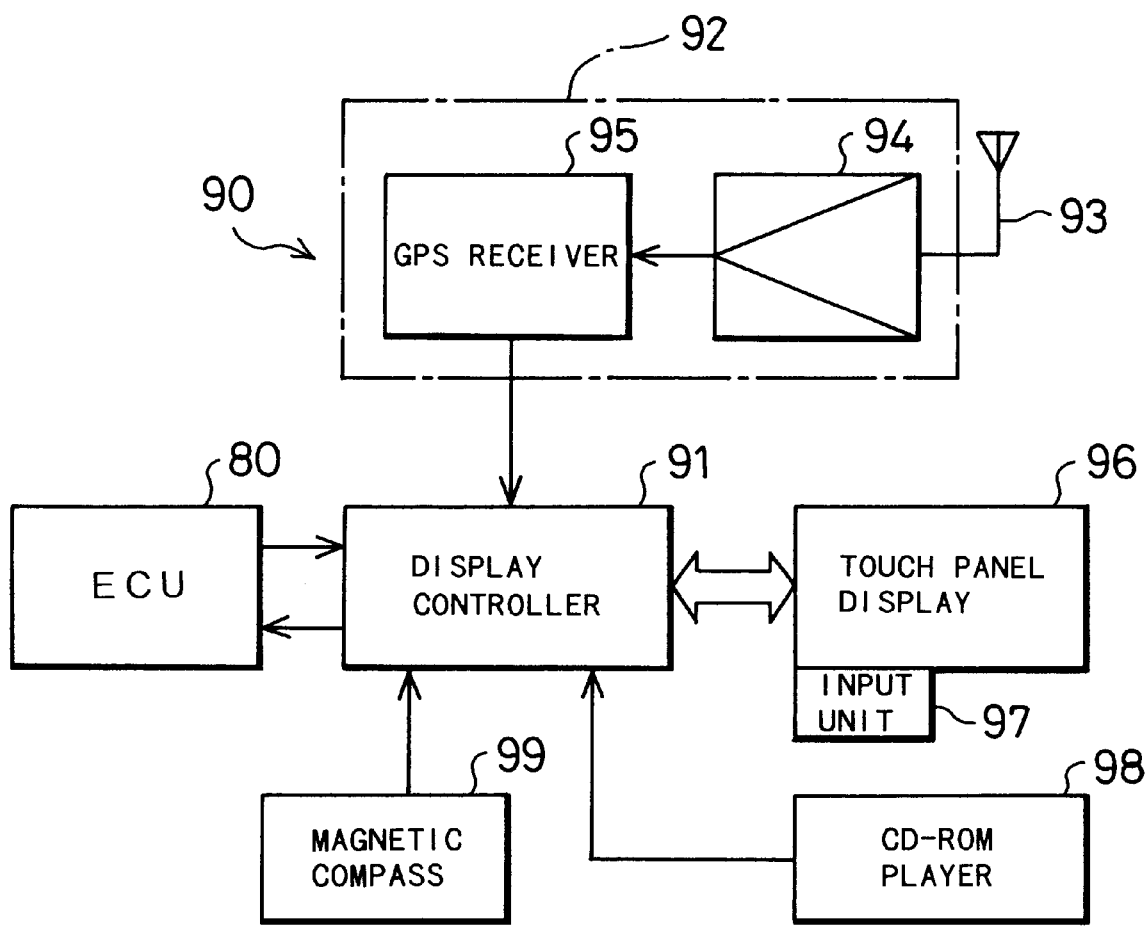
FIG. 11 is a block diagram schematically illustrating structure of a navigation system 90 included in a power output apparatus 10B given as a second embodiment according to the present invention.

FIG. 11 is a block diagram illustrating the navigation system 90 included in the power output apparatus 10B of the second embodiment. The navigation system 90 utilizes the GPS (global positioning system) and the map matching technique. As shown in FIG. 11, the navigation system 90 includes a receiver unit 92 for receiving signals transmitted from a GPS satellite on the earth-circling orbit and calculating a current driving position X and a driving direction Y of the vehicle and the vehicle speed V based on the input signals, a CD-ROM player 98 for reading map information stored in a CD-ROM and outputting the input map information, a touch panel display 96 for displaying the required data, such as the map information and the current driving position X of the vehicle, and receiving inputs of a destination XE and a driving route, and a display controller 91 for controlling these units.

The receiver unit 92 includes a GPS antenna 93 for receiving signals transmitted from the GPS satellite on the earth-circling orbit, an amplifier 94 for amplifying the signals received by the GPS antenna 93, and a GPS receiver 95 for calculating the current driving position X and the driving direction Y of the vehicle and the vehicle speed V based on the amplified signals and outputting the results of calculation to the display controller 91. The CD-ROM layer 98 reads map information stored in the CD-ROM and outputs the input map information to the display controller 91. The map information stored in the CD-ROM includes road information, such as the type of the road, that is, highway or general way, the width of the road, the number of lanes, and the speed limit, district information, for example, an urban district with a large number of traffic lights, a suburban district with a relatively less number of traffic lights, and an up-and-down hill district, and information relating to the height and the slope of the road.

The touch panel display 96 includes an input unit 97 for specifying the destination XE and the driving route. The driver refers to the map displayed on the touch panel display 96 and specifies the destination XE and intermediate places as well as the driving route through operations of the input unit 97. When the driver inputs the destination XE and the intermediate places, the display controller 91 selectively retrieves the shortest route from the current position to the destination XE via the intermediate places and the route using the highway (if available) and displays the retrieved data on the touch panel display 96. The driver examines the displayed route and eventually sets the driving route (by changing the displayed route if necessary).

The display controller 91 displays a map on the touch panel display 96 based on the map information output from the CD-ROM player 98, compares the current driving position X of the vehicle sent from the GPS receiver 95 with the map information output from the CD-ROM player 98, excludes the error between the current driving position X and the map information, and displays the corrected current driving position X of the vehicle on the touch panel display 96. The navigation system 90 of the second embodiment has a magnetic compass 99 for accurately specifying the current driving position X of the vehicle even when the GPS signals from the GPS satellite are blocked, for example, by tall buildings, trees, and mountains. In case that the GPS signals from the GPS satellite are not receivable, the display controller 91 specifies the current driving position X and the driving direction Y of the vehicle based on the signals output from the magnetic compass 99 and parameters, such as a driving distance.

The display controller 91 is connected to the input processing circuit 80f and the output processing circuit 80g of the ECU 80 via signal lines, and outputs the driving data, such as the current driving position X and the driving direction Y of the vehicle and the data on driving route, such as the height and the slope of each position in the route, according to the requirement from the ECU 80.

Figure 12:
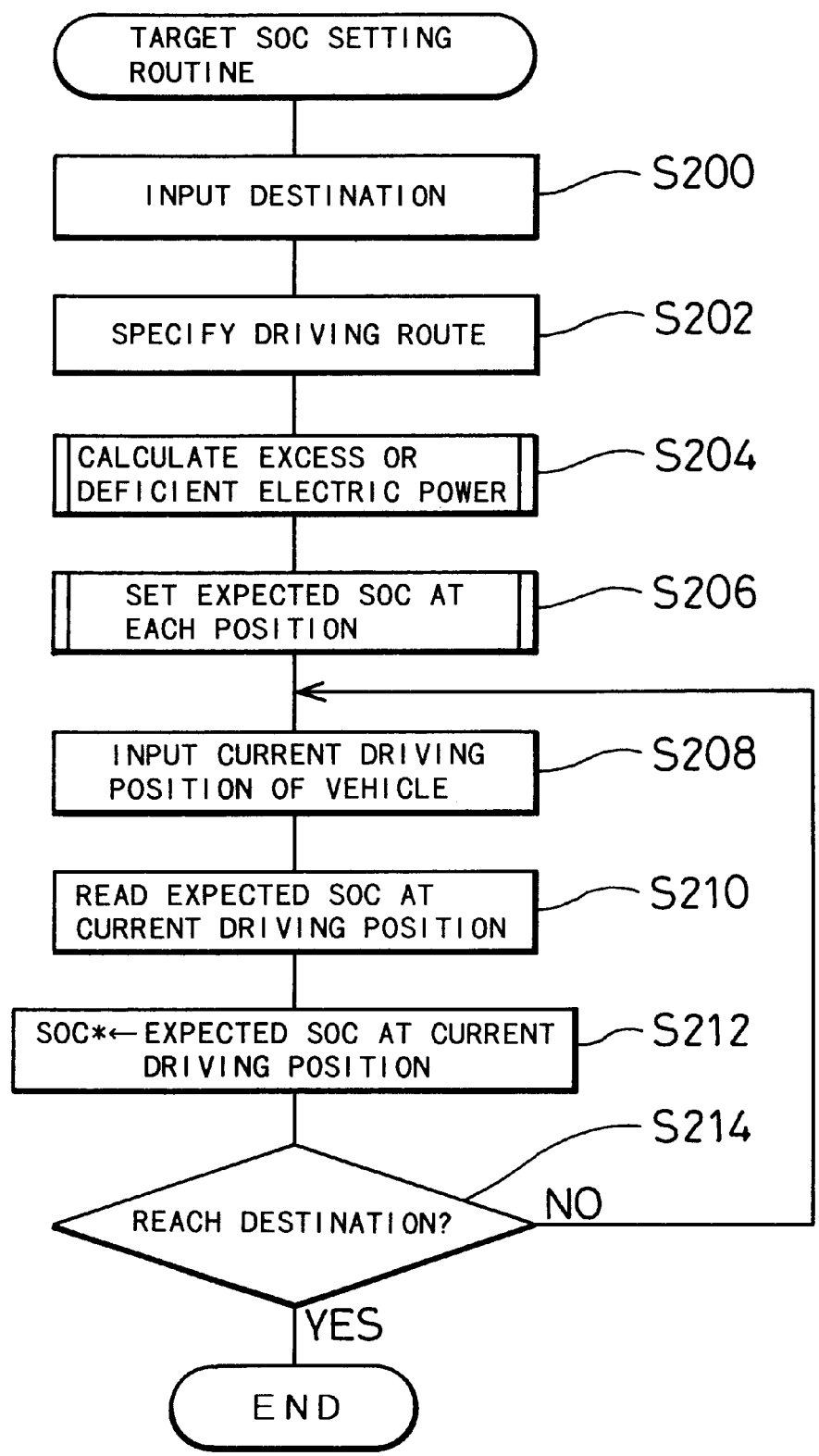
FIG. 12 is a flowchart showing a target SOC setting routine executed by the ECU 80 in the power output apparatus 10B of the second embodiment.

The power output apparatus 10B of the second embodiment carries out a charge-discharge control of the battery 60, based on the charge-discharge control routine of the first embodiment shown in the flowchart of FIG. 4 and a target SOC setting routine shown in the flowchart of FIG. 12. The charge-discharge control routine of FIG. 4 has been discussed in detail in the first embodiment.

In the target SOC setting routine of FIG. 12, when the driver inputs the destination XE and the driving route through operations of the input unit 97 included in the touch panel display 96 of the navigation system 90 at steps S200 and S202, the CPU 80a of the ECU 80 calculates an amount of electric power charged into or discharged from the battery 60 at each position of the driving route as an excess or deficient electric power ΔPW, based on the data on driving route input from the display controller 91 at step S204. The excess or deficient electric power ΔPW is calculated from the product of the electric power consumed or regenerated by the motor 50 and the driving time. The electric power consumed or regenerated by the motor 50 is obtained from the product of the expected output torque from the motor 50 to the drive shaft 70 based on the slope of the driving route and the expected vehicle speed V based on the width, the slope, and the undulation of the roads in the driving route. The driving time is calculated from the driving distance and the vehicle speed V. It is assumed here that the vehicle cruises at a constant speed, when the vehicle continuously runs on the road of a fixed slope. On such an assumption, the driving time can be replaced by the driving distance. The excess or deficient electric power ΔPW can accordingly be calculated from the electric power consumed or regenerated by the motor 50 and the driving distance. By way of example, when the vehicle goes down a slope, the electric power is regenerated according to the slope and the vehicle speed V. The excess or deficient electric power ΔPW on the down slope is thus calculated from the product of the regenerated electric power and the driving distance on the slope. As another example in which the vehicle goes up a slope, in case that the electric power consumed by the motor 50 can be supplied by the electric power generated by the generator 40, there is substantially no discharge from the battery 60 as a whole although the on/off state of the generator 40 switches the state of the battery 60 between the charging state and the discharging state. In this case, the excess or deficient electric power ΔPW is not calculated. In case that the electric power consumed by the motor 50 is greater than the electric power generated by the generator 40, on the other hand, the battery 60 discharges electric power. In this case, the excess or deficient electric power ΔPW on the upward slope is calculated from the product of the electric power discharged from the battery 60 and the driving distance.

Figure 13:
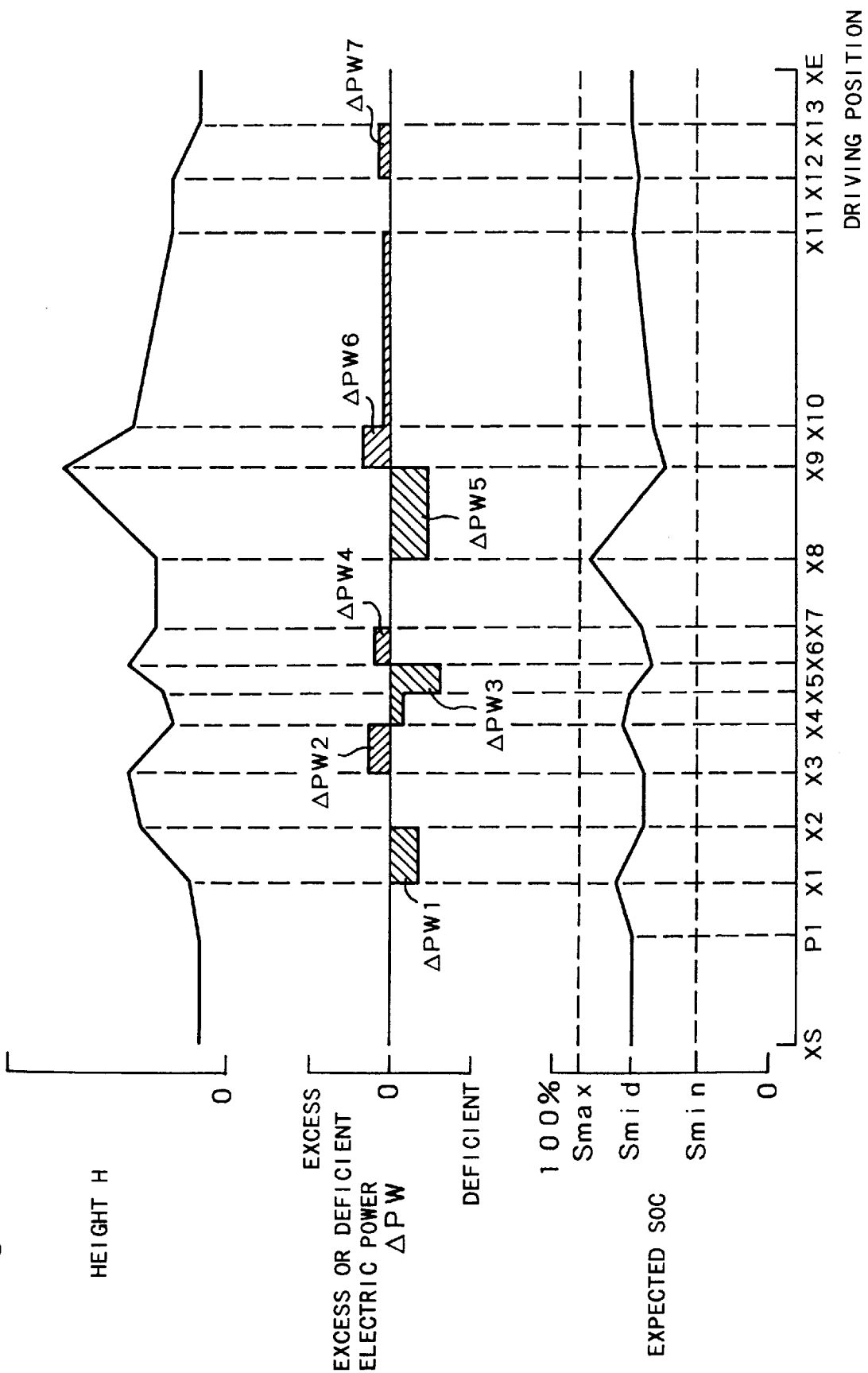
FIG. 13 shows variations in excess or deficient electric power ΔPW and expected SOC plotted against the height H in the driving route.

FIG. 13 shows variations in excess or deficient electric power ΔPW and expected SOC plotted against the height H of the driving route. In the example of FIG. 13, the vehicle goes up a relatively steep slope in a district between intermediate positions X1 and X2. In this district, the electric power consumed by the motor 50 is greater than the electric power generatedby the generator 40, so that an excess or deficient electric power ΔPW1 on the upward slope is calculated from the product of the difference between the consumed electric power and the generated electric power and the driving distance. In a next district between intermediate positions X2 and X3, the vehicle goes up a gentle slope and the electric power consumed by the motor 50 can be supplied by the electric power generated by the generator 40, so that the excess or deficient electric power ΔPW on the upward slope is not calculated. In a district between intermediate positions X4 and X6, an excess or deficient electric power ΔPW3 on the upward slope is calculated. In this district, however, the upward slope and the electric power consumption change at an intermediate position X5, so that the excess or deficient electric power ΔPW3 varies at the intermediate position X5. In a district between the intermediate positions X3 and X4, the vehicle goes down a slope and the motor 50 regenerates electric power according to the down slope. An excess or deficient electric power ΔPW2 on the down slope is thus calculated from the product of the regenerated electric power and the driving distance. In a district between intermediate positions X9 and X11, an excess or deficient electric power ΔPW6 on the down slope is calculated. In this district, however, the down slope and the regenerated electric power change at an intermediate position X10, so that the excess or deficient electric power ΔPW6 varies at the intermediate position X10.

Referring back to the flowchart of FIG. 12, after calculating the excess or deficient electric power ΔPW in this manner, the CPU 80a of the ECU 80 sets the target state SOC* at each position in the driving route as an expected SOC, based on the calculated excess or deficient electric power ΔPW at step S206. The processing of step S206 sets the expected SOC to satisfy the following conditions:

(1) The state SOC of the battery 60 is kept in the appropriate range between the minimum value Smin and the maximum value Smax even when the battery 60 is charged with or discharges the excess or deficient electric power ΔPW;

(2) The state SOC of the battery 60 is set equal to a predetermined value (the intermediate value Smid in the embodiment) included in the above appropriate range on a middle of the district having the fixed excess or deficient electric power ΔPW (for example, on a middle of the district between the intermediate positions X1 and X2 having the excess or deficient electric power ΔPW1 in FIG. 13);

(3) Data of the expected SOC in each district constitute a smooth curve; and (4) The state SOC of the battery 60 is set equal to a predetermined value (the intermediate value Smid in the embodiment) included in the above appropriate range in the district where no excess or deficient electric power ΔPW is calculated.

The process of setting the expected SOC is described concretely in the example of FIG. 13. In the district between the intermediate positions X1 and X2 having the first calculated excess or deficient electric power ΔPW1, the expected SOC is set to make the state SOC of the battery 60 equal to the intermediate value Smid on the middle of the district. The slope of the expected SOC curve in the district depends upon the charge and discharge of the excess or deficient electric power ΔPW1. Since the district between the intermediate positions X1 and X2 represents an upward slope, the expected SOC curve has a right-down slope. When the expected SOC is set at the intermediate position X1, a position P1 where the battery 60 starts charging is specified according to the chargeable electric power under the road condition of the driving route before the intermediate position X1 and the required charging amount in order to set the state SOC of the battery 60 from the intermediate value Smid to the expected SOC. The expected SOC from the position P1 to the intermediate position X1 is then set based on the chargeable electric power. In a district from a starting position XS to the position P1, the excess or deficient electric power ΔPW is not calculated, so that the expected SOC is set equal to the intermediate value Smid. Like in the district between the intermediate positions X1 and X2, in the district between the intermediate positions X3 and X4 having the calculated excess or deficient electric power ΔPW2, the expected SOC is set to make the state SOC of the battery 60 equal to the intermediate value Smid on the middle of the district. Since the district between the intermediate positions X3 and X4 represents a down slope, the expected SOC curve has a right-up slope.

In the district between the intermediate positions X2 and X3, that is, between the excess or deficient electric power ΔPW1 and the excess or deficient electric power ΔPW2, the excess or deficient electric power ΔPW is not calculated, and the expected SOC is supposed to be set equal to the intermediate value Smid. The driving distance in this district is, however, rather short, so that the expected SOC is actually set to connect smoothly with the expected SOC set at the intermediate position X3. In the district between the intermediate positions X4 and X7, the excess or deficient electric power ΔPW is calculated successively. The expected SOC is accordingly set, based on the excess or deficient electric powers ΔPW3 and ΔPW4 calculated from the expected SOC set at the intermediate position X4. After the expected SOC has been set for all the districts after the intermediate position X7 in this manner, the CPU 80*a* determines whether or not the expected SOC curve in all the districts is within the appropriate range of the minimum value Smin to the maximum value Smax. In case that the expected SOC curve is within the appropriate range, the program concludes the process of setting the expected SOC. In case that the expected SOC curve is partly out of the appropriate range, on the other hand, the expected SOCs out of the appropriate range are restricted to the minimum value Smin and the maximum value Smax.

Referring back again to the flowchart of FIG. 12, after setting the expected SOC at each position in the driving route, the CPU 80*a* of the ECU 80 receives the current driving position X of the vehicle, which is obtained by the receiver unit 92 of the navigation system 90, from the display controller 91 at step S208. The CPU 80*a* reads the expected SOC set at the input current driving position X at step S210 and sets the expected SOC to the target state SOC* at step S212. The CPU 80*a* subsequently determines at step S214 whether or not the vehicle has reached the destination XE, based on the current driving position X. The processing of steps S208 through S214 is repeatedly executed to set the expected SOC at the current driving position X to the target state SOC* until the vehicle reaches the destination XE.

In this manner, the power output apparatus 10B of the second embodiment sets the expected SOC at the current driving position X of the vehicle to the target state SOC* and carries out the charge-discharge control routine shown in the flowchart of FIG. 4, thereby enabling the state SOC of the battery 60 to be controlled to the expected SOC set in the driving route.

As discussed above, the power output apparatus 10B of the second embodiment controls the state SOC of the battery 60 according to the road conditions in the driving route. In case that the excess or deficient electric power ΔPW is calculated in a certain district of the driving route, the target state SOC* of the battery 60 is set, in order to enable the battery 60 to be charged with or discharge the calculated excess or deficient electric power ΔPW. This structure enables the battery 60 to be charged with a greater portion of the regenerated electric power and to supply the required and sufficient electric power for driving, thus improving the energy efficiency of the whole apparatus. The navigation system 90 that informs the driver of the road conditions in the driving route and the current driving position X of the vehicle ensures accurate and fine control.

In the power output apparatus 10B of the second embodiment, the expected SOC is set to make the state SOC of the battery 60 equal to the intermediate value Smid in the district where no excess or deficient electric power ΔPW is calculated. A modified structure may set the expected SOC equal to a predetermined value that depends upon the charge-discharge efficiency of the battery 60, the type of the road, that is, a highway or a general way, the district information, such as an urban district or a suburban district, and the altitude (height) of the current driving position X. This modified structure further improves the energy efficiency.

In the power output apparatus 10B of the second embodiment, after the expected SOC is set for all the districts from the starting position XS to the destination XE, in case that the expected SOC curve is partly out of the appropriate range between the minimum value Smin and the maximum value Smax, the expected SOCs out of the appropriate range are restricted to the minimum value Smin and the maximum value Smax. Another possible structure may not restrict the expected SOCs out of the appropriate range to the minimum value Smin and the maximum value. Still another possible structure may displace part of the expected SOC curve, which can be set independently in a specific district and includes the expected SOCs out of the appropriate range, in parallel to be kept within the appropriate range.

In the power output apparatus 10B of the second embodiment, when the excess or deficient electric power ΔPW is calculated successively over a plurality of districts, the expected SOC in the first district is set to make the state SOC of the battery 60 equal to the intermediate value Smid on the middle of the first district. The expected SOC in the following districts is then specified, based on the expected SOC set in the first district. One modified structure sets the expected SOC to make the state SOC of the battery 60 equal to the intermediate value Smid on the middle of the plurality of districts. Another modified structure sets the expected SOC to make the state SOC of the battery 60 equal to the intermediate value Smid on the middle of a specific district having the largest absolute value of the calculated excess or deficient electric power ΔPW.

The following describes a power output apparatus 10C as a third embodiment according to the present invention. The hardware structure of the power output apparatus 10C of the third embodiment is identical with the hardware structure of the power output apparatus 10B of the second embodiment. The constituents of the power output apparatus 10C of the third embodiment are thus shown by the like numerals and not specifically described here. The symbols used in the description of the third embodiment have the same meanings as those in the first and the second embodiments, unless otherwise specified.

Figure 14:
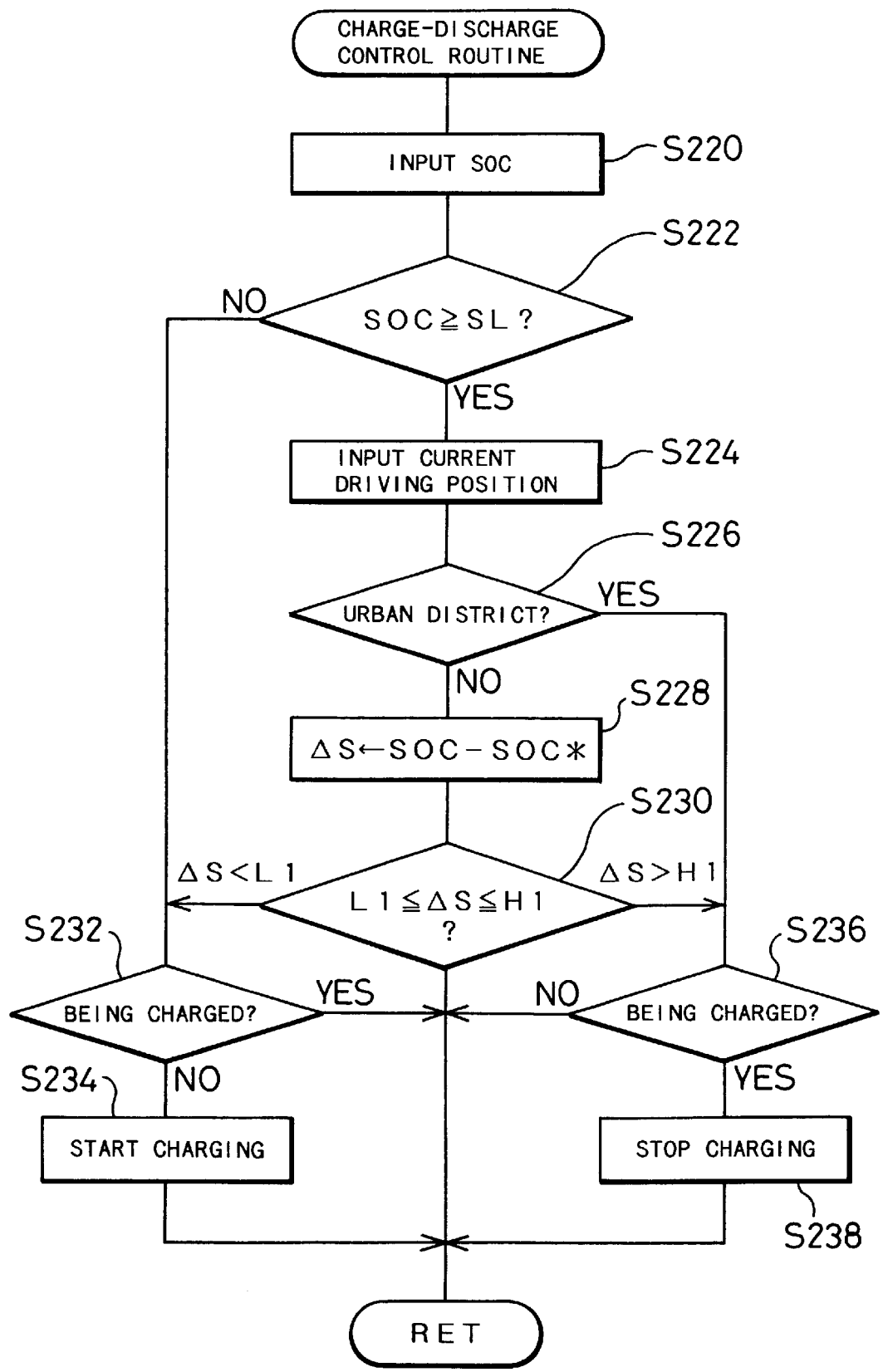
FIG. 14 is a flowchart showing a charge-discharge control routine executed by the ECU 80 in a power output apparatus 10C given as a third embodiment according to the present invention.
Figure 15:
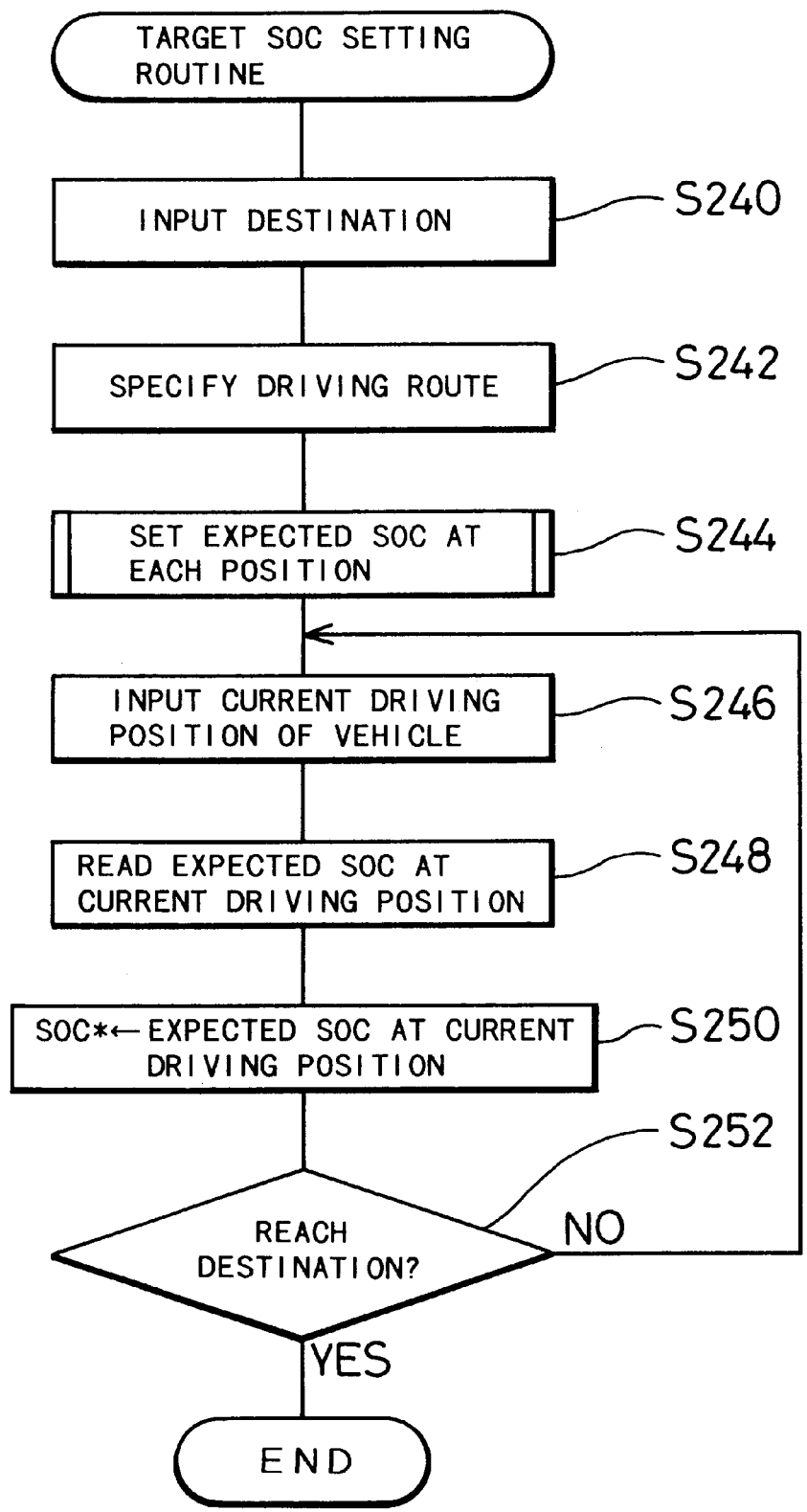
FIG. 15 is a flowchart showing a target SOC setting routine executed by the ECU 80 in the power output apparatus 10C of the third embodiment.

The power output apparatus 10C of the third embodiment carries out a charge-discharge control of the battery 60, based on a charge-discharge control routine shown in the flowchart of FIG. 14 and a target SOC setting routine shown in the flowchart of FIG. 15. When the program enters the routine of FIG. 14, the CPU 80*a* of the ECU 80 first reads the state SOC of the battery 60 at step S220 and compares the input state SOC with a threshold value SL at step S222. The threshold value SL is used to determine whether or not the battery 60 requires forcible charging, and is set equal to the lower limit of the appropriate range of the state SOC of the battery 60 or a smaller value. In case that the state SOC of the battery 60 is less than the threshold value SL at step S222, the program determines that the battery 60 requires forcible charging and drives the engine 20 to start charging the battery 60 at step S234 when the battery 60 is not in the charging state at step S232.

In case that the state SOC of the battery 60 is not less than the threshold value SL at step S222, on the other hand, the CPU 80*a* reads the current driving position X of the vehicle and the district information regarding the current driving position X at step S224 and determines whether or not the current driving position X is in an urban district or not at step S226. In case that the current driving position X is in an urban district, the program ceases operation of the engine 20 to stop the charging operation of the battery 60 at step S238 when the battery 60 is still in the charging state at step S236. This control procedure enables the vehicle to be driven by the motor 50 under the ceased condition of the engine 20, thereby reducing smog in the urban district. When the state SOC of the battery 60 decreases to be less than the threshold value SL, operation of the engine 20 is resumed to start charging the battery 60, irrespective of which district the current driving position X exists. This structure effectively prevents the battery 60 from being fully discharged in the urban district.

In case that the current driving position X is not in an urban district at step S226, on the contrary, the program carries out the processing of steps S228 through S238, which is identical with the processing of steps S102 through S108 in the charge-discharge control routine of the first embodiment shown in the flowchart of FIG. 4 and is thus not discussed here.

Figure 16:
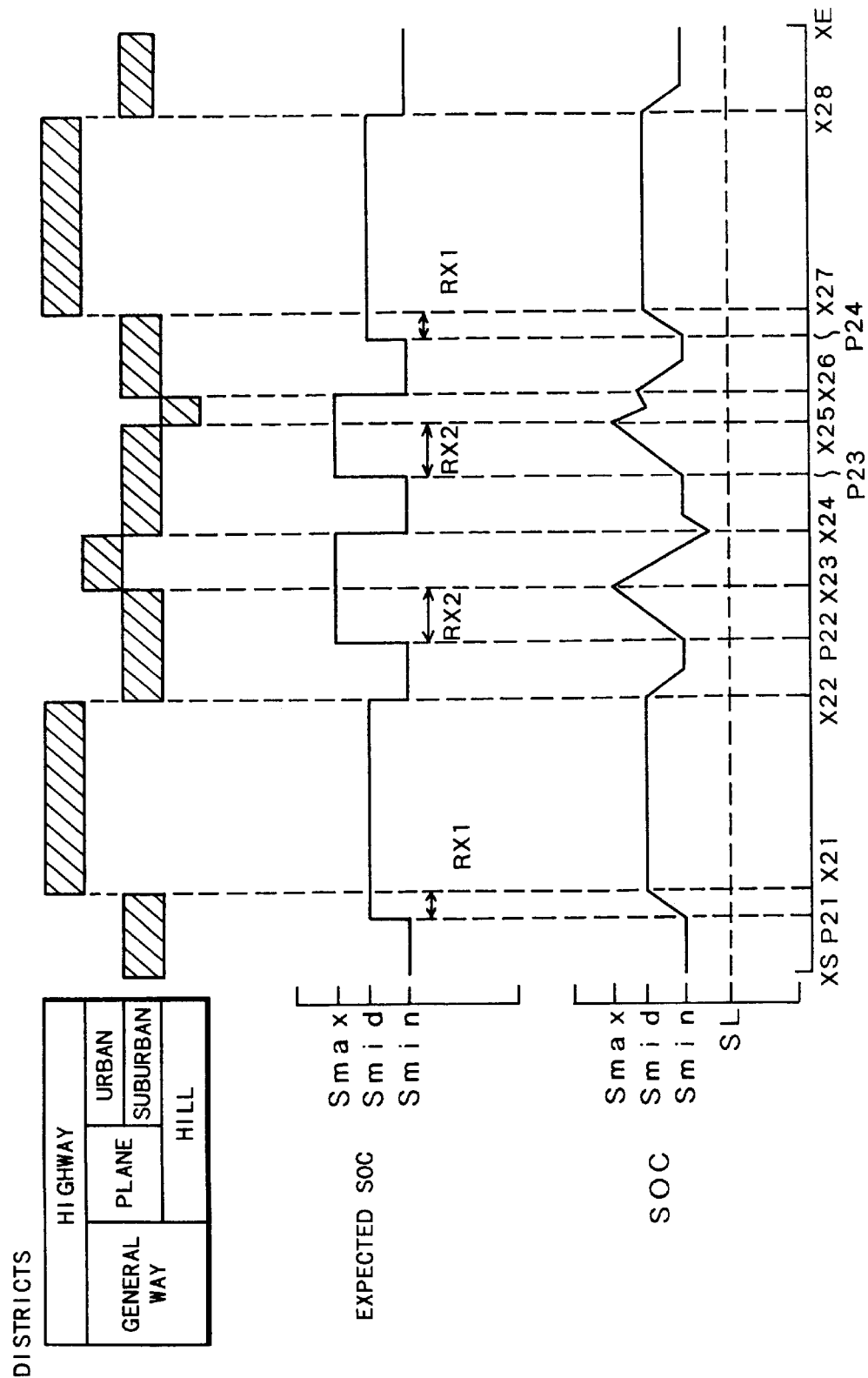
FIG. 16 shows variations in expected SOC and state SOC of the battery 60 along the districts of the driving route.

In the third embodiment, the target state SOC* of the battery 60 is set according to the target SOC setting routine shown in the flowchart of FIG. 15. In the routine of FIG. 15, when the driver inputs the destination XE and the driving route through operations of the input unit 97 included in the touch panel display 96 of the navigation system 90 at steps S240 and S242, the CPU 80a of the ECU 80 sets the expected SOC at each position in the driving route, based on the district information of the driving route input from the CD-ROM player 98 via the display controller 91 at step S244. The expected SOC depends upon the type of the district in the driving route, that is, a highway or a general way, and an urban district, a plane suburban district, or a hill district in the case of the general way. In this embodiment, the expected SOC is set equal to the intermediate value Smid on the highway, where the vehicle runs under the condition of a relatively large charge-discharge amount of the battery 60. The expected SOC is set equal to the maximum value Smax in an urban district, where the battery 60 mainly discharges electric power to reduce smog. The expected SOC is set equal to the minimum value Smin, which realizes the high charge-discharge efficiency of the battery 60, in a plane suburban district on the general way, where the vehicle runs under the condition of a relatively small charge-discharge amount of the battery 60. The expected SOC is set equal to the maximum value Smax in a hill district, where the vehicle runs under the condition of a large discharge from the battery 60. The expected SOC is raised at a predetermined distance before the border between the districts of a lower expected SOC and a higher expected SOC, so that the state SOC of the battery 60 can be equal to the higher expected SOC on the border. FIG. 16 shows variations in expected SOC and state SOC of the battery 60 along the districts of the driving route. The process of setting the expected SOC in the third embodiment is further described with the drawing of FIG. 16.

The district from a starting position XS to an intermediate position X21 represents a plane suburban district, so that the expected SOC is basically set equal to the minimum value Smin, which realizes high charge-discharge efficiency of the battery 60. In the next district between intermediate positions X21 and X22 which represents a highway, the expected SOC is set equal to the intermediate value Smid that is greater than the minimum value Smin. The intermediate position X21 accordingly represents the border where the expected SOC is increased from the minimum value Smin to the intermediate value Smid. The expected SOC is thus raised at a predetermined distance before the intermediate position X21, in order to enable the state SOC of the battery 60 to be equal to the intermediate value Smid at the intermediate position X21. In accordance with a concrete procedure, the expected SOC is set equal to the intermediate value Smid at a position P21, which is a predetermined distance RX1 before the intermediate position X21. The predetermined distance RX1 represents a required driving distance for varying the state SOC of the battery 60 from the minimum value Smin to the intermediate value Smid. At an intermediate position X23, the expected SOC is increased from the minimum value Smin to the maximum value Smax. In this case, the expected SOC is set equal to the maximum value Smax at a position P22, which is a predetermined distance RX2 before the intermediate position X23. The predetermined distance RX2 represents a required driving distance for varying the state SOC of the battery 60 from the minimum value Smin to the maximum value Smax. In a similar manner, the expected SOC is raised respectively at positions that are predetermined distances before intermediate positions X25 and X27. It is, however, not required to reset the expected SOC at specific positions that are predetermined distances before intermediate positions X22, X24, X26, and X28, since they are borders between a higher expected SOC and a lower expected SOC.

Referring back to the flowchart of FIG. 15, after setting the expected SOC at each position in the driving route, the program repeatedly executes the processing of steps S246 through S252 until the vehicle reaches the destination XE. This process sets the expected SOC at the current driving position X of the vehicle to the target state SOC* and is identical with the processing of steps S208 through S214 in the target SOC setting routine of the second embodiment shown in the flowchart of FIG. 12.

The charge-discharge control of the battery 60 varies the state SOC of the battery 60, for example, as shown in FIG. 16. When the vehicle runs in the district from the starting position XS to the position P21 that represents a plane suburban district, the minimum value Smin is set to the target state SOC*, so that the battery 60 is controlled to have the state SOC equal to the minimum value Smin. At the position P21 that is still in the plane suburban district, since the vehicle is i-h expected to start running on the highway at the position that is the predetermined distance RX1 ahead, the intermediate value Smid, which corresponds to the expected SOC on the highway, is set to the target state SOC*. The battery 60 starts charging at the position P21, and the state SOC of the battery 60 accordingly becomes equal to the intermediate value Smid at the intermediate position X21, which corresponds to the entrance of the highway. While the vehicle runs on the highway, the intermediate value Smid is set to the target state SOC*, so that the battery 60 is controlled to have the state SOC equal to the intermediate value Smid. After the intermediate position X22, the vehicle again runs in a plane suburban district, and the minimum value Smin is set to the target state SOC*, so that the battery 60 is controlled to have the state SOC equal to the minimum value Smin.

At the position P22 that is still in the plane suburban district, since the vehicle is expected to start running in an urban district at the position that is the predetermined distance RX2 ahead, the maximum value Smax, which corresponds to the expected SOC in the urban district, is set to the target state SOC*. The battery 60 starts charging at the position P22, and the state SOC of the battery 60 accordingly becomes equal to the maximum value Smax at the intermediate position X23, which corresponds to the entrance of the urban district. While the vehicle runs in the urban district, the maximum value Smax is set to the target state SOC*. The processing of steps S226, S236, and S238 in the charge-discharge control routine of FIG. 14 is, however, carried out under such a driving condition to cease the operation of the engine 20 and thereby stop the charging operation of the battery 60. This gradually decreases the state SOC of the battery 60. When the state SOC of the battery 60 decreases to be less than the threshold value SL, even when the vehicle runs in the urban district, the processing of steps S222, S232, and S234 in the charge-discharge control routine of FIG. 14 is carried out to drive the engine 20 and thereby start charging the battery 60.

At the position P23 that is still in the plane suburban district, since the vehicle is expected to start running in a hill district at the position that is the predetermined distance RX2 ahead, the maximum value Smax, which corresponds to the expected SOC in the hill district, is set to the target state SOC*. The battery 60 starts charging at the position P23, and the state SOC of the battery 60 accordingly becomes equal to the maximum value Smax at the intermediate position X25, which corresponds to the entrance of the hill district. While the vehicle runs in the hill district, the maximum value Smax is set to the target state SOC*. In the hill district, the vehicle may fall into the driving state that the electric power consumed by the motor 50 is greater than the electric power generated by the generator 40. The state SOC of the battery 60 is accordingly varied according to the difference between the electric power generated by the generator 40 and the electric power consumed by the motor 50.

As discussed above, the power output apparatus 10C of the third embodiment controls the state SOC of the battery 60 based on the driving conditions in the driving route. When the vehicle runs in a plane suburban district, which requires the driving condition of a relatively small charge-discharge amount of the battery 60, the state SOC of the battery 60 is controlled to a lower value, in order to enhance the charge-discharge efficiency of the battery 60. When the vehicle runs on a highway, which requires the driving condition of a relatively large charge-discharge amount of the battery 60, the state SOC of the battery 60 is controlled to an intermediate value, in order to realize a large charge-discharge amount. When the vehicle is expected to run in an urban district or a hill district, which requires the driving condition of a large discharge from the battery 60, the state SOC of the battery 60 is controlled to enable a large amount of discharge before the vehicle reaches the position corresponding to the entrance of the urban district or the hill district. This structure enables the battery 60 to be charged with a greater portion of the regenerated electric power and to supply the required and sufficient electric power for driving, thus improving the energy efficiency of the whole apparatus.

In the power output apparatus 10C of the third embodiment, the predetermined distances RX1 and RX2 represent the required driving distances for varying the state SOC of the battery 60 from the minimum value Smin to the intermediate value Smid and the maximum value Smax. The predetermined distances RX1 and RX2 may alternatively be calculated according to the road conditions in the driving route.

In the power output apparatus 10C of the third embodiment, the driving route is divided into four districts, a highway, an urban district, a plane suburban district, and a hill district, and the expected SOC is set in the respective districts. The driving route may, however, be divided into any number of districts. For example, each of the above four districts is further divided into a cold area and a warm area; this totals eight districts. A tunnel district may further be added to these eight districts. In this structure, the expected SOCs in the respective districts in the cold area may be set to be higher than the expected SOCs in the corresponding districts in the warm area. In the tunnel district, the expected SOC is set equal to the maximum value Smax like the urban district, while the engine 20 stops operation.

The power output apparatus 10C of the third embodiment sets a fixed value as the expected SOC in each district. A modified structure may set the expected SOC according to the road conditions in the driving route. In this structure, the expected SOC may be varied even in the same district.

The following describes a power output apparatus 10D as a fourth embodiment according to the present invention. The hardware structure of the power output apparatus 10D of the fourth embodiment is identical with the hardware structure of the power output apparatus 10B of the second embodiment. The constituents of the power output apparatus 10D of the fourth embodiment are thus shown by the like numerals and not specifically described here. The symbols used in the description of the fourth embodiment have the same meanings as those in the first through the third embodiments, unless otherwise specified.

Figure 17:
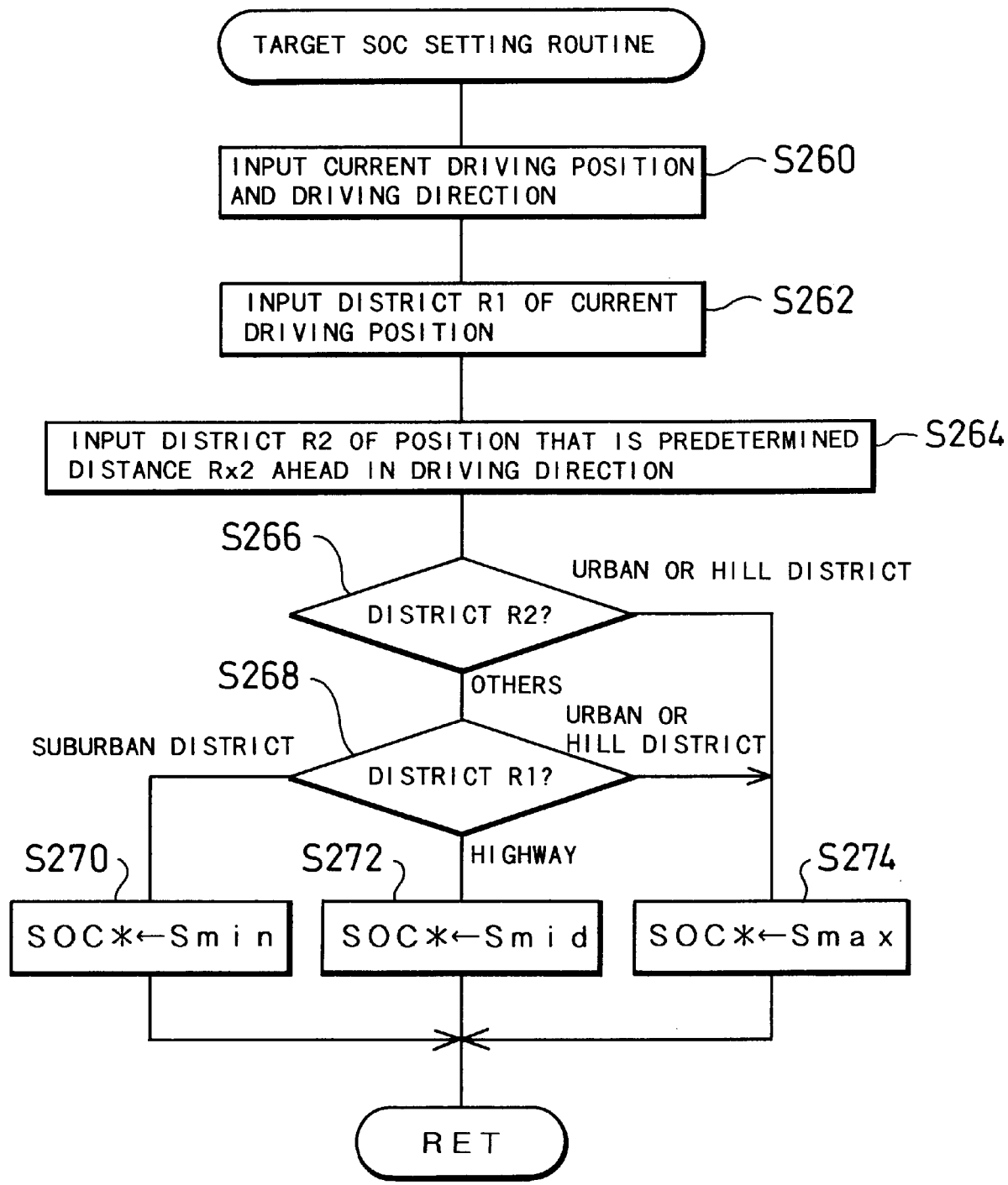
FIG. 17 is a flowchart showing a target S0C setting routine executed by the ECU 80 in a power output apparatus 10D given as a fourth embodiment according to the present invention.

The power output apparatus 10D of the fourth embodiment carries out a charge-discharge control of the battery 60, based on the charge-discharge control routine of the third embodiment shown in the flowchart of FIG. 14 and a target SOC setting routine shown in the flowchart of FIG. 17. The charge-discharge control routine of FIG. 14 has been discussed in detail in the third embodiment.

The target SOC setting routine of FIG. 17 is repeatedly executed at predetermined time intervals, for example, at every 100 msec, after a start of the vehicle upon condition that the driver does not set the driving route with the navigation system 90. When the program enters the routine of FIG. 17, the CPU 80a of the ECU 80 first reads the current driving position X and the driving direction Y of the vehicle from the navigation system 90 at step S260, and receives data regarding the district of the current driving position X of the vehicle as well as the district of the position that is a predetermined distance RX2 ahead in the driving direction Y as districts R1 and R2 from the navigation system 90 at steps S262 and S264. The predetermined distance RX2 is identical with the predetermined distance RX2 discussed in the third embodiment and represents a required driving distance for varying the state SOC of the battery 60 from the minimum value Smin to the maximum value Smax.

The CPU 80a then determines whether or not the district R2 that is the predetermined distance RX2 ahead of the current driving position X corresponds to either an urban district or a hill district at step S266. In case that the district R2 is either an urban district or a hill district, the program proceeds to step S274 to set the maximum value Smax to the target state SOC*, irrespective of the type of the district R1 of the current driving position X. This setting enables the state SOC of the battery 60 to become equal to the maximum value Smax while the vehicle runs by the predetermined distance RX2, that is, before the vehicle reaches the position corresponding to the entrance of the urban district or the hill district.

In case that the district R2 that is the predetermined distance RX2 ahead of the current driving position X is neither an urban district nor a hill district, on the other hand, the program proceeds to step S268 to determine the type of the district R1 of the current driving position X, that is, a plane suburban district, a highway, or an urban or hill district. In the case of a plane suburban district, the minimum value Smin that realizes a high charge-discharge efficiency of the battery 60 is set to the target state SOC* at step S270. In the case of a highway, the intermediate value Smid that enables a relatively large charge-discharge amount of the battery 60 to the target state SOC* at step S272. In the case of an urban or hill district, the maximum value Smax that enables a large amount of discharge from the battery 60 is set to the target state SOC* at step S274. This accordingly sets the state SOC of the battery 60 suitable for the driving conditions in the respective districts.

As discussed above, the power output apparatus 10D of the fourth embodiment can control the state SOC of the battery 60 based on the current driving condition and the expected driving condition of the vehicle. When the vehicle runs in a plane suburban district, which requires the driving condition of a relatively small charge-discharge amount of the battery 60, the state SOC of the battery 60 is controlled to a lower value, in order to enhance the charge-discharge efficiency of the battery 60. When the vehicle runs on a highway, which requires the driving condition of a relatively large charge-discharge amount of the battery 60, the state SOC of the battery 60 is controlled to an intermediate value, in order to realize a large charge-discharge amount. When the vehicle is expected to run in an urban district or a hill district, which requires the driving condition of a large discharge from the battery 60, the state SOC of the battery 60 is controlled to enable a large amount of discharge before the vehicle reaches the position corresponding to the entrance of the urban district or the hill district. This structure enables the battery 60 to be charged with a greater portion of the regenerated electric power and to supply the required and sufficient electric power for driving, thus improving the energy efficiency of the whole apparatus.

In the power output apparatus 10D of the fourth embodiment, the target state SOC* of the battery 60 is set based on the two districts, that is, the district R1 of the current driving position X of the vehicle and the district E2 that is the predetermined distance RX2 ahead of the current driving position X. One modified structure sets the target state SOC* based on a plurality of districts that exist in the predetermined distance RX2 from the current driving position X in the driving direction Y. Another modified structure sets the target state SOC* by taking into account two or more districts that are ahead of the current driving position X. These modified structures enable the state SOC of the battery 60 to be controlled more appropriately.

Like in the power output apparatus 10C of the third embodiment, in the power output apparatus 10D of the fourth embodiment, the driving route is divided into four districts, a highway, an urban district, a plane suburban district, and a hill district. The driving route may, however, be divided into any number of districts.

Figure 18:
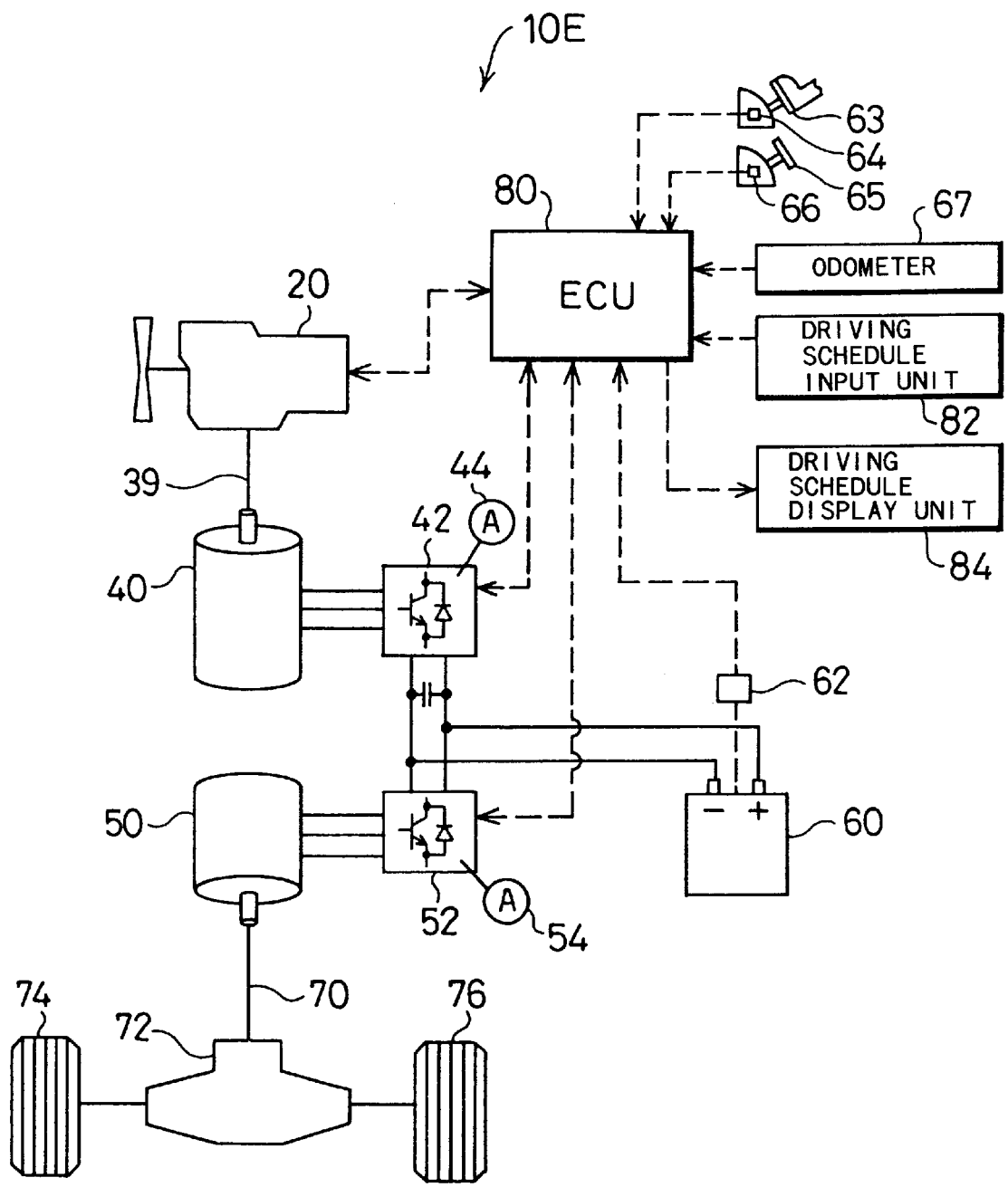
FIG. 18 schematically illustrates structure of a power output apparatus 10E as a fifth embodiment according to the present invention.

The following describes another power output apparatus 10E as a fifth embodiment according to the present invention. FIG. 18 is a block diagram schematically illustrating structure of the power output apparatus 10E of the fifth embodiment. The power output apparatus 10E of the fifth embodiment includes an odometer 67 for measuring a driving distance L from a drive-starting position, a driving schedule input unit 82 for inputting a driving schedule, and a driving schedule display unit 84 for displaying the input driving schedule and the driving distance, in addition to the constituents of the power output apparatus 10 of the first embodiment. The constituents of the power output apparatus 10E of the fifth embodiment that are identical with those of the power output apparatus 10 of the first embodiment are shown by the like numerals and not specifically described here. The symbols used in the description of the fifth embodiment have the same meanings as those in the first through the fourth embodiments, unless otherwise specified.

Figure 19:
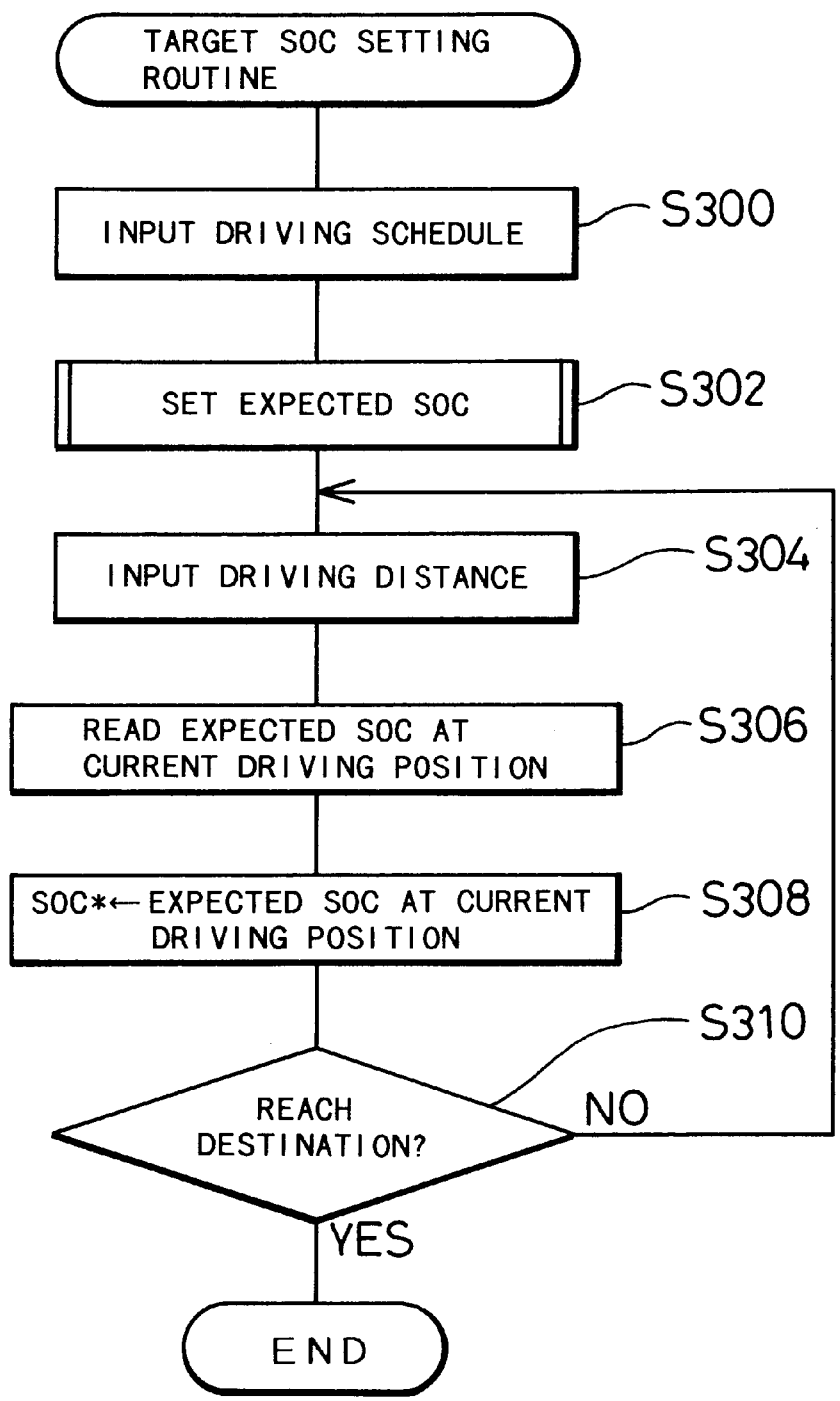
FIG. 19 is a flowchart showing a target SOC setting routine executed by the ECU 80 in the power output apparatus 10E of the fifth embodiment.

The power output apparatus 10E of the fifth embodiment carries out a charge-discharge control of the battery 60, based on the charge-discharge control routine of the third embodiment shown in the flowchart of FIG. 14 and a target SOC setting routine shown in the flowchart of FIG. 19. The charge-discharge control routine of FIG. 14 has been discussed in detail in the third embodiment.

The target SOC setting routine of FIG. 19 is activated and executed when the driver instructs a data input from the driving schedule input unit 82. When the program enters the routine of FIG. 19, the CPU 80*a* of the ECU 80 waits for input of a driving schedule by the driver at step S300. The input data of the driving schedule include the distance from a drive-starting position to a destination, the number of districts from the drive-starting position to the destination, and road information and district information of each district. The input data are stored at a predetermined address in the RAM 80*c* of the ECU 80. When the driver inputs a driving schedule, the CPU 80*a* sets the expected SOC at each position from the drive-starting position to the destination based on the input driving schedule at step S302. The process of setting the expected SOC in the fifth embodiment is identical with the processing of the third embodiment (that is, the processing of step S244 in the target SOC setting routine of FIG. 15) and is thus not described here. The expected SOC may otherwise be calculated and set independently based on the input data, such as road information and district information of each district.

After setting the expected SOC at each position in the driving schedule, the CPU 80*a* of the ECU 80 reads a distance (driving distance) L from the drive-starting position to the current driving position of the vehicle from the odometer 67 at step S304, and reads the expected SOC set at the current driving position of the vehicle, based on the input driving distance L at step S306. The input expected SOC is then set to the target state SOC* at step S308. The program repeatedly executes the processing of steps S304 through S308 until the vehicle reaches the destination at step S310. When the driving distance L becomes equal to the distance from the drive-starting position to the destination, it is determined that the vehicle reaches the destination.

The charge-discharge control carried out in the power output apparatus 10E of the fifth embodiment is similar to the charge-discharge control carried out in the power output apparatus 10C of the third embodiment, except the processing relating to the driving schedule. The contents concretely discussed in the third embodiment with the drawing of FIG. 16 are thus applied to the power output apparatus 10E of the fifth embodiment, and the power output apparatus 10E of the fifth embodiment exerts the same effects as those of the power output apparatus 10C of the third embodiment.

As discussed above, the power output apparatus 10E of the fifth embodiment has a simpler structure than that of the power output apparatus 10C of the third embodiment, (that is, the power output apparatus 10E has the driving schedule input unit 82, the driving schedule display unit 84, and the odometer 67, in place of the navigation system 90) but can exert the same effects as those of the power output apparatus 10C of the third embodiment.

Figure 20:
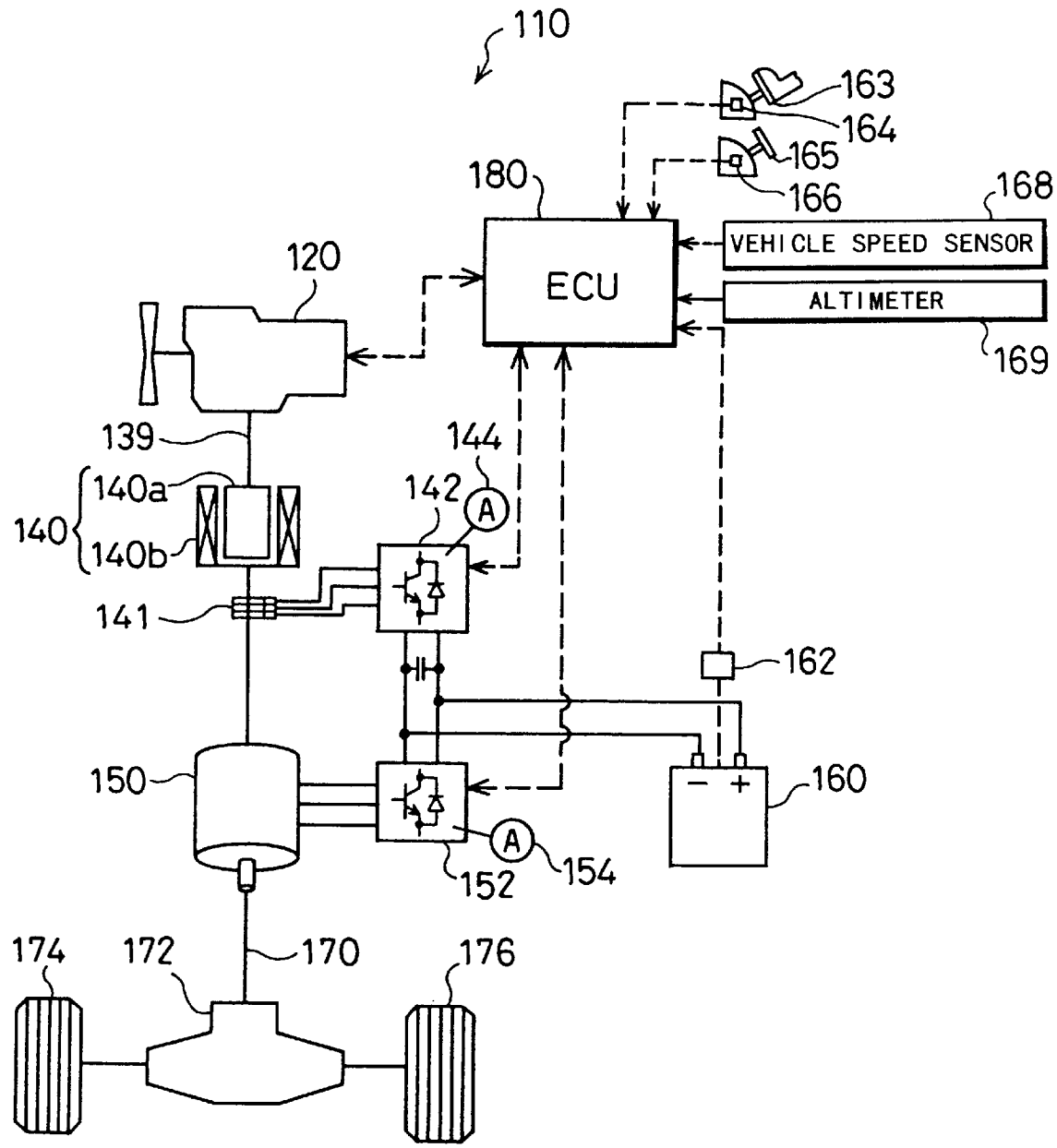
FIG. 20 schematically illustrates structure of a power output apparatus 110 given as a modified example.

The power output apparatuses 10 and 10B through 10E of the first through the fifth embodiments discussed above include the generator 40 having a rotor attached to the crankshaft 39 of the engine 20. Like a power output apparatus 110 of a modified example shown in FIG. 20, the generator 40 may be replaced by a clutch motor 140, which includes an inner rotor 140a attached to a crankshaft 139 of an engine 120 and an outer rotor 140b attached to a drive shaft 170. In the clutch motor 140, a plurality of magnets are mounted on the outer circumference of the inner rotor 140a, whereas three-phase coils are wound on slots formed in the outer rotor 140b. The clutch motor 140 can be regarded as a standard synchronous motor, except that the outer rotor 140b corresponding to the stator rotates. The revolving speed of the clutch motor 140 is a revolving speed difference Nc between the revolving speed of the inner rotor 140a (that is, revolving speed Ne of the engine 120) and the revolving speed of the outer rotor 140b (that is, revolving speed Nd of the drive shaft 170). In the power output apparatus 110 of the modified example, a slip ring 141 is attached to the drive shaft 170. Electric power is supplied to and regenerated from the respective phases of the three-phase coils wound on the rotating stator via the slip ring 141. The power output apparatus 110 of the modified example has a similar structure to that of the power output apparatus 10 of the first embodiment, except the clutch motor 140 and the slip ring 141. The same constituents are shown by the like numerals +100 and are not specifically described here.

Figure 21:
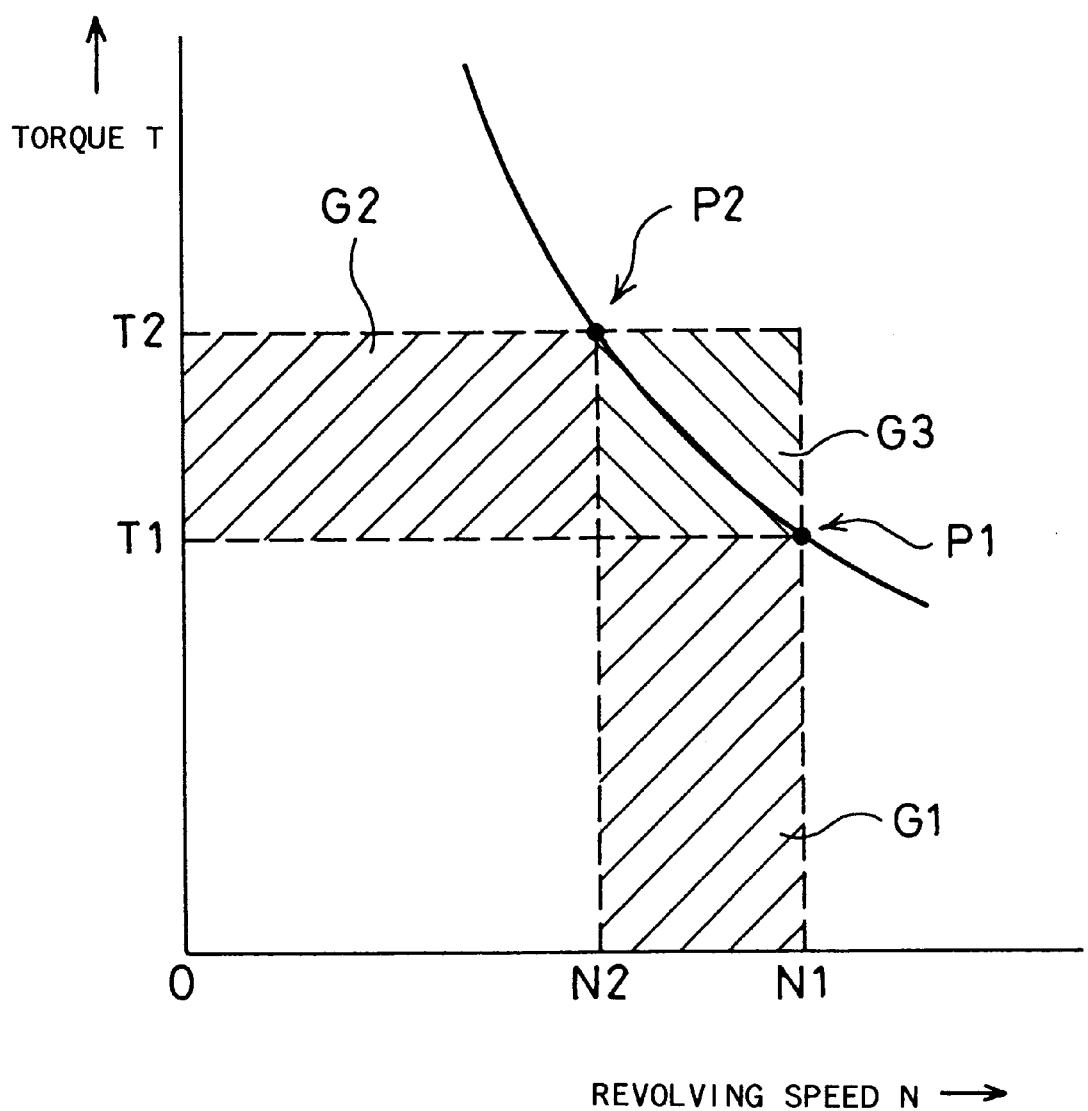
FIG. 21 shows the operation principle of the power output apparatus 110 of the modified example.

In the power output apparatus 110 of the modified example, the mechanical power output from the engine 120 is subjected to torque conversion by the clutch motor 140 and the motor 150 and is then output as a desired power to the drive shaft 170. Part of the mechanical power output from the engine 120 is transmitted to the drive shaft 170 via the clutch motor 140, whereas the residual mechanical power is converted to electrical energy by the clutch motor 140. The motor 150 uses this electrical energy and outputs the required power to the drive shaft 170. The total of the power output from the engine 120 and the power output from the clutch motor 140 is transmitted to the drive shaft 170, while the motor 150 regenerates the electrical energy required for driving the clutch motor 140 from the drive shaft 170. Referring to FIG. 21, by way of example, it is assumed that the engine 120 is driven at a driving point P1 defined by a revolving speed N1 and a torque T1. The clutch motor 140 transmits the torque T1 to the drive shaft 170, while regenerating energy of an area G1 and supplying the regenerated energy as energy of an area G2 to the motor 150. A torque T2 is accordingly output to the drive shaft 170 that rotates at a revolving speed N2. As another example, it is assumed that the engine 120 is driven at another driving point P2 defined by the revolving speed N2 and the torque T2. Energy expressed as the sum of the areas G1 and G3 is supplied to the clutch motor 140, and the torque T2 is output to the drive shaft 170. The motor 150 regenerates energy expressed as the sum of the areas G2 and G3, which compensates the energy supplied to the clutch motor 140. The torque T1 is accordingly output to the drive shaft 170 that rotates at the revolving speed N1.

In case that energy Pe output from the engine 120 is made greater than energy Pd output to the drive shaft 170 by increasing either one or both of the revolving speed Ne and torque Te of the engine 120, a battery 160 is charged with the excess electric power. In case that the energy Pe output from the engine 120 is made smaller than the energy Pd output to the drive shaft 170 by decreasing either one or both of the revolving speed Ne and the torque Te of the engine 120, on the other hand, the battery 160 is discharged to supply the deficient electric power. In the power output apparatus 110 of the modified example, when the revolving speed Ne of the engine 120 is higher than the revolving speed Nd of the drive shaft 170, the clutch motor 140 works as a generator and the motor 150 works as a normal motor. When the revolving speed Ne of the engine 120 is lower than the revolving speed Nd of the drive shaft 170, on the other hand, the clutch motor 140 works as a normal motor and the motor 150 works as a generator. In the power output apparatus 110 of the modified example, in one state, the electromagnetic coupling of the inner rotor 140a with the outer rotor 140b in the clutch motor 140 is released. This stops the engine 120 and enables the vehicle to be driven only by the power output from the motor 150. In another state, the electromagnetic coupling of the rotor with the stator in the motor 150 is released. This enables the battery 160 to be charged with the electric power generated by the clutch motor 140, while the vehicle is driven by the power output from the engine 120 and transmitted via the clutch motor 140.

Figure 22:
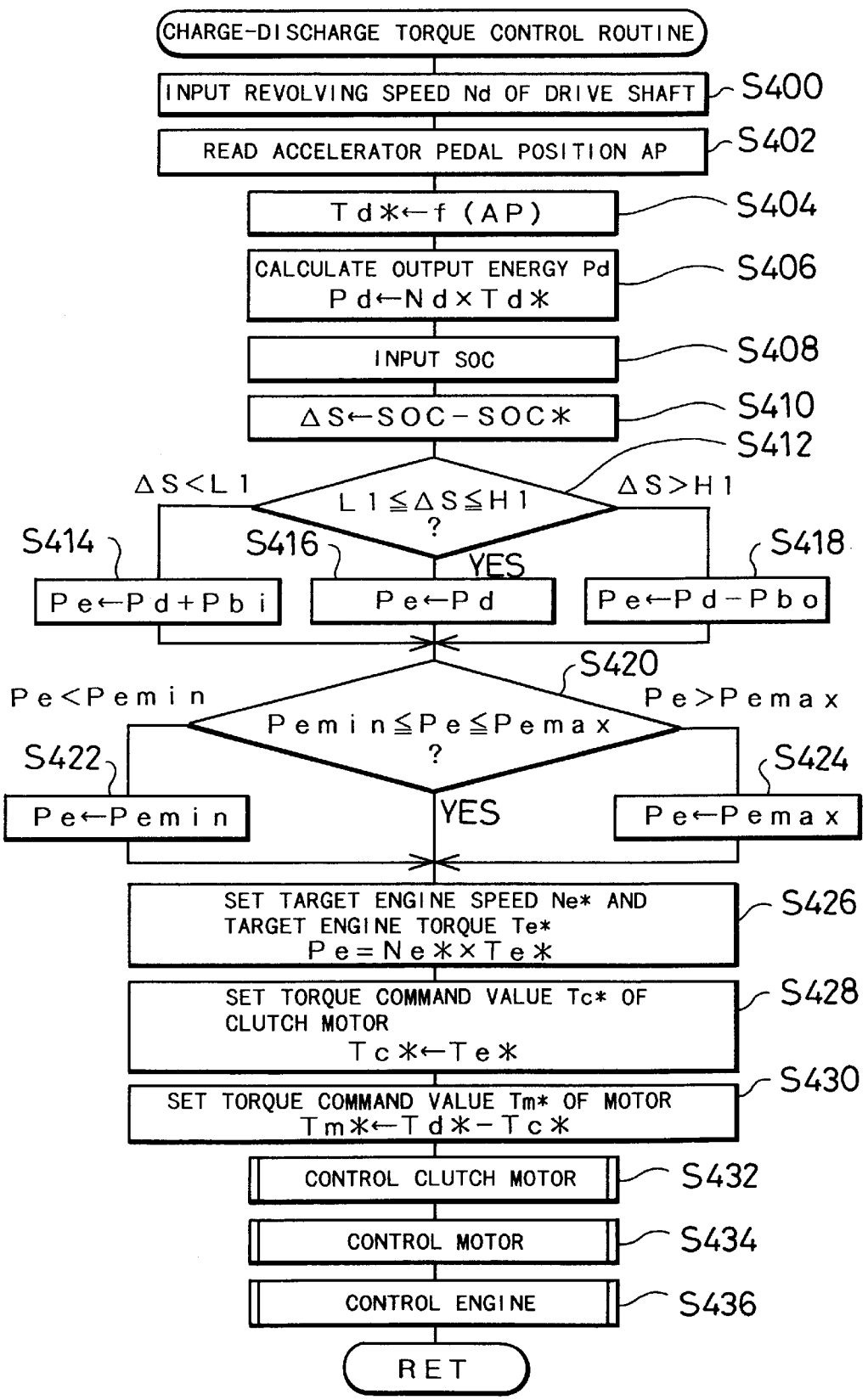
FIG. 22 is a flowchart showing a charge-discharge torque control routine executed by the ECU 180 in the power output apparatus 110 of the modified example.

The power output apparatus 110 of the modified example carries out a charge-discharge control of the battery 160, based on a charge-discharge torque control routine shown in the flowchart of FIG. 22 and any one of the target SOC setting routines shown in the flowcharts of FIGS. 5, 7 through 10, 12, 15, 17, and 19 discussed above. The charge-discharge torque control routine of FIG. 22 is repeatedly executed at predetermined time intervals, for example, at every 8 msec, after a start of the vehicle.

When the program enters the routine of FIG. 22, a CPU 180a of an ECU 180 first reads the revolving speed Nd of the drive shaft 170 at step S400. The revolving speed Nd of the drive shaft 170 may be calculated from a resolver (not shown) for measuring the rotational angle of the rotor included in the motor 150 or may be obtained from a vehicle speed sensor 168. The CPU 180a then reads the accelerator pedal position AP detected by an accelerator pedal position sensor 164 at step S402, and obtains a torque command value Td* to be output to the drive shaft 170, based on the input accelerator pedal position AP at step S404. In the power output apparatus 110 of the modified example, torque command values Td* corresponding to the respective accelerator pedal positions AP are set in advance and stored as a map in a ROM 180b of the ECU 180. In accordance with a concrete procedure, at step S404, the CPU 180a refers to the map stored in the ROM 180b and reads the torque command value Td* corresponding to the input accelerator pedal position AP from the map. The CPU 180a calculates the energy Pd to be output to the drive shaft 170 from the obtained torque command value Td* and the input revolving speed Nd of the drive shaft 170 according to the equation of Pd=Nd×Td* at step S406.

The CPU 180a then reads the state SOC of the battery 160 at step S408, and calculates a difference ΔS between the input state SOC and a target state SOC* at step S410. The calculated difference ΔS is compared with a lower threshold value L1 and a higher threshold value H1 at step S412. In case that the difference ΔS is smaller than the lower threshold value L1, the sum of the energy Pd to be output to the drive shaft 170 and charging energy Pbi is set to the energy Pe to be output from the engine 120 at step S414. In case that the difference ΔS is not smaller than the lower threshold value L1 and not greater than the higher threshold value H1, the energy Pd is set to the energy Pe at step S416. In case that the difference ΔS is greater than the higher threshold value H1, the difference obtained by subtracting discharging energy Pbo from the energy Pd is set to the energy Pe at step S418. The charging energy Pbi is used to charge the battery 160, whereas the discharging energy Pbo is discharged from the battery 160 and used to drive the vehicle. Setting the energy Pe to be out put from the engine 120 in the above manner enables the battery 160 to be charged with the excess energy difference between the energy Pd to be output to the drive shaft 170 and the energy Pe output from the engine 120 or to be discharged and supply the deficient energy difference. This structure enables the state SOC of the battery 160 to approach the target state SOC*.

The energy Pe set in the above manner is compared with a minimum value Pemin and a maximum value Pemax at step S420. In case that the energy Pe is less than the minimum value Pemin, the energy Pe is restricted to the minimum value Pemin at step S422. In case that the energy Pe is greater than the maximum value Pemax, on the other hand, the energy Pe is restricted to the maximum value Pemax at step S424. Restriction of the energy Pe enables the engine 120 to be kept in a stable driving range. The battery 160 is discharged to supplement the deficient energy when the energy Pd to be output to the drive shaft 170 is greater than the energy Pe output from the engine 120. The battery 160 is charged with the excess energy, on the other hand, when the energy Pe is greater than the energy Pd.

After setting the energy Pe, the CPU 180a specifies a target revolving speed Ne* and a target torque Te* of the engine 120 to satisfy the equation of Pe=Ne*×Te* at step S426. There are numerous combinations of the target torque Te* and the target revolving speed Ne* of the engine 120 satisfying the equation of Pe=Ne*×Te*. In the power output apparatus 110 of the modified example, a favorable combination of the target torque Te* and the target revolving speed Ne* of the engine 120 is selected at step S426, in order to enable the engine 120 to be driven at the highest possible efficiency.

The program then sets the target engine torque Te* to a torque command value Tc* of the clutch motor 140 at step S428, and sets the value, which is obtained by subtracting the torque command value Tc* of the clutch motor 140 from the torque command value Td* to be output to the drive shaft 170, to a torque command value Tm* of the motor 150 at step S430. The target torque Te* of the engine 120 is set to the torque command value Tc* of the clutch motor 140, since a torque Tc of the clutch motor 140 represents a loading torque applied to the engine 120.

The program then controls the clutch motor 140 and the motor 150, in order to enable the clutch motor 140 and the motor 150 to output the torques corresponding to the torque command value Tc* and the torque command value Tm* at steps S432 and S434, while controlling the engine 120, in order to enable the engine 120 to be driven at a driving point defined by the target revolving speed Ne* and the target torque Te* at step S436. The control of the clutch motor 140 regulates the loading torque applied to the engine 120. The control of the engine 120 regulates the amount of fuel injection and the position of a throttle valve (not shown), in order to enable the revolving speed Ne of the engine 120 to approach the target revolving speed Ne*.

As discussed above, the power output apparatus 110 of the modified example carries out the charge-discharge torque control routine shown in the flowchart of FIG. 22 in combination with any one of the target SOC setting routines shown in the flowcharts of FIGS. 5, 7 through 10, 12, 15, 17, and 19, thereby exerting the same effects as those of the power output apparatuses 10 and 10B through 10E of the first through the fifth embodiments discussed above.

Figure 23:
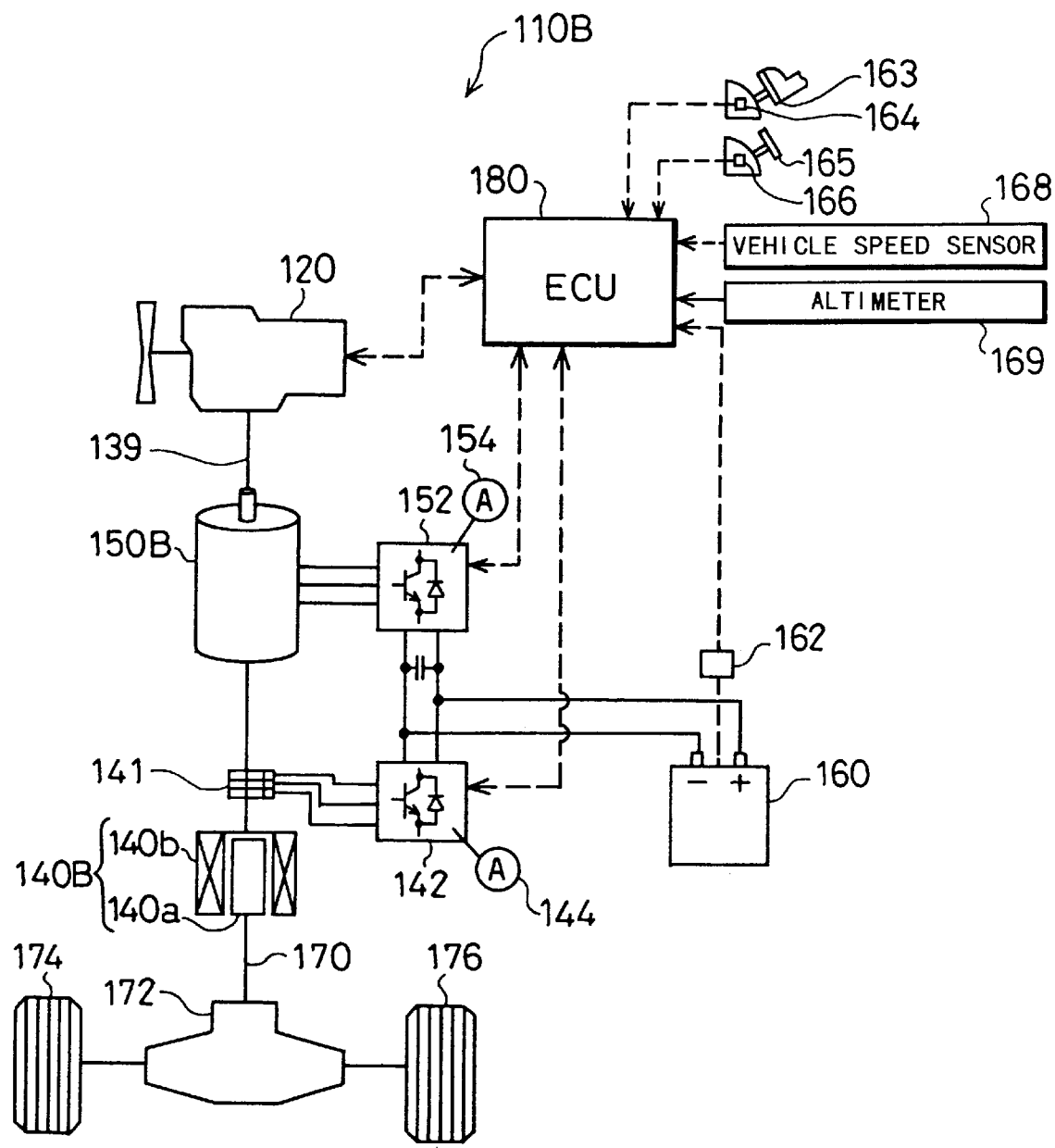
FIG. 23 schematically illustrates a power output apparatus 110B of a modified structure.

In the power output apparatus 110 of the modified example, the motor 150 is attached to the drive shaft 170. Like another power output apparatus 110B shown in FIG. 23, however, a motor 150B may be attached to the crankshaft 139. In the power output apparatus 110B of this modified structure, the mechanical power output from the engine 120 is also subjected to torque conversion by a clutch motor 140B and the motor 150B and is output as a desired power to the drive shaft 170. Referring to FIG. 21, when the engine 120 is driven at the driving point P1 defined by the revolving speed N1 and the torque T1, the energy expressed as the sum of the areas G2 and G3 is supplied to the motor 150B, so as to drive the crankshaft 139 by the torque T2. The clutch motor 140B regenerates the energy expressed as the sum of the areas G1 and G3, which compensates the energy supplied to the motor 150B. The torque T2 is accordingly output to the drive shaft 170 that rotates at the revolving speed N2. When the engine 120 is driven at the driving point P2 defined by the revolving speed N2 and the torque T2, the motor 150B regenerates the energy expressed by the area G2, so as to drive the crankshaft 139 by the torque T1. The energy regenerated by the motor 150B is supplied to the clutch motor 140B as the energy expressed by the area G1. The torque T1 is accordingly output to the drive shaft 170 that rotates at the revolving speed N1. The battery 160 can be charged or discharged by changing the driving point of the engine 120.

Figure 24:
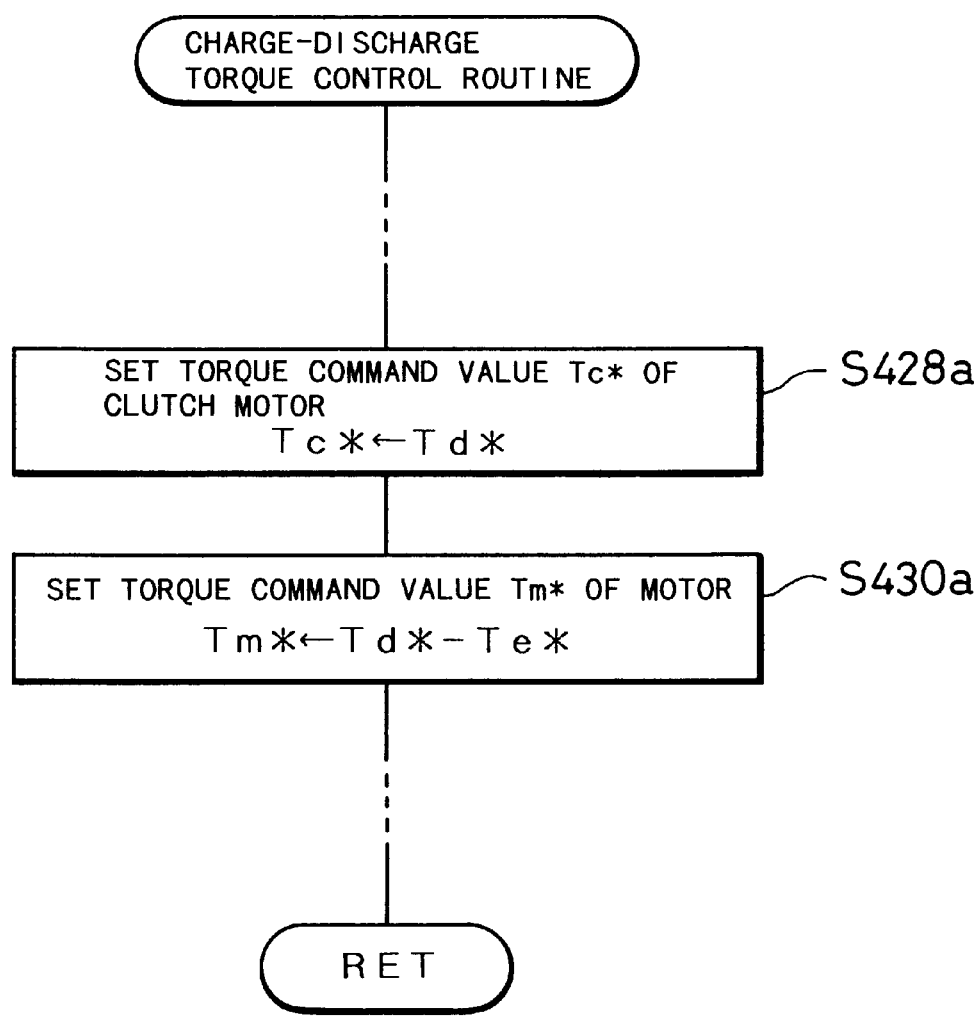
FIG. 24 is a flowchart showing part of the charge-discharge torque control routine executed by the ECU 180 in the power output apparatus 110B of the modified structure.

Like the power output apparatus 110 of the modified example, the power output apparatus 110B of the modified structure carries out the charge-discharge torque control routine shown in the flowchart of FIG. 22 in combination with any one of the target SOC setting routines shown in the flowcharts of FIGS. 5, 7 through 10, 12, 15, 17, and 19, thereby exerting the same effects as those of the power output apparatuses 10 and 10B through 10E of the first through the fifth embodiments discussed above. Since the configuration of the clutch motor 140B and the motor 150B in the power output apparatus 110B is different from the power output apparatus 110, steps S428 and S430 for setting the torque command value Tc* of the clutch motor 140 and the torque command value Tm* of the motor 150 in the charge-discharge torque control routine of FIG. 22 are replaced by steps S428a and S430a shown in the flowchart of FIG. 24.

Figure 25:
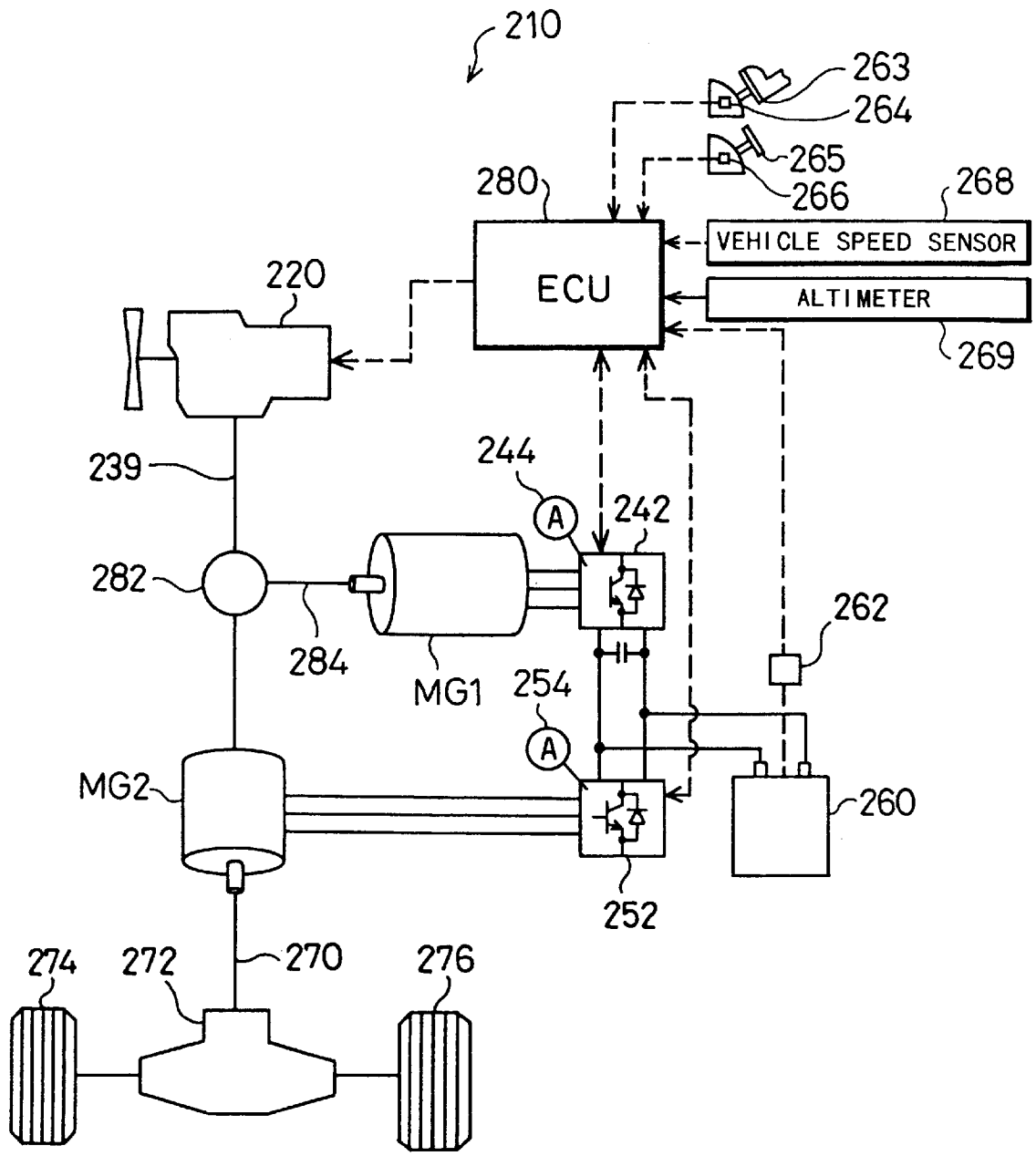
FIG. 25 schematically illustrates structure of a power output apparatus 210 given as another modified example.

In the power output apparatuses 10 and 10B through 10E of the first through the fifth embodiments discussed above, the generator 40 is attached to the crankshaft 39 of the engine 20, and the motor 50 is attached to the drive shaft 70. In a power output apparatus 210 of another modified example shown in FIG. 25, a first motor MG1 that can generate electric power is attached to a crankshaft 239 of an engine 220 via a planetary gear 282 connecting with a drive shaft 270, and a second motor MG2 that can also generate electric power is attached to the drive shaft 270. The planetary gear 282 in the power output apparatus 210 of another modified example includes a sun gear (not shown) connecting with a rotating shaft 284, to which the first motor MG1 is attached, a ring gear (not shown) connecting with the drive shaft 270, a plurality of planetary pinion gears (not shown) arranged between the sun gear and the ring gear to revolve around the sun gear while rotating on its axis, and a planetary carrier (not shown) connected to the crankshaft 239 for supporting the respective rotating axes of the planetary pinion gears. In the planetary gear 282, the rotating shaft 284, the drive shaft 270, and the crankshaft 239 respectively connecting with the sun gear, the ring gear, and the planetary carrier represent the three input/output shafts of the power. Determination of the powers input to and output from any two shafts among the three shafts automatically determines the power input to and output from the residual one shaft.

Figure 26:
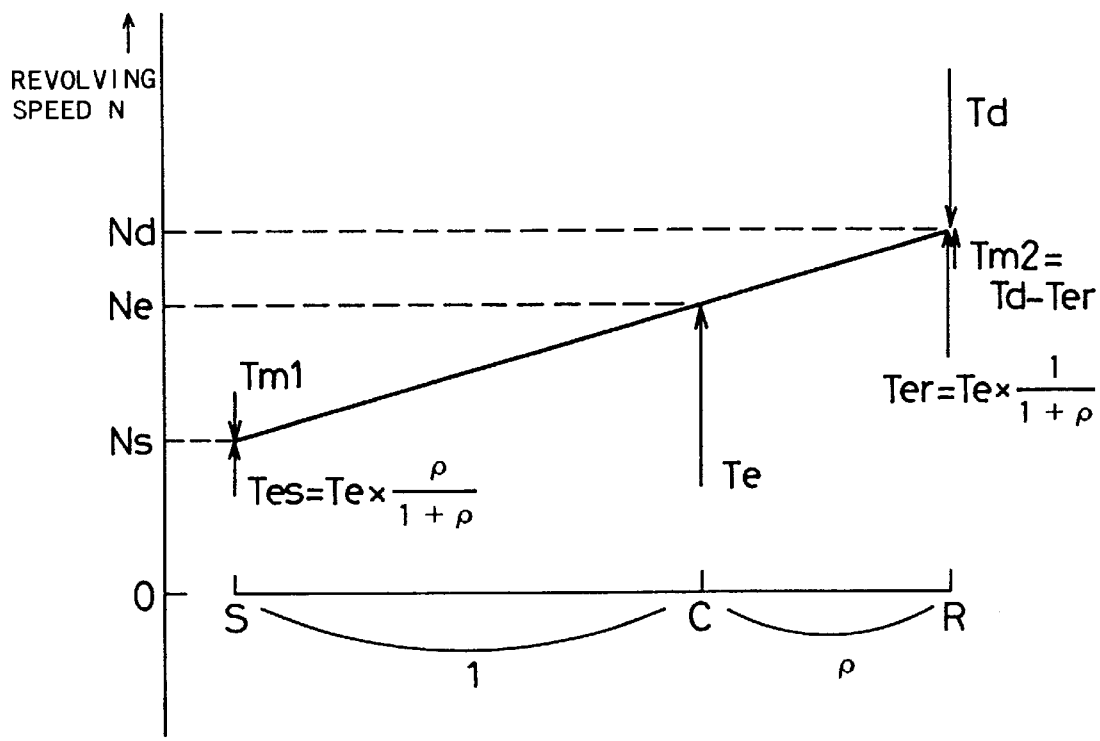
FIG. 26 is a nomogram showing the relationship between the revolving speed and the torque of the three shafts connected to the planetary gear 282 in the power output apparatus 210 of another modified example.
Figure 27:
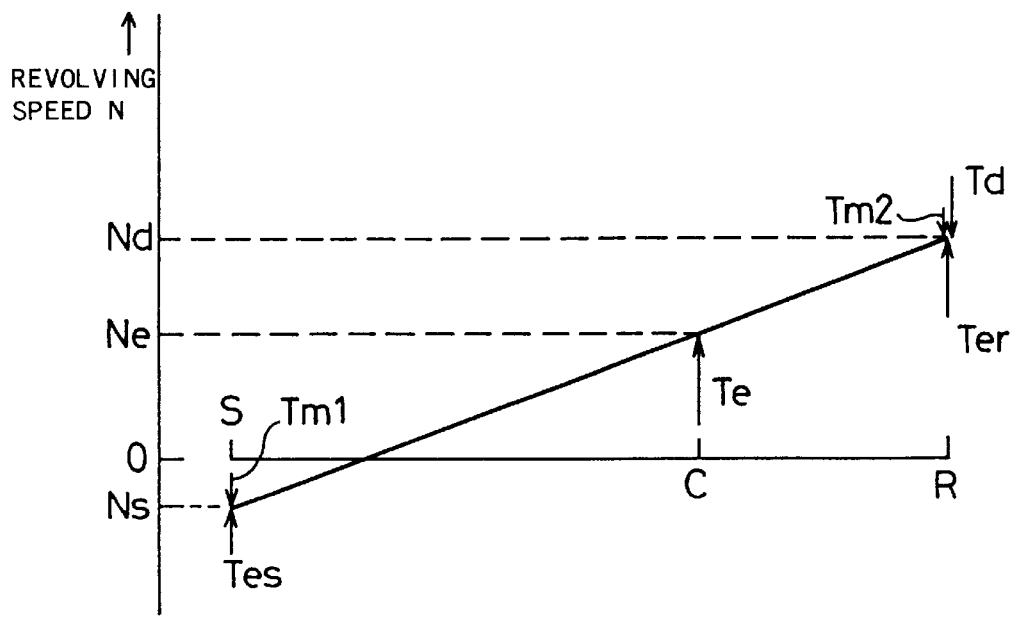
FIG. 27 is a nomogram showing the relationship between the revolving speed and the torque of the three shafts connected to the planetary gear 282 in the power output apparatus 210 of another modified example.

According to the mechanics, the relationship between the revolving speed and the torque of the three shafts in the planetary gear 282 can be expressed as nomograms illustrated in FIGS. 26 and 27 and solved geometrically. In the nomogram of FIG. 26, the revolving speed of the three shafts is plotted as ordinate and the positional ratio of the coordinate axes of the three shafts as abscissa. When a coordinate axis S of the rotating shaft 284 connecting with the sun gear and a coordinate axis R of the drive shaft 270 connecting with the ring gear are positioned on either ends of a line segment, a coordinate axis C of the crankshaft 239 connecting with the planetary carrier is given as an interior division of the axes S and R at the ratio of 1 to $\rho$, wherein $\rho$ represents a ratio of the number of teeth of the sun gear to the number of teeth of the ring gear. It is here assumed that the engine 220 is driven at the revolving speed Ne and that the drive shaft 270 is driven at the revolving speed Nd. In this case, the revolving speed Ne of the engine 220 can be plotted on the coordinate axis C of the crankshaft 239, and the revolving speed Nd of the drive shaft 270 on the coordinate axis R of the drive shaft 270. A straight line passing through both the points is drawn, and a revolving speed Ns of the rotating shaft 284 is then given as the intersection of this straight line and the coordinate axis S. This straight line is hereinafter referred to as a dynamic collinear line. In the planetary gear 282, determination of the rotations of any two gears among the sun gear, the ring gear, and the planetary carrier automatically determines the rotation of the residual one gear.

The torque Te of the engine 220 is then applied (upward in the drawing) to the dynamic collinear line on the coordinate axis C functioning as a line of action. The dynamic collinear line against the torque can be regarded as a rigid body to which a force is applied as a vector. Based on the technique of dividing the force into two different parallel lines of action, the torque Te acting on the coordinate axis C is divided into a torque Tes on the coordinate axis S and a torque Ter on the coordinate axis R. The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Td output to the drive shaft 270 is applied to the coordinate axis R. The torque Tm1 is applied by the first motor MG1, and the torque Tm2 by the second motor MG2. The first motor MG1 applies the torque Tm1 in reverse of its rotation and thereby works as a generator to regenerate electrical energy Pm1, which is given as the product of the torque Tm1 and the revolving speed Ns, from the rotating shaft 284. The second motor MG2 applies the torque Tm2 in the direction of its rotation and thereby works as a motor to output electrical energy Pm2, which is given as the product of the torque Tm2 and the revolving speed Nd, as a power to the drive shaft 270. In case that the electrical energy Pm1 is identical with the electrical energy Pm2, all the electric power consumed by the second motor MG2 can be regenerated and supplied by the first motor MG1.

Although the revolving speed Ns of the rotating shaft 284 is positive in the nomogram of FIG. 26, it may be negative according to the revolving speed Ne of the engine 220 and the revolving speed Nd of the drive shaft 270 as shown in the nomogram of FIG. 27. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nd, from the drive shaft 270. In case that the electrical energy Pm1 consumed by the first motor MG1 is identical with the electrical energy Pm2 regenerated by the second motor MG2 under such conditions, all the electric power consumed by the first motor MG1 can be regenerated and supplied by the second motor MG2.

In the power output apparatus 210 of another modified example, the mechanical power output from the engine 220 is subjected to torque conversion by the planetary gear 282, the first motor MG1, and the second motor MG2 and is output as a desired power to the drive shaft 270. A battery 260 is charged with the excess energy, when the energy Pe output from the engine 220 is greater than the energy Pd output to the drive shaft 270 and the energy regenerated by the first motor MG1 or the second motor MG2 is greater than the energy consumed by the second motor MG2 or the first motor MG1. The battery 260 is discharged to supply the deficient energy, when the energy Pe output from the engine 220 is smaller than the energy Pd output to the drive shaft 270 and the energy regenerated by the first motor MG1 or the second motor MG2 is smaller than the energy consumed by the second motor MG2 or the first motor MG1. In the power output apparatus 210 of another modified example, when the dynamic collinear line is in the state of FIG. 26, the first motor MG1 works as a generator and the second motor MG2 as a motor. When the dynamic collinear line is in the state of FIG. 27, on the other hand, the first motor MG1 works as a motor and the second motor MG2 as a generator. In the power output apparatus 210 of another modified example, in one state, the electromagnetic coupling of the rotor with the stator in the first motor MG1 is released. This stops the engine 220 and enables the vehicle to be driven only by the power output from the second motor MG2. In another state, the electromagnetic coupling of the rotor with the stator in the second motor MG2 is released. This enables the vehicle to be driven by the power output from the engine 220 and the first motor MG1 to the drive shaft 270 via the planetary gear 282.

Figure 28:
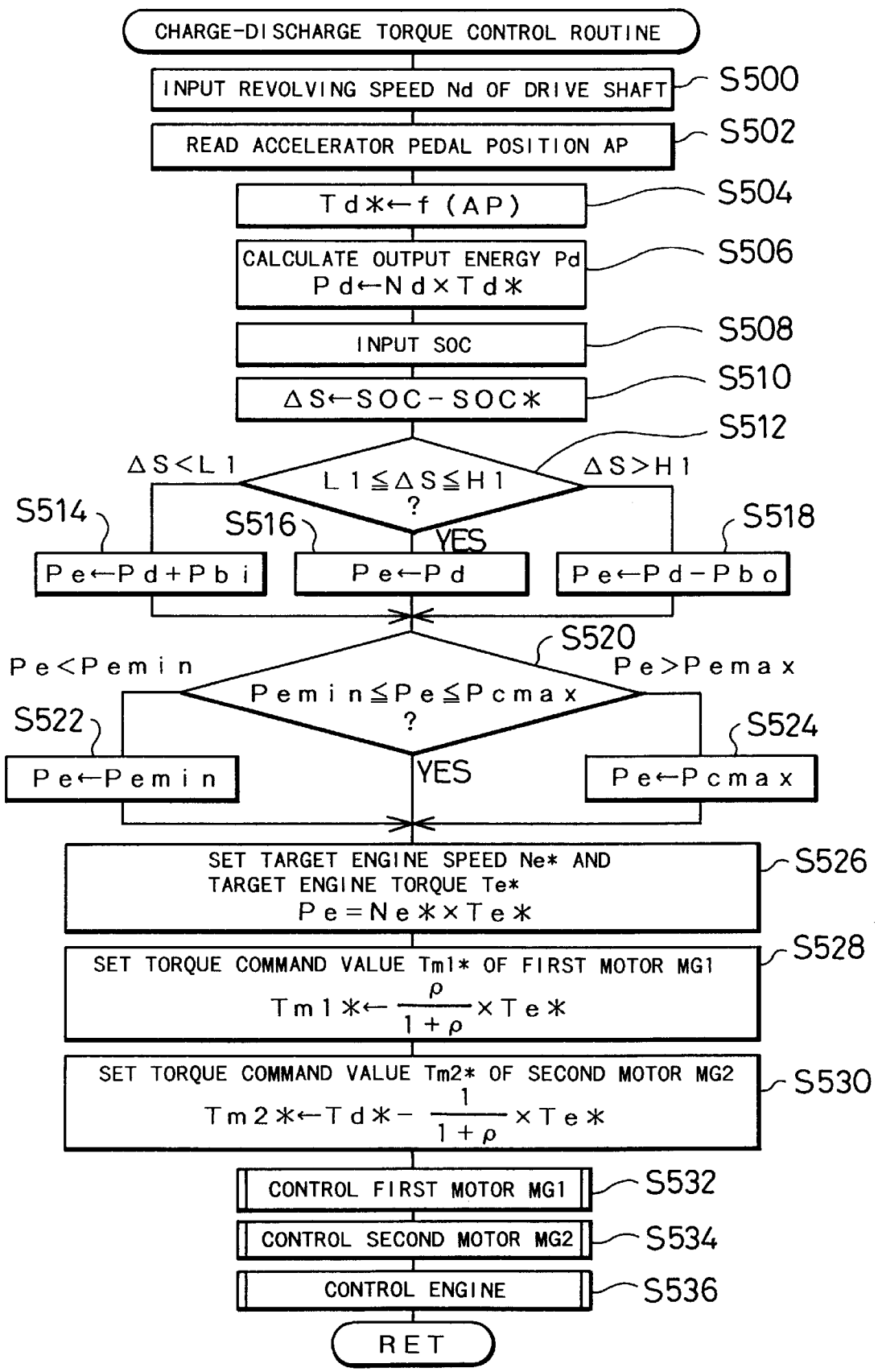
FIG. 28 is a flowchart showing a charge-discharge torque control routine executed by the ECU 280 in the power output apparatus 210 of another modified example.

The power output apparatus 210 of another modified example carries out a charge-discharge control of the battery 260, based on a charge-discharge torque control routine shown in the flowchart of FIG. 28 and any one of the target SOC setting routines shown in the flowcharts of FIGS. 5, 7 through 10, 12, 15, 17, and 19 discussed above. The charge-discharge torque control routine of FIG. 28 is similar to the charge-discharge torque control routine of FIG. 22, except the processing of steps S528 and S530 for setting torque command values Tm1* and Tm2* of the first motor MG1 and the second motor MG2. In the power output apparatus 110 of the modified example, the mechanical power output from the engine 120 is subjected to torque conversion by the clutch motor 140 and the motor 150. In the power output apparatus 210 of another modified example, on the other hand, the mechanical power output from the engine 220 is subjected to torque conversion by the planetary gear 282, the first motor MG1, and the second motor MG2. The torque command values Tm1* and Tm2* of the motors MG1 and MG2 can be obtained from the balanced dynamic collinear lines in the nomograms of FIGS. 26 and 27.

The power output apparatus 210 of another modified example carries out the charge-discharge torque control routine shown in the flowchart of FIG. 28 in combination with any one of the target SOC setting routines shown in the flowcharts of FIGS. 5, 7 through 10, 12, 15, 17, and 19, thereby exerting the same effects as those of the power output apparatuses 10 and 10B through 10E of the first through the fifth embodiments discussed above.

Figure 29:
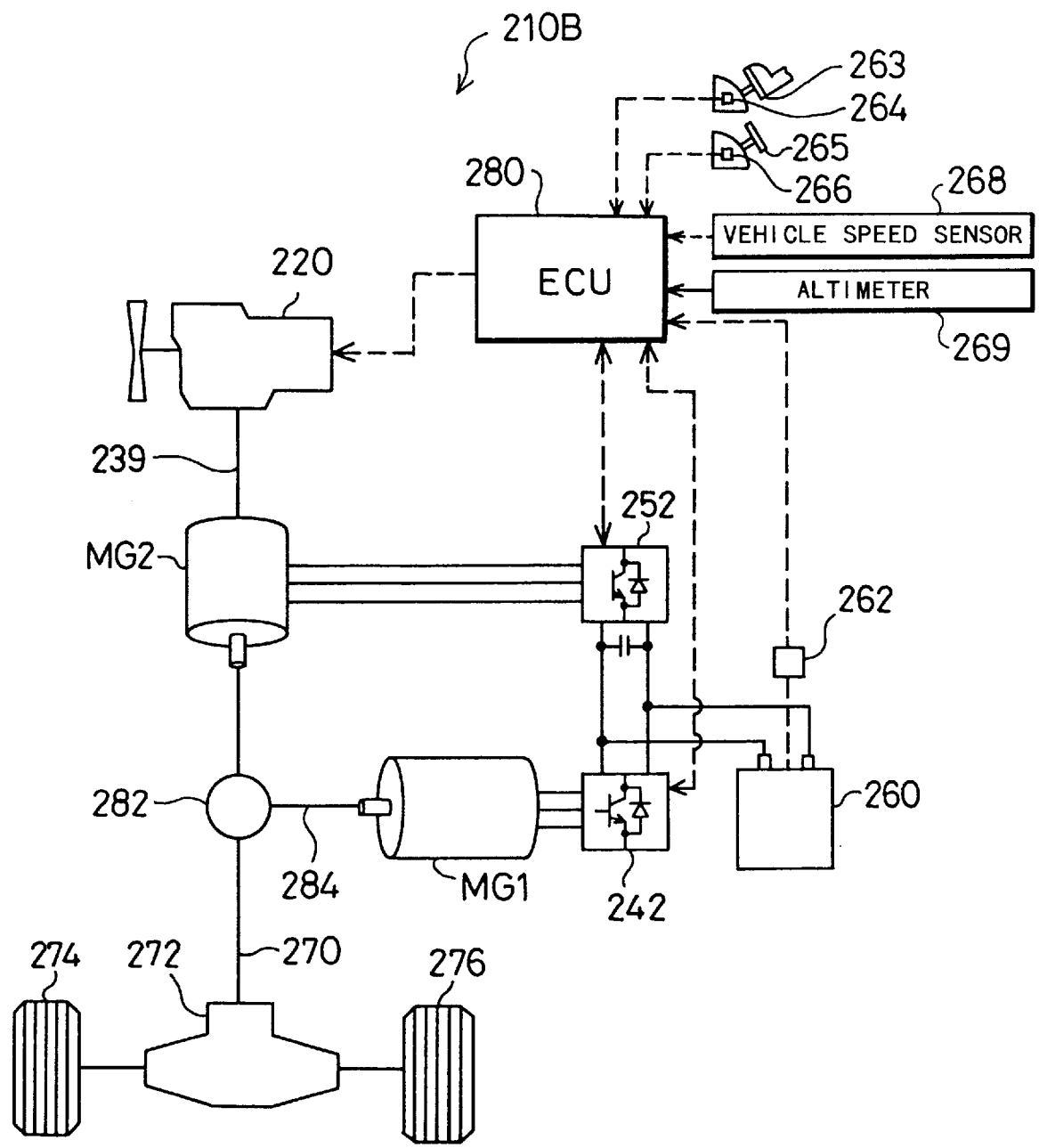
FIG. 29 schematically illustrates a power output apparatus 210B of another modified structure.
Figure 30:
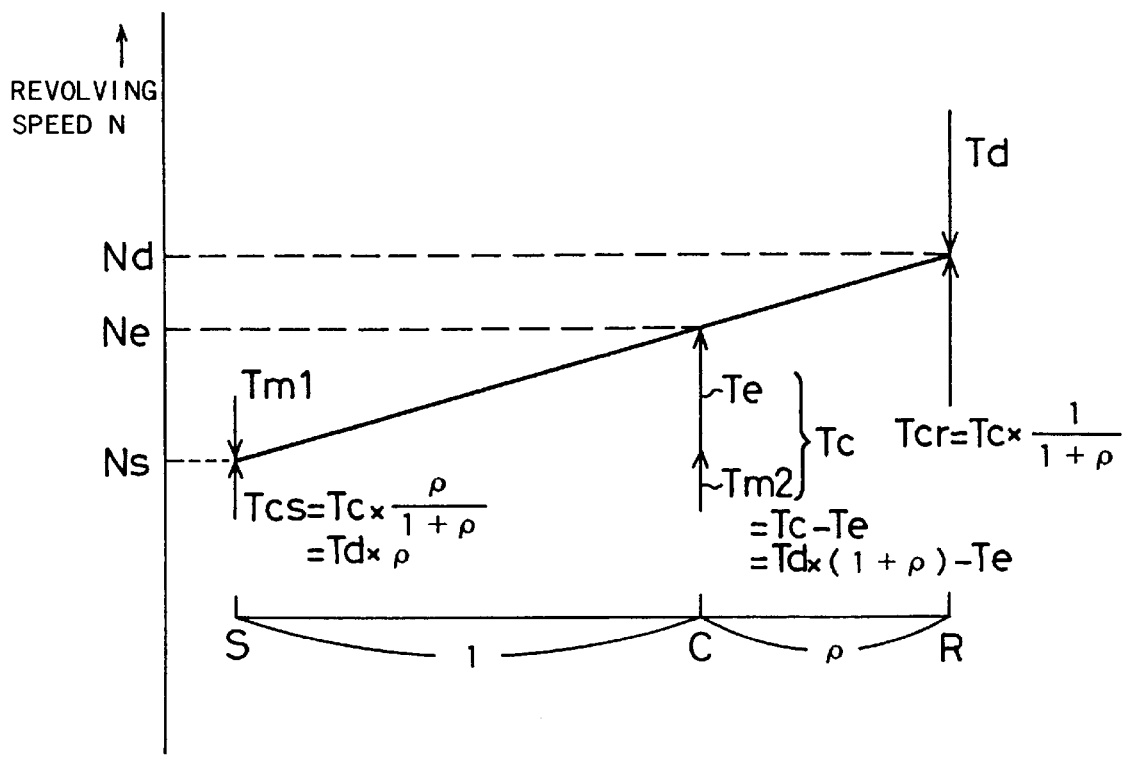
FIG. 30 is a nomogram showing the relationship between the revolving speed and the torque of the three shafts connected to the planetary gear 282 in the power output apparatus 210B of another modified structure.
Figure 31:
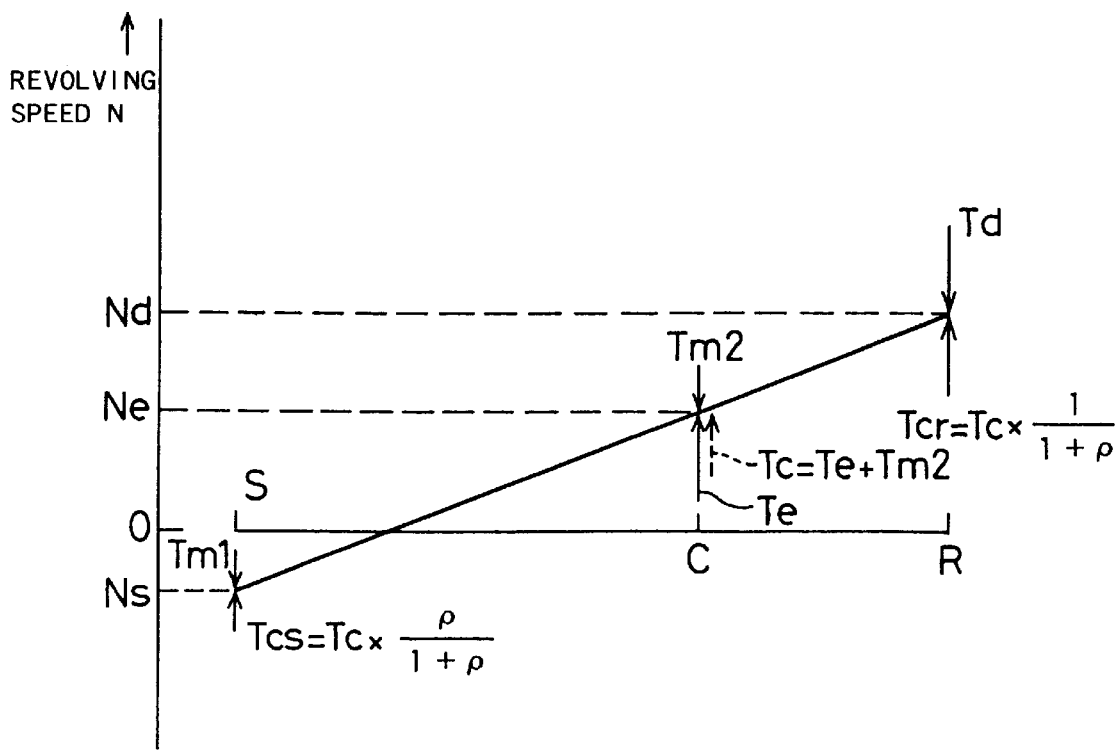
FIG. 31 is a nomogram showing the relationship between the revolving speed and the torque of the three shafts connected to the planetary gear 282 in the power output apparatus 210B of another modified structure.

Although the second motor MG2 is attached to the drive shaft 270 in the power output apparatus 210, the second motor MG2 may be attached to the crankshaft 239 like a power output apparatus 210B shown in FIG. 29. Like in the power output apparatus 210, in the power output apparatus 210B of another modified structure, the mechanical power output from the engine 220 is subjected to torque conversion by the planetary gear 282, the first motor MG1, and the second motor MG2 and is output as a desired power to the drive shaft 270. The battery 260 can be charged with the excess energy or discharged to supply the deficient energy, while the power is output to the drive shaft 270. FIGS. 30 and 31 are nomograms in the power output apparatus 210B of another modified structure.

Figure 32:
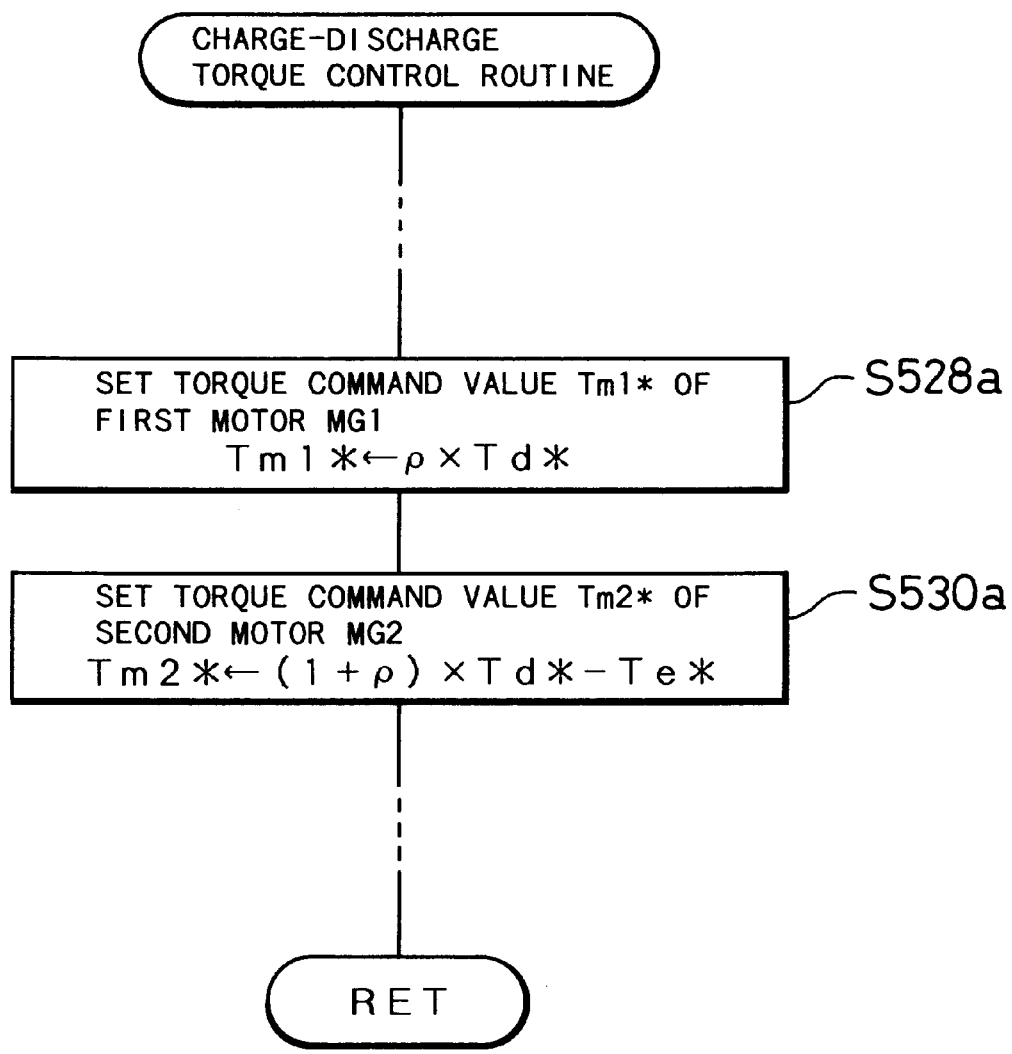
FIG. 32 is a flowchart showing part of the charge-discharge torque control routine executed by the ECU 280 in the power output apparatus 210B of another modified structure.

Like the power output apparatus 210 of another modified example, the power output apparatus 210B carries out the charge-discharge torque control routine shown in the flowchart of FIG. 28 in combination with any one of the target SOC setting routines shown in the flowcharts of FIGS. 5, 7 through 10, 12, 15, 17, and 19, thereby exerting the same effects as those of the power output apparatuses 10 and 10B through 10E of the first through the fifth embodiments discussed above. Since the configuration of the second motor MG2 in the power output apparatus 210B is different from the power output apparatus 210, steps S528 and S530 for setting the torque command values Tm1* and Tm2* of the motors MG1 and MG2 in the charge-discharge torque control routine of FIG. 28 are replaced by steps S528a and S530a shown in the flowchart of FIG. 32. The torque command values Tm1* and Tm2* of the motors MG1 and MG2 can be obtained from the balanced dynamic collinear lines in the nomograms of FIGS. 30 and 31.

In the power output apparatuses 210 and 210B, the planetary gear 282 is used as the three shaft-type power input/output means. Another available example is a double-pinion planetary gear having plural sets of planetary pinion gears. One planetary pinion gear in each pair is linked with the sun gear while the other is linked with the ring gear, and the pair of planetary pinion gears are linked with each other to revolve around the sun gear while rotating on its axis. Any other device or gear unit, such as a differential gear, is also applicable for the three shaft-type power input/output means, as long as it can determine powers input to and output from the residual one shaft based on predetermined powers input to and output from any two shafts among the three shafts.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A power output apparatus mounted on a vehicle for outputting power to a drive shaft, said power output apparatus comprising:

a motor for outputting power to said drive shaft;

an engine to output mechanical power, said motor converting at least a portion of the mechanical power output by the engine to mechanical energy as the power output to the drive shaft;

a generator for converting at least part of said mechanical power output from said engine to electrical energy, the generator regenerating a portion of the mechanical power output from the engine while the motor is outputting power to the drive shaft;

accumulator means being charged with the electrical energy converted by said generator and being discharged to supply electrical energy required for driving said motor;

state detection means for detecting a state of said accumulator means;

driving condition predicting means for predicting a driving condition of said vehicle at various positions, including predicted positions, of a route;

target state setting means for setting a target state of said accumulator means based on the predicted driving condition, said target state set at each of the various positions, including the predicted positions along the route while driving; and charge-discharge control means for controlling said engine and said generator to enable the state of said accumulator means to become equal to said target state.

2. A power output apparatus in accordance with claim 1, said power output apparatus further comprising vehicle speed measurement means for measuring speed of said vehicle, wherein said driving condition predicting means predicts said driving condition of said vehicle, based on said speed.

3. A power output apparatus in accordance with claim 1, said power output apparatus further comprising target power setting means for setting a target power to be output to said drive shaft, as said target state, wherein said driving condition predicting means predicts said driving condition of said vehicle, based on said target power.

4. A power output apparatus in accordance with claim 1, said power output apparatus further comprising state variation calculation means for calculating a variation in state of said accumulator means based on the state of said accumulator means, wherein said driving condition predicting means predicts said driving condition of said vehicle, based on said variation in state of said accumulator means.

5. A power output apparatus in accordance with claim 1, said power output apparatus further comprising altitude measurement means for measuring an altitude, wherein said driving condition predicting means predicts said driving condition of said vehicle, based on said altitude measured by said altitude measurement means.

6. A power output apparatus in accordance with claim 1, said power output apparatus further comprising:

map storage means for storing a map, said map including road information; and driving position detection means for detecting a current driving position of said vehicle, wherein said driving condition predicting means predicts said driving condition of said vehicle, based on said current driving position of said vehicle and said map.

7. A power output apparatus in accordance with claim 6, wherein said map includes district information regarding a plurality of districts having different driving conditions, said driving condition predicting means predicts said driving condition of said vehicle, based on said current driving position of said vehicle and said district information included in said map.

8. A power output apparatus in accordance with claim 1, said power output apparatus further comprising:

a driving distance measurement means for measuring a driving distance of said vehicle; and driving schedule input means for inputting a driving schedule, said driving schedule including, as information, an expected driving distance to a destination, boundaries of a plurality of districts, into which said expected driving distance is divided, and a road condition of each said district, the boundaries comprising positions along the route, wherein said driving condition predicting means predicts said driving condition of said vehicle, based on said driving distance measured by said driving distance measurement means and the driving schedule input by said driving schedule input means.

9. A power output apparatus in accordance with claim 1, wherein said target state setting means comprises:

means for setting a first state as said predicted target state, when said driving condition of said vehicle requires a power of greater than a predetermined level, and setting a second state as the target state, when said predicted driving condition of said vehicle requires a power of not greater than said predetermined level, said second state having a higher charge-discharge efficiency of said accumulator means than that of said first state.

10. A power output apparatus in accordance with claim 1, wherein said generator is a pair-rotor motor comprising a first rotor connecting with an output shaft of said engine and a second rotor connecting with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor and electric power is regenerated in response to a slip of the electromagnetic coupling of said first rotor with said second rotor.

11. A power output apparatus in accordance with claim 1, wherein said motor is a pair-rotor motor comprising a first rotor connecting with an output shaft of said engine and a second rotor connecting with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor, said generator being attached to either one of said output shaft of said engine and said drive shaft.

12. A power output apparatus in accordance with claim 1, said power output apparatus further comprising three shaft-type power input/output means having three shafts respectively linked with said drive shaft, an output shaft of said engine, and a rotating shaft, said three shaft-type power input/output means determining power input to and output from a residual one shaft, based on predetermined powers input to and output from any two shafts among said three shafts, wherein said generator is linked with said rotating shaft.

13. A power output apparatus in accordance with claim 1, said power output apparatus further comprising three shaft-type power input/output means having three shafts respectively linked with said drive shaft, an output shaft of said engine, and a rotating shaft, said three shaft-type power input/output means determining power input to and output from a residual one shaft, based on predetermined powers input to and output from any two shafts among said three shafts, wherein said generator is linked with said drive shaft and said motor is linked with said rotating shaft.

14. A power output apparatus mounted on a vehicle for outputting power to a drive shaft, said power output apparatus comprising:

a motor for outputting power to said drive shaft;

an engine to output mechanical power, said motor converting at least a portion of the mechanical power output by the engine to mechanical energy as the power output to the drive shaft;

a generator for converting at least part of said mechanical power output from said engine to electrical energy, the generator regenerating a portion of the mechanical power output from the engine while the motor is outputting power to the drive shaft;

accumulator means being charged with the electrical energy converted by said generator and being discharged to supply electrical energy required for driving said motor;

state detection means for detecting a state of said accumulator means;

map storage means for storing a map, said map including road information including district information regarding a plurality of districts having different driving conditions;

driving route setting means for specifying a driving route in said map, based on an instruction of a driver;

target state setting means for setting a target state of said accumulator means at each position in said driving route, said target state setting means comprising means for setting said target state of said accumulator means at each position in said driving route based on said district information at each position in said driving route;

driving position detection means for detecting a current driving position of said vehicle; and charge-discharge control means of controlling said engine and said generator, based on said current driving position and said target state at each position in said driving route to enable said state of said accumulator means to become equal to said target state at the current driving position.

15. A power output apparatus in accordance with claim 14, wherein said map includes altitude information regarding an altitude at each position in said driving route, said target state setting means comprises means for estimating a charge-discharge amount of said accumulator means at each position in said driving route based on said altitude at each position in said driving route and sets said target state of said accumulator means at each position in said driving route based on said estimated charge-discharge amount.

16. A power output apparatus in accordance with claim 14, wherein said map includes slope information regarding a slope at each position in said driving route, said target state setting means comprises means for estimating a charge-discharge amount of said accumulator means at each position in said driving route based on the slope at each position in said driving route and sets said target state of said accumulator means at each position in said driving route based on said estimated charge-discharge amount.

17. A power output apparatus in accordance with claim 14, wherein said generator is a pair-rotor motor comprising a first rotor connecting with an output shaft of said engine and a second rotor connecting with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor and electric power is regenerated in response to a slip of the electromagnetic coupling of said first rotor with said second rotor.

18. A power output apparatus in accordance with claim 14, wherein said motor is a pair-rotor motor comprising a first rotor connecting with an output shaft of said engine and a second rotor connecting with said drive shaft, said second rotor being rotatable relative to said first rotor, said first and second rotors being electromagnetically connected with each other, whereby power is transmitted between said output shaft of said engine and said drive shaft via an electromagnetic coupling of said first rotor with said second rotor, said generator being attached to either one of said output shaft of said engine and said drive shaft.

19. A power output apparatus in accordance with claim 14, said power output apparatus further comprising three shaft-type power input/output means having three shafts respectively linked with said drive shaft, an output shaft of said engine, and a rotating shaft, said three shaft-type power input/output means determining power input to and output from a residual one shaft, based on predetermined powers input to and output from any two shafts among said three shafts, and output from any two shafts among said three shafts, wherein said generator is linked with said rotating shaft.

20. A power output apparatus in accordance with claim 14, said power output apparatus further comprising three shaft-type power input/output means having three shafts respectively linked with said drive shaft, an output shaft of said engine, and a rotating shaft, said three shaft-type power input/output means determining power input to and output from a residual one shaft, based on predetermined powers input to and output from any two shafts among said three shafts, wherein said generator is linked with said drive shaft and said motor is linked with said rotating shaft.

21. A method of controlling a state of a battery mounted on a vehicle to a target state, said method comprising the steps of:

(a) providing a motor for outputting power to a drive shaft, an engine for outputting mechanical power, said motor converting at least a portion of the mechanical power output by the engine to mechanical energy as the power output to the drive shaft, and a generator for converting at least part of said mechanical power output from said engine to electrical energy, the generator regenerating a portion of the mechanical power output from the engine while the motor is outputting power to the drive shaft;

(b) connecting said battery to said generator and said motor so as to be charged with the electrical energy converted by said generator and discharged to supply electrical energy required for driving said motor;

(c) detecting said state of said battery;

(d) predicting a driving condition of said vehicle at various positions, including predicted positions, along a route;

(e) setting said target state of said battery at each position along the route while driving based on said predicted driving condition; and (f) controlling said engine and said generator to enable said state of said battery to become equal to said target state.

22. A method of controlling a state of a battery mounted on a vehicle to a target state, said method comprising the steps of:

(a) providing a motor for outputting power to said drive shaft, an engine for outputting mechanical power, said motor converting at least a portion of the mechanical power output by the engine to mechanical energy as the power output to the drive shaft, and a generator for converting at least part of said mechanical power output from said engine to electrical energy, the generator regenerating a portion of the mechanical power output from the engine while the motor is outputting power to the drive shaft;

(b) connecting said battery to said generator and said motor so as to be charged with said electrical energy converted by said generator and discharged to supply electrical energy required for driving said motor;

(c) detecting a state of said battery;

(d) storing a map, said map including road information to include district information regarding a plurality of districts having different driving conditions;

(e) storing a driving route in said map specified by an instruction of a driver;

(f) setting a target state of said battery at each position in said driving route, said target state being set at each position, including predicted positions, in said driving route based on said district information at each position in said driving route;

(g) detecting a current driving position of said vehicle; and (h) controlling said engine and said generator, based on said current driving position and said target state at each position in said driving route to enable said state of said battery to become equal to said target state at said current driving position.

* * * * *